United States Patent
Hara et al.

(10) Patent No.: US 9,781,678 B2
(45) Date of Patent: Oct. 3, 2017

(54) MOBILE TERMINAL DEVICE, CONTROL METHOD, AND COMPUTER PRODUCT

(71) Applicant: FUJITSU LIMITED, Kawasaki-shi, Kanagawa (JP)

(72) Inventors: Yasushi Hara, Kunitachi (JP); Akemi Toyokura, Kawasaki (JP); Yuichi Miura, Sapporo (JP); Masao Hara, Kunitachi (JP)

(73) Assignee: FUJITSU LIMITED, Kawasaki (JP)

(*) Notice: Subject to any disclaimer, the term of this patent is extended or adjusted under 35 U.S.C. 154(b) by 148 days.

(21) Appl. No.: 14/718,838

(22) Filed: May 21, 2015

(65) Prior Publication Data
US 2015/0257108 A1 Sep. 10, 2015

Related U.S. Application Data

(63) Continuation of application No. PCT/JP2012/081067, filed on Nov. 30, 2012.

(51) Int. Cl.
*H04W 52/02* (2009.01)
*H04W 48/16* (2009.01)
*H04W 84/12* (2009.01)

(52) U.S. Cl.
CPC ....... *H04W 52/0254* (2013.01); *H04W 48/16* (2013.01); *H04W 52/0258* (2013.01); *H04W 84/12* (2013.01); *Y02B 60/50* (2013.01)

(58) Field of Classification Search
CPC H04W 48/16; H04W 52/0258; H04W 52/025
See application file for complete search history.

(56) References Cited

U.S. PATENT DOCUMENTS

| 2004/0110530 | A1 | 6/2004 | Alone et al. |
| 2007/0008941 | A1 | 1/2007 | Narasimha et al. |
| 2009/0232117 | A1 | 9/2009 | Hara |
| 2010/0172274 | A1* | 7/2010 | Wu ........... H04W 48/16 370/311 |

(Continued)

FOREIGN PATENT DOCUMENTS

| JP | 2004-140778 | 5/2004 |
| JP | 2004-343458 | 12/2004 |

(Continued)

OTHER PUBLICATIONS

International Search Report mailed Mar. 5, 2013 in corresponding international application PCT/JP2012/081067.

(Continued)

*Primary Examiner* — Donald Mills
*Assistant Examiner* — Henry Baron
(74) *Attorney, Agent, or Firm* — Staas & Halsey LLP

(57) ABSTRACT

A mobile terminal device, when detecting that a display state of a screen transitions from non-display to display, starts a scanning operation of searching for an access point. If an access point of the same access point identification information is found successively a given number of times N, the mobile terminal device suspends the scanning operation of searching for an access point. If movement of the mobile terminal device is detected subsequent to suspending the scanning operation of searching for the access point, the mobile terminal device resumes the scanning operation for the access point.

20 Claims, 51 Drawing Sheets

(56) References Cited

U.S. PATENT DOCUMENTS

| | | | |
|---|---|---|---|
| 2011/0110282 A1* | 5/2011 | Wu | H04W 52/0235 |
| | | | 370/311 |
| 2013/0107777 A1* | 5/2013 | Woo | H04W 52/0254 |
| | | | 370/311 |
| 2013/0322316 A1 | 12/2013 | Hara et al. | |
| 2014/0287751 A1* | 9/2014 | Lee | H04W 48/16 |
| | | | 455/434 |

FOREIGN PATENT DOCUMENTS

| | | |
|---|---|---|
| JP | 2007-104417 | 4/2007 |
| JP | 2007-251304 | 9/2007 |
| JP | 2007-306510 | 11/2007 |
| JP | 2008-289026 | 11/2008 |
| JP | 2008-301058 | 12/2008 |
| JP | 2009-201104 | 9/2009 |
| JP | 2011-049787 | 3/2011 |
| JP | 2011-521549 | 7/2011 |
| WO | WO 2009/137718 A1 | 11/2009 |
| WO | WO 2012/124016 A1 | 9/2012 |

OTHER PUBLICATIONS

Office Action issued by the Japanese Patent Office on May 16, 2017 in corresponding Japanese patent application No. 2016-113072.

* cited by examiner

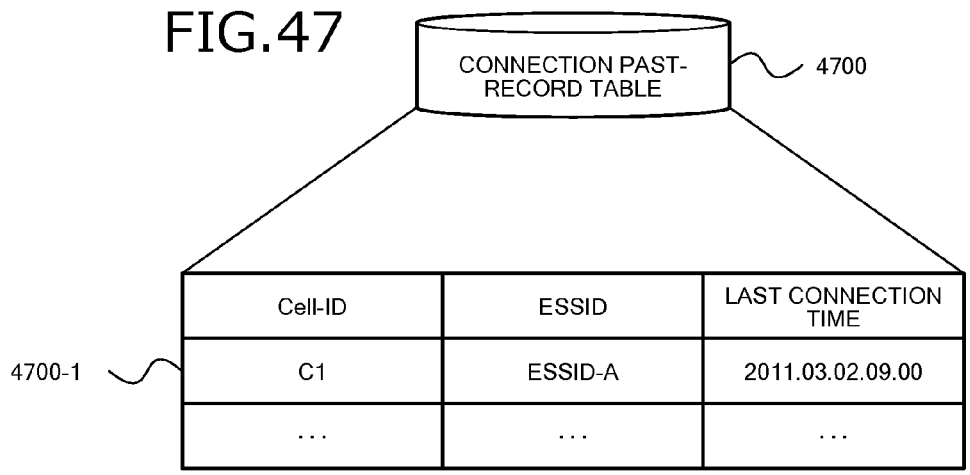
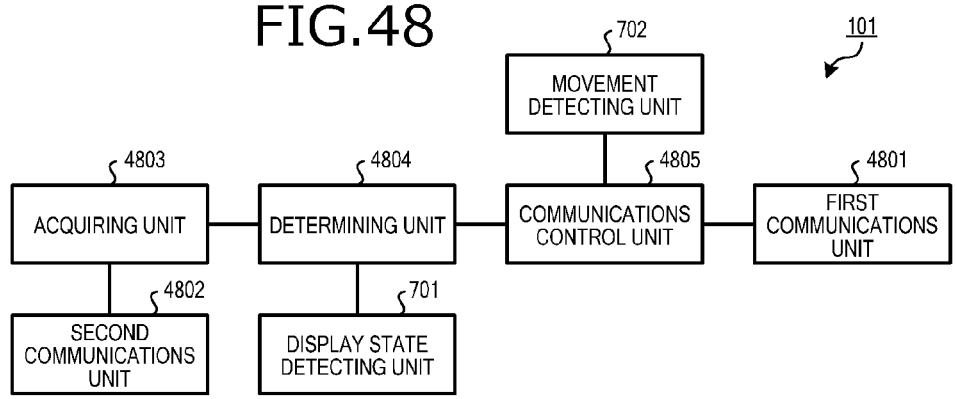

MOBILE TERMINAL DEVICE, CONTROL METHOD, AND COMPUTER PRODUCT

CROSS REFERENCE TO RELATED APPLICATIONS

This application is a continuation application of International Application PCT/JP2012/081067, filed on Nov. 30, 2012 and designating the U.S., the entire contents of which are incorporated herein by reference.

FIELD

The embodiments discussed herein are related to a mobile terminal device, a control method, and a computer product.

BACKGROUND

A conventional mobile terminal device has a communications function of connecting to a wireless local area network (LAN). The mobile terminal device can connect to a network such as the Internet via wireless LAN access points provided at various locations, for example.

Related technologies includes for example a technique in which a search interval control server determines a search interval for a reference wireless signal sent from an access point, based on base station identification information and base station position information received from a wireless terminal. According to another technique, a mobile telephone terminal reads out from a public wireless base station WLAN profile association table, a profile name corresponding to position information to set a WLAN profile as a scan profile so that the WLAN profile is scanned when outside the WLAN area.

According to a further technique, a computer apparatus actually attempts to connect to a hidden access point not issuing identification information, to confirm connection. According to yet another technique, a wireless communications apparatus performs handover upon determining that plural base stations can be associated therewith and suspends handover upon determining that only a single base station can be associated therewith. A further technique provides position recognition Wi-Fi access for mobile devices. For examples of such techniques, refer to Japanese Laid-Open Patent Publication Nos. 2008-289026, 2009-201104, 2004-140778, and 2011-049787; and Published Japanese-Translation of PCT Application, Publication No. 2011-521549.

The existing techniques, however, have a problem of inviting increased power consumption by the mobile terminal device consequent to scanning operations performed by the mobile terminal device to search for access points of a wireless LAN, etc., as base points for connecting to a network.

SUMMARY

According to an aspect of an embodiment, a mobile terminal device includes a sensor configured to detect movement of the mobile terminal device; a first communications circuit configured to connect to a network via an access point; a processor configured to detect a transition from a non-display state in which no screen is not displayed to a display state in which a screen is displayed; and memory configured to store connection history information that includes network identification information identifying the network to which the first communications circuit has connected. The memory is configured to further store non-connection information in which access point identification information is correlated with network identification information, the access point identification information identifying an access point to which the first communications circuit is not allowed to connect, and the network identification information identifying a network corresponding to an access point to which the first communications circuit is not allowed to connect. The processor is configured to further determine whether network identification information has been retrieved from the connection history information and whether access point identification information has been retrieved from the non-connection information. The processor is configured to further control the first communications circuit to search for an access point upon detecting the transition from the non-display state to the display state, the processor controlling the first communications circuit to suspend searching for an access point upon determining that the network identification information identifying the network corresponding to the access point found by the first communications circuit is not present in the connection history information and that the access point identification information of the access point found by the first communications circuit is present in the non-connection information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 47 is an explanatory diagram of an example of the contents stored in a connection past-record table 4700;

FIG. 48 is a block diagram of a functional configuration example of the mobile terminal device 101 according to the third embodiment;

DESCRIPTION OF EMBODIMENTS

Embodiments of a mobile terminal device, a control method, and a control program will be described in detail with reference to the accompanying drawings.

Figure 1:
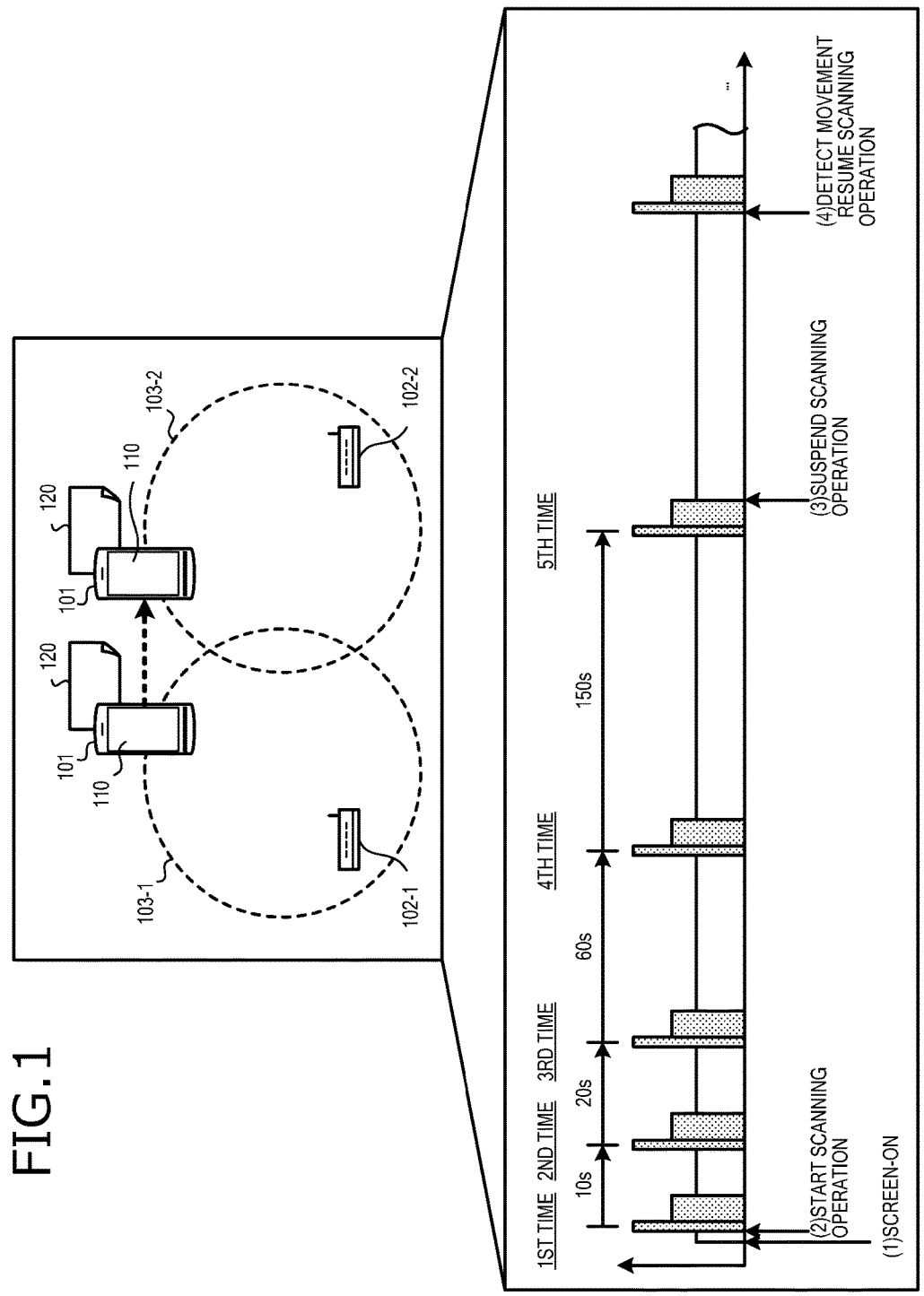
FIG. 1 is an explanatory view of an example of a control method according to a first embodiment.

FIG. 1 is an explanatory view of an example of a control method according to a first embodiment. In FIG. 1, a mobile terminal device 101 is a computer having a screen 110 and capable of wirelessly communicating with access points 102 (102-1 and 102-2 in the example of FIG. 1). For example, the mobile terminal device 101 is a smartphone, a mobile telephone, a tablet-type personal computer (PC), a personal handy-phone system (PHS) device, etc.

The access point 102 is a wireless station capable of wirelessly communicating with the mobile terminal device 101 located in a communication area 103 (communication areas 103-1 and 103-2 in the example of FIG. 1), the access point 102 acting as a base point for connecting the mobile terminal device 101 to a network. For example, the access points 102 are wireless LAN access points interspersed at various locations.

The mobile terminal device 101 performs a scanning operation of searching for an access point 102 capable of wireless communication to connect to a network via the found access point 102. The network is, for example, a mobile communications network, a LAN, a wide area network (WAN), the Internet, etc.

Some access points 102 may be available to only users that subscribe to a specific service. Therefore, the mobile terminal device 101 connects to a network via access points 102 available to the user of the mobile terminal device 101, among the found access points 102.

If there is no available access point 102 near the mobile terminal device 101, in view of the power consumption, it would be undesirable for the mobile terminal device 101 to perform the scanning operation of searching for access points 102. When utilizing an access point 102, the user may issue an instruction to start the scanning operation of searching for access points 102. In this case, however, input by the user is necessary but the user may not know the position where the available access point 102 is installed.

Thus, in the first embodiment, the mobile terminal device 101 suspends the scanning operation if the same access point 102 is found a given number of times or continuously for given period of time, as a result of periodically performing the scanning operation of searching for access points 102. The mobile terminal device 101 resumes the scanning operations upon detecting walking by the user. As a result, connectivity to an available access point 102 is assured to prevent the usability from being impaired and the power consumed for the scanning operation of searching for access points 102 can be saved.

Operation examples of the mobile terminal device 101 according to the first embodiment will be described.

(1) The mobile terminal device 101 detects transition from a non-display state in which the screen 110 is not displayed, to a display state in which the screen 110 is displayed. The non-display state (screen OFF) is, for example, a state in which power is not supplied to the screen 110. The display state (screen ON) is, for example, a state in which the power is supplied to the screen 110.

In the description hereinafter, the non-display state of not displaying the screen 110 may be referred to as "the display state of the screen 110 is non-display", while the display state of displaying the screen 110 may be referred to as "the display state of the screen 110 is display".

(2) When detecting transition from non-display to display in the display state of the screen 110, the mobile terminal device 101 starts the scanning operation of searching for an access point 102. When an access point 102 is found, the mobile terminal device 101 searches connection history information 120 for network identification information identifying the found access point 102 and determines whether network identification information has been retrieved from the connection history information 120.

The connection history information 120 is information specifying network identification information of an available access point 102, i.e., an access point 102 through which connection to a network such as Internet has been made. The network identification information is, for example, an extended service set identifier (ESSID) of the access point 102.

The same network identification information may be given to plural access points 102. An example of access points 102 given the same network identification information is a set of access points having the same available communication service or a set of access points located at stores respectively managed by a company. Therefore, even if the user of the mobile terminal device 101 has never utilized the found access point 102, network identification information identifying the found access point 102 may be retrieved from the connection history information 120.

When network identification information is retrieved from the connection history information 120, the mobile terminal device 101 performs a connection operation of connecting to the found access point 102. The connection operation of connecting to an access point 102 is a connection process of connecting to a network such as the Internet through the access point 102. As a result, the mobile terminal device 101 can connect to the network such as the Internet by way of the access point 102. For example, when connection to the access point 102 is completed, the mobile terminal device 101 terminates the scanning operation of searching for an access point 102.

On the other hand, if the access point 102 is found or if no network identification information is retrieved from the connection history information 120, the mobile terminal device 101 repeats the scanning operation of searching for an access point 102. In the example depicted in FIG. 1, the scanning operation is repeated at a time interval of 10 [s (seconds)], 20 [s], 60 [s], and 150 [s].

(3) When an access point 102 of the same access point identification information is found successively for a given number of times N, the mobile terminal device 101 suspends the scanning operation of searching for an access point 102. The access point identification information is identification information uniquely identifying an access point 102 and is, for example, a basic service set identifier (BSSID) of the access point 102.

The given number of times N can arbitrarily be set. The given number of times N is set to a value enabling determination that the user of the mobile terminal device 101 is not moving if the access point 102 of the same access point identification information is successively found N time, for example. For example, the given number of times N is set based on the time interval of the scanning operation of searching for an access point 102, the communication range of the access point 102, and the average walking speed of the user of the mobile terminal device 101.

Even when the mobile terminal device 101 is located in the communication area of an access point 102, the mobile terminal device 101 may not be able to find the access point 102 by a single scanning operation. Hence, the given number of times N may be set to a value not less than 2.

In the example depicted in FIG. 1, it is assumed that the access point identification information of the access point 102-1 has been found five successive times, where "N=5" has been set as the given number of times N. In this case, the mobile terminal device 101 suspends the scanning operation of the access point 102.

(4) When the mobile terminal device 101 detects movement of the device as a result of suspending the scanning operation of the access point 102, the mobile terminal device 101 resumes the scanning operation of the access point 102. As a result of movement of the mobile terminal device 101, i.e., movement of the user of the mobile terminal device 101, a new access point 102 may appear that can wirelessly communicate with the mobile terminal device 101. Thus, when the mobile terminal device 101 detects movement of the device itself, it resumes the scanning operation of searching for an access point 102.

The example depicted in FIG. 1, a case is assumed where the user of the mobile terminal device 101 moves from the communication area 103-1 of the access point 102-1 to the communication area 103-2 of the access point 102-2. In this case, the mobile terminal device 101 detects movement of the device itself and resumes the scanning operation of the access point 102. This enables the mobile terminal device 101 to search for the new access point 102-2 that has become able to wirelessly communicate therewith as a result of the movement of the user.

In this manner, according to the mobile terminal device 101, the scanning operation of searching for an access point 102 can be started when the display state of the screen 110 transitions from non-display to display. This enables an available access point 102 located around the mobile terminal device 101 to be searched for in response to the screen ON.

According to the mobile terminal device 101, the scanning operation of searching for an access point 102 can be suspended when an access point 102 of the same access point identification information has been found successively the given number of times N. That is, according to the mobile terminal device 101, the scanning operation of searching for an access point 102 can be suspended when it can be determined that the user of the mobile terminal device 101 is not moving and is not connected to the access point 102.

As a result, the scanning operation of searching for an access point 102 can be suspended in situations where the possibility of connecting to the access point 102 is low despite continuing the scanning operation of searching for an access point 102, enabling the power consumed for the scanning operation of searching for an access point 102 to be suppressed.

According to the mobile terminal device 101, when movement of the device itself is detected as a result of suspending the scanning operation of the access point 102, the scanning operation of the access point 102 can be resumed. Thus, the suspended scanning operation can be resumed when the user of the mobile terminal device 101 moves, making it possible to secure connectivity to the available access point 102 and prevent the usability from being impaired.

Although in the above description, the network identification information is given as an example of identification information of an available access point 102 stored in the connection history information 120, configuration is not limited hereto. For example, the connection history information 120 may store access point identification information of an available access point 102. In this case, at (2), the mobile terminal device 101 searches the connection history information 120 for access point identification information of the found access point 102 and determines whether access point identification information has been retrieved from the connection history information 120.

At (3), although the mobile terminal device 101 suspends the scanning operation of searching for an access point 102 when an access point 102 of the same access point identification information is found successively the given number of times N, configuration is not limited hereto. For example, the mobile terminal device 101 may suspend the scanning operation of searching for an access point 102 when an access point 102 of the same network identification information is found successively the given number of times N.

An example of system configuration of a communications system 200 according to the first embodiment will be described. In the description hereinafter, an access point of the wireless LAN will be given as an example of the access point 102 (refer to FIG. 1).

Figure 2:
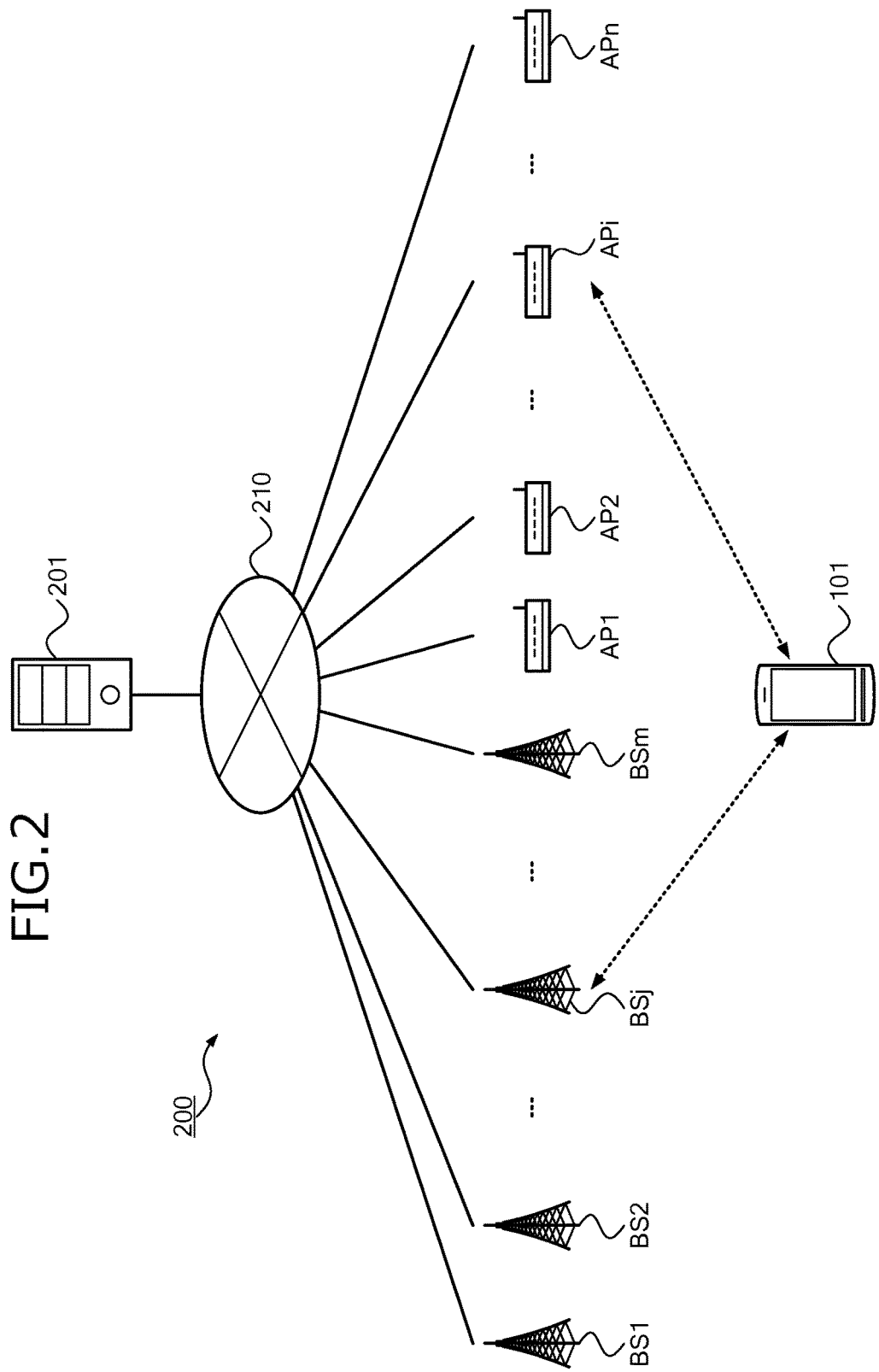
FIG. 2 is an explanatory view of an example of system configuration of a communications system 200.

FIG. 2 is an explanatory view of an example of system configuration of the communications system 200. In FIG. 2, the communications system 200 includes the mobile terminal device 101, base stations BS1 to BSm, access points AP1 to APn, and a server 201. In the communications system 200, the base stations BS1 to BSm, the access points AP1 to APn, and the server 201 are connected to one another via a network 210. The network 210 includes for example the mobile communications network, the LAN, the WAN, and the Internet.

The base stations BS1 to BSm are base stations of the mobile communications network (mobile telephone network) that are interspersed at various locations. In the description hereinafter, a base station among the base stations BS1 to BSm may be referred to as "base station BSj", while the communication area representing the communicable range of the base station BSj may be referred to as "cell Cj" (j=1, 2, . . . , m).

The access points AP1 to APn are base stations of the wireless LAN that are interspersed at various locations. The access points AP1 to APn may include an access point (e.g., a Hotspot 2.0-enabled access point) that automatically establishes connection with the mobile terminal device 101 without requiring the user to manually perform a procedure to register or authenticate the available access point. The access points AP1 to APn may include a transportable access point or an access point mounted on a vehicle such as a train and a bus.

In the description hereinafter, an access point among the access points AP1 to APn may be referred to as "access point APi", while the communication area representing the communicable range of the access point APi may be referred to as "communication area Ri" (i=1, 2, . . . , n). The access point 102 depicted in FIG. 1 corresponds to the access point APi.

The mobile terminal device 101 is capable of wireless communication with the base station BSj in the cell Cj and can connect to the network 210 via the base station BSj. The mobile terminal device 101 is capable of wireless communication with the access point APi in the communication area Ri and can connect to the network 210 via the access point APi.

The server 201 is a computer that provides a service to the mobile terminal device 101 by way of the network 210. The service is information processing provided to the mobile terminal device 101 and includes, for example, an email service, a telephone service, and a web service. For example, the server 201 includes a mail server, a web server, an application server, and a database server.

Although FIG. 2 depicts a single mobile terminal device 101 and a single server 201, configuration is not limited hereto. For example, the mobile terminal device 101 may be provided for each of user of the communications system 200 and the server 201 may be disposed for each service provider.

Figure 3:
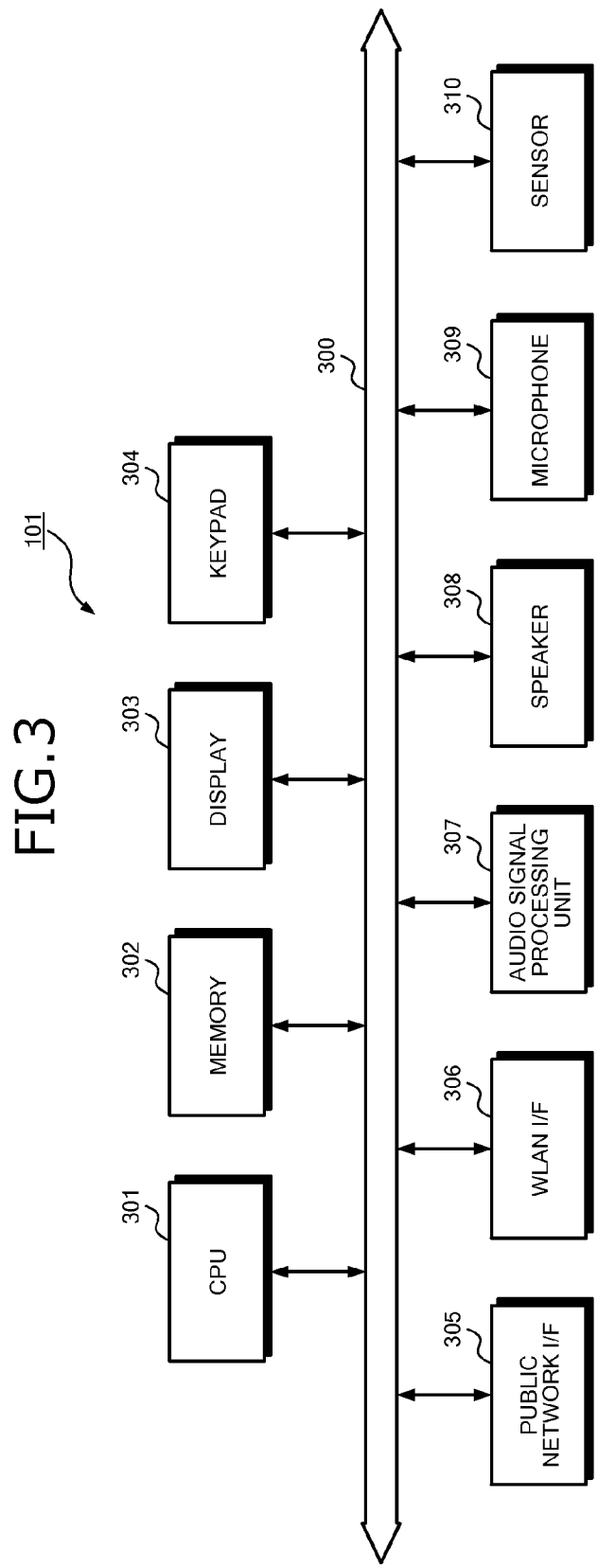
FIG. 3 is a block diagram of a hardware configuration example of a mobile terminal device 101.

FIG. 3 is a block diagram of a hardware configuration example of the mobile terminal device 101. In FIG. 3, the mobile terminal device 101 includes a central processing unit (CPU) 301, memory 302, a display 303, a keypad 304, a public network interface (I/F) 305, a wireless LAN (WLAN) I/F 306, an audio signal processing unit 307, a speaker 308, a microphone 309, and a sensor 310, respectively connected to one another by a bus 300.

The CPU 301 provides overall control of the mobile terminal device 101. The memory 302 includes, for example, read only memory (ROM), random access memory (RAM), and flash ROM. For example, the flash ROM stores a program of an operating system (OS), the ROM stores an application program, and the RAM is used as a work area. A program stored in the memory 302 is loaded into the CPU 301, whereby the CPU 301 executes encoded processes.

The display 303 displays data such as documents, images, and function information, in addition to a cursor, icons, and a toolbox. The display 303 can be, for example, a liquid crystal display or an organic electroluminescence (EL) display. The screen 110 depicted in FIG. 1 corresponds to the display 303.

The keypad 304 has keys for inputting letters, numerals, and various instructions and performs data entry therethrough. The keypad 304 may be, for example, a touch panel type input pad, a numeric pad, or a power key.

The public network I/F 305 is connected to the network 210 through the base station BSj of the mobile communications network and is connected to other computers (e.g., the server 201) via the network 210. The public network I/F 305 administers an internal interface with the network 210 and controls the input of data from and the output of data to the other computers.

The WLAN I/F 306 is connected to the network 210 through the access point APi of the wireless LAN and is connected via the network 201 to other computers. The WLAN I/F 306 administers an internal interface with the network 210 and controls the input of data from and the output of data to the other computers.

The audio signal processing unit 307 is connected to the speaker 308 and the microphone 309. For example, a sound received by the microphone 309 is A/D converted in the audio signal processing unit 307. Sound is output from the speaker 308.

The sensor 310 detects movement of the mobile terminal device 101. The sensor 310 is realized by, for example, an acceleration sensor and a pedometer. For example, when detecting that the user of the mobile terminal device 101 has moved a given number of steps or more (e.g., 8 steps), the sensor 310 may detect that the user is walking.

Although not depicted, the mobile terminal device 101 may include, in addition to the above components, a memory controller that controls the reading and writing of data with respect to the memory 302, a power management unit (PMU) that supplies power supply voltage to the components, a battery, various timers, and a global positioning system (GPS) unit. The hardware configurations of the base station BSj, the access point APi, and the server 201 are realized by, for example, a CPU, memory, an I/F, an auxiliary storage, a bus, etc.

A connection AP table 400 used by the mobile terminal device 101 will be described. The connection AP table 400 is realized for example by the memory 302 depicted in FIG. 3. The connection history information 120 depicted in FIG. 1 corresponds to the connection AP table 400.

Figure 4:
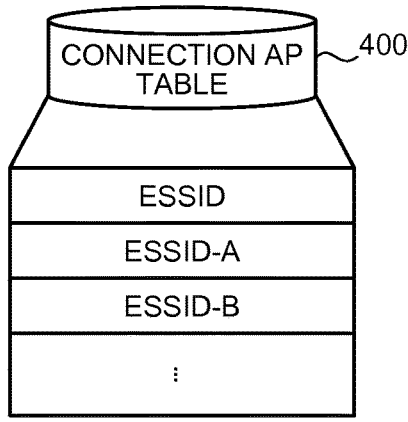
FIG. 4 is an explanatory view of an example of the contents stored in a connection AP table 400.

FIG. 4 is an explanatory view of an example of the contents stored in the connection AP table 400. In FIG. 4, the connection AP table 400 stores the ESSID of the access point APi through which connection has been made from the mobile terminal device 101 to the network 210. By referring to the connection AP table 400, the mobile terminal device 101 can specify, e.g., an ESSID-A and an ESSID-B that are ESSIDs of access points APi available to the user of the mobile terminal device 101.

The contents stored in the connection AP table 400 are updated, for example, at the time of a first connection to the access point APi. For example, at the time of a first connection to an access point APi consequent to user input, the ESSID of the connected access point APi is newly registered into the connection AP table 400.

A non-connection AP table 500 used by the mobile terminal device 101 will be described. The non-connection AP table 500 is realized, for example, by the memory 302.

Figure 5:
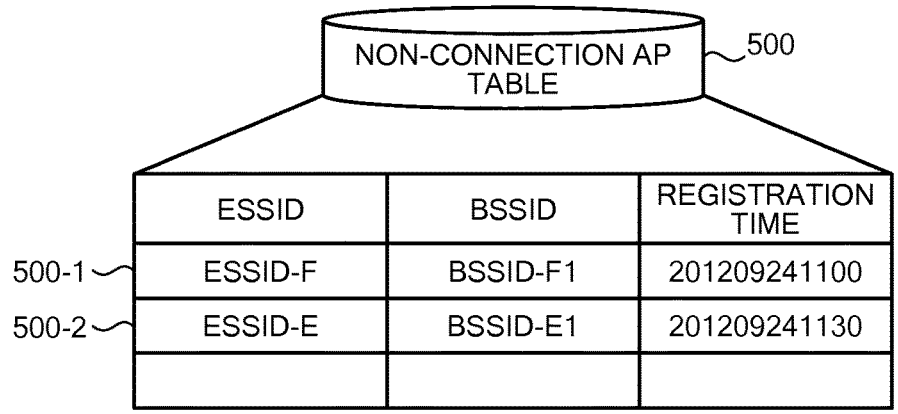
FIG. 5 is an explanatory view of an example of the contents stored in a non-connection AP table 500.

FIG. 5 is an explanatory view of an example of the contents stored in the non-connection AP table 500. In FIG. 5, the non-connection AP table 500 has fields for ESSIDs, BSSIDs, and registration times. By setting information into the fields, non-connection information (e.g., non-connection information 500-1 and 500-2) is stored as records.

Set in the ESSID field is an ESSID of a non-connection access point APi to which the mobile terminal device 101 does not connect. Set in the BSSID field is a BSSID of a non-connection access point APi to which the mobile terminal device 101 does not connect. Set in the registration time field is time information indicative of time at which the non-connection information was registered.

For example, based on the non-connection information 500-1, the mobile terminal device 101 can identify an ESSID "ESSID-F", a BSSID "BSSID-F1" and a registration time "2012,09.24,11:00" of a non-connection access point APi to which the mobile terminal device 101 does not connect.

A maximum record count may be set for the non-connection AP table 500. For example, when the number of records in the non-connection AP table 500 reaches the maximum record count, the mobile terminal device 101 may delete the oldest record in the non-connection AP table 500, enabling the capacity of the memory 302 used to be suppressed.

In the description hereinafter, a non-connection access point APi, to which the mobile terminal device 101 does not connect and identified from the non-connection AP table 500 may be referred to as "non-connection AP".

A first management table 600 used by the mobile terminal device 101 will be described. The first management table 600 is realized, for example, by the memory 302.

Figure 6:
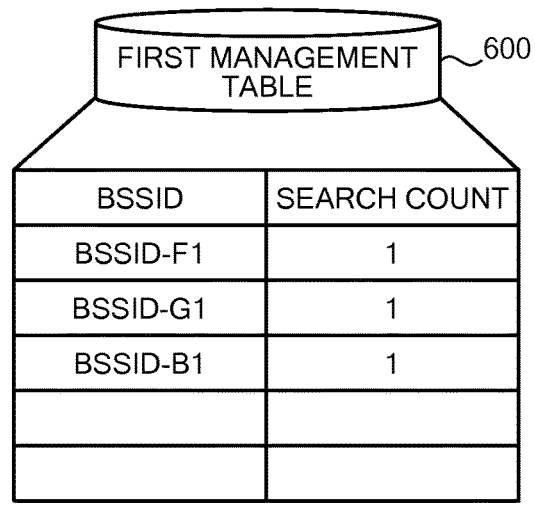
FIG. 6 is an explanatory view of an example of the contents stored in a first management table 600.

FIG. 6 is an explanatory view of an example of the contents stored in the first management table 600. In FIG. 6, the first management table 600 has fields for BSSIDs and search counts and, by setting information into the fields, stores search count information as records. For example, the search count information is information correlating the BSSID of an access point APi found by scanning by the mobile terminal device 101 with the search count of the number of times that the access point APi has been successively found.

Although not depicted, the first management table 600 stores the ESSID of the access point APi, correlated with the BSSID of the access point APi.

Figure 7:
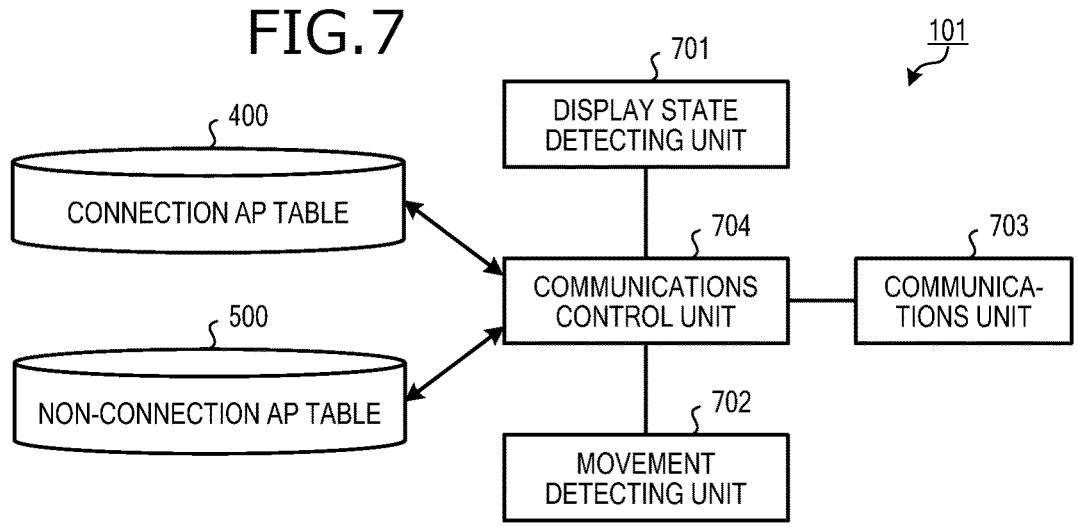
FIG. 7 is a block diagram of a functional configuration example of the mobile terminal device 101 according to a first embodiment.

FIG. 7 is a block diagram of a functional configuration example of the mobile terminal device 101 according to the first embodiment. In FIG. 7, the mobile terminal device 101 is configured to include a display state detecting unit 701, a movement detecting unit 702, a communications unit 703, and a communications control unit 704. Functions of the functional units are realized by, for example, causing the CPU 301 to run a program stored in the memory 302 depicted in FIG. 3 or by hardware such as the public network I/F 305, the WLAN I/F 306, and sensor 310. Processing results of the functional units are stored, for example, to the memory 302.

The display state detecting unit 701 has a function of detecting a transition from non-display to display in the display state of the display 303 (refer to FIG. 3). For example, when the display state of the display 303 switches from non-display to display consequent to user operation via the keypad 304 (power key), the display state detecting unit 701 detects a transition from non-display to display in the display state of the display 303.

For example, when the operation is resumed from the state immediately before the transition to non-display in the display state of the display 303, the display state detecting unit 701 may detect a transition from non-display to display in the display state of the display 303. For example, when an application is activated such as an alarm starting at a preset time, the display state detecting unit 701 may detect a transition from non-display to display in the display state of the display 303.

The display state detecting unit 701 has a function of detecting a transition from display to non-display in the display state of the display 303. For example, when the display state of the display 303 is switched from display to non-display consequent to user operation via the keypad 304, the display state detecting unit 701 detects a transition from display to non-display in the display state of the display 303.

For example, when a screen OFF timer has reached a specified value, the display state detecting unit 701 may detect a transition from display to non-display in the display state of the display 303. The screen OFF timer is a timer that measures the duration from display until the transition to non-display in the display state of the display 303. Furthermore, for example, when transitioning to a power-saving mode suppressing the power supply to the display 303, the display state detecting unit 701 may detect a transition from display to non-display in the display state of the display 303.

The movement detecting unit 702 has a function of detecting movement of the mobile terminal device 101. For example, the movement detecting unit 702 detects that the user of the mobile terminal device 101 is walking, based on the detection result of the sensor 310 depicted in FIG. 3. For example, when the user is detected to be walking by the sensor 310, the movement detecting unit 702 may detect movement of the mobile terminal device 101. For example, the movement detecting unit 702 may detect movement of the mobile terminal device 101, from position information acquired by the GPS unit (not depicted).

The communications unit 703 has a function of communicating with an access point APi. For example, the communications unit 703 connects to the network 210 by way of an available access point.

The communications control unit 704 has a function of controlling a scanning operation of the communications unit 703 to search for an access point APi. For example, when a transition of the display state from display to non-display is detected by the display state detecting unit 701, the communications control unit 704 may control the communications unit 703 to start a periodic scanning operation to search for an access point APi.

For example, a cycle T of the periodic scanning operation is arbitrarily preset and may be constant or not constant. In the description hereinafter, the cycle T is assumed to become longer in the order of "cycle T1→cycle T2→ . . . →cycle TP" (P is a natural number not less than 2). A cycle among the cycles T1 to TP may be referred to as "cycle Tp" (p=1, 2, . . . , P).

The scanning operation includes, for example, an active scan and a passive scan. The active scan is a scanning operation that searches for an access point APi by sending a probe request signal to channels for use in the wireless LAN and receiving a probe response signal. The wireless LAN channels used in the active scan are, for example, the 13 channels of the 2.4 [GHz] frequency bandwidth prescribed by the Institute of Electrical and Electronics Engineers, Inc. (IEEE) in 802.11.

The passive scan is a scanning operation that searches for an access point APi by receiving a signal (packet) called beacon from the access point APi. The wireless LAN channels used in the passive scan are, for example, the four W52 (type) channels, the four W53 (type) channels, and the eleven W56 (type) channels prescribed in IEEE 802.11.

The communications control unit 704 may control the communications unit 703 to search for an access point APi from which a received signal has a received signal strength indication (RSSI) that is a given strength S or greater. The received signal from the access point APi is, for example, a probe response signal or a beacon. The given strength S is set to a value on the order of −80 [dbm], for example.

By controlling the communications unit 703, the communications control unit 704 may perform both the active scan and the passive scan or perform either the active scan or passive scan as the scanning operation of searching for an access point APi. When performing both the active scan and the passive scan, the communications control unit 704 controls the communications unit 703 to perform the passive scan after executing the active scan.

In the description hereinafter, an access point APi found as a result of execution of a scanning operation may be referred to as "found AP".

The communications control unit 704 has a function of suspending an access point APi scanning operation when the ESSID of the found AP is not in the connection AP table 400 and when the BSSID of the found AP is in the non-connection AP table 500. In other words, the communications control unit 704 suspends the scanning operation of searching for an access point APi when the found AP is not an available access point and is a non-connection AP.

For example, the communications control unit 704 searches the connection AP table 400 for the ESSID of the found AP and determines whether the ESSID of the found AP has been retrieved. The communications control unit 704 searches the non-connection AP table 500 for the BSSID of the found AP and determines whether the BSSID of the found AP has been retrieved. The communications control unit 704 then suspends the scanning operation of the access point APi, based on the obtained results of determination. The ESSID and BSSID of the found AP are included, for example, in the scanning result sent from the communications unit 703 to the communications control unit 704 consequent to executing the scanning operation.

The communications control unit 704 has a function of saving search count information in which the found AP is correlated with the number of times that the found AP was found by the communications unit 703. For example, the communications control unit 704 correlates and registers into the first management table 600 (refer to FIG. 6), the BSSID of a found AP and the search count of the number of times that the found AP is successively found. An example of managing the search count of the number of times that the found AP has been successively found using the first management table 600 will be described hereinafter with reference to FIGS. 14 and 15.

The communications control unit 704 has a function of registering the BSSID of the search count information into the non-connection AP table 500, depending on the search count correlated with the BSSID of the search count information. For example, the communications control unit 704 refers to the first management table 600 and registers into the non-connection AP table 500, a BSSID whose search count is the given number of times N or greater. This enables the scanning operation to be suspended in a situation where the possibility of connecting to an access point APi is low, thereby suppressing the power consumed for the scanning operation to search for an access point APi.

For example, the communications control unit 704 may correlate and register into the non-connection AP table 500, a BSSID whose search count the given number of times N or greater and, the ESSID and the registration time that correspond to the BSSID. The registration time is time information indicating the time of registration of the BSSID into the non-connection AP table 500.

In this case, the communications control unit 704 may calculate the difference of current time and registration time correlated with the BSSID of a found AP if the ESSID of the found AP is not in the connection AP table 400 and if the BSSID of the found AP is in the non-connection AP table 500. If the calculated difference of the current time and the registration time is within a given range, then the communications control unit 704 may suspend the scanning operation of searching for an access point APi.

On the other hand, if the calculated difference of the current time and the registration time is outside the range, the communications control unit 704 may continue the scanning operation of searching for an access point APi. This enables the scanning operation of searching for an access point APi to be continued even when in the vicinity of a non-connection AP, assuming a case where a new access point is located around the non-connection AP. The given range is set to several weeks or several months for example.

If the calculated difference of the current time and the registration time is outside the given range, the communications control unit 704 may delete the record from the non-connection AP table 500, enabling the capacity of the memory 302 used to store the non-connection AP table 500 to be suppressed.

The communications control unit 704 may continue the scanning operation of searching for an access point APi if the ESSID of the found AP is in the connection AP table 400 and if the BSSID of the found AP is in the non-connection AP table 500. That is, even if the found AP is an access point that has been found N or more successive times, the communications control unit 704 continues the scanning operation of searching for an access point APi provided the access point APi is an available access point.

The communications control unit 704 may control the scanning operation effected by the communications unit 703 to search for an access point APi, in response to a detection of movement of the mobile terminal device 101 by the movement detecting unit 702. For example, the communications control unit 704 may start the scanning operation to search for an access point APi when movement of the mobile terminal device 101 has been detected. This enables the interrupted scanning operation to be resumed when the user of the mobile terminal device 101 has moved, assuring the connectivity to an available access point.

The communications control unit 704 may alter the cycle T if the periodic scanning operation by the communications unit 703 to search for an access point APi is started in response to detection of movement of the mobile terminal device 101 by the movement detecting unit 702. For example, the communications control unit 704 may cause the communications unit 703 to perform the periodic scanning operation at a longer time interval than that of the scanning operation started in response to detection of a transition from non-display to display by the display state detecting unit 701.

The communications control unit 704 may cause the communications unit 703 to search for an access point APi having a given strength S' or greater (the given strength S' being less than the given strength S), if a transition of the display state from non-display to display has been detected after suspending the search for an access point APi whose RSSI the given strength S or greater. This results in a wider range to search for an access point APi and a wider range to suspend the scanning operation of searching for an access point APi.

The communications control unit 704 may control the communications unit 703 to suspend the periodic scanning operation of searching for an access point APi, if a transition of the display state from display to non-display has been detected by the display state detecting unit 701. For example, the communications control unit 604 may suspend the periodic scanning operation after the elapse of a certain period of time after the transition of the display state from display to non-display.

Figure 8:
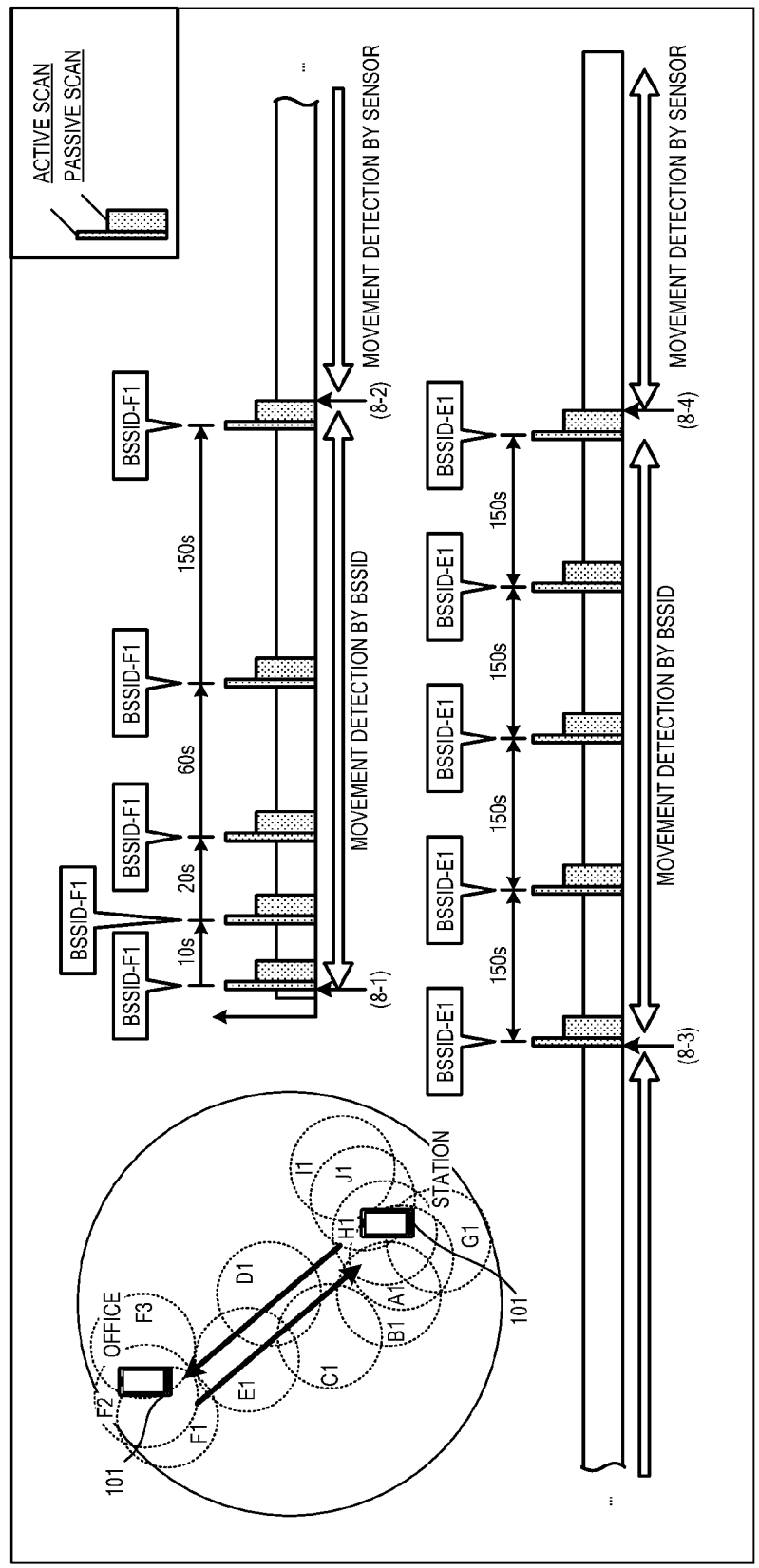
FIG. 8 is an explanatory view of a first operation example of the mobile terminal device 101 according to the first embodiment.
Figure 10:
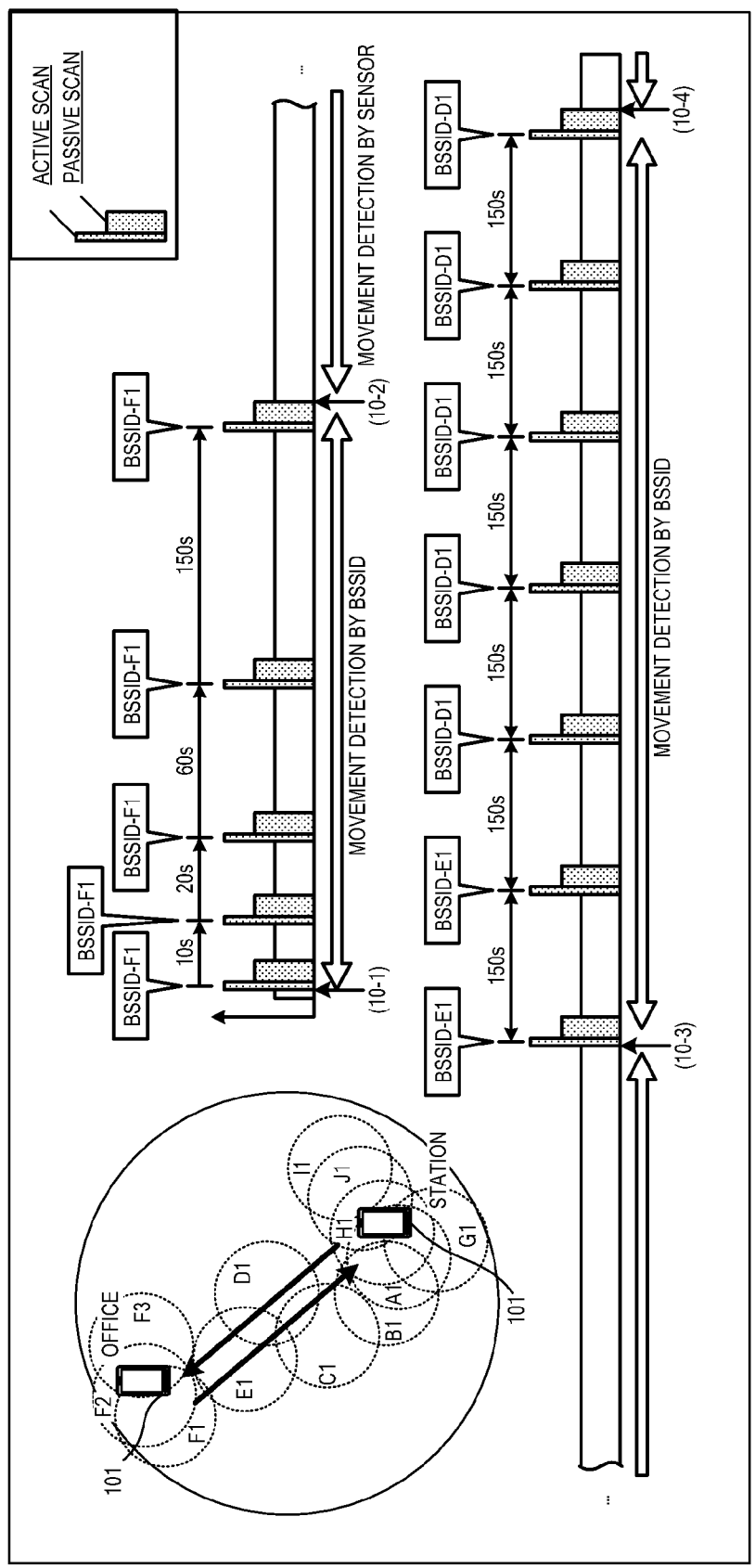
FIG. 10 is an explanatory view of a second operation example of the mobile terminal device 101 according to the first embodiment.
Figure 12:
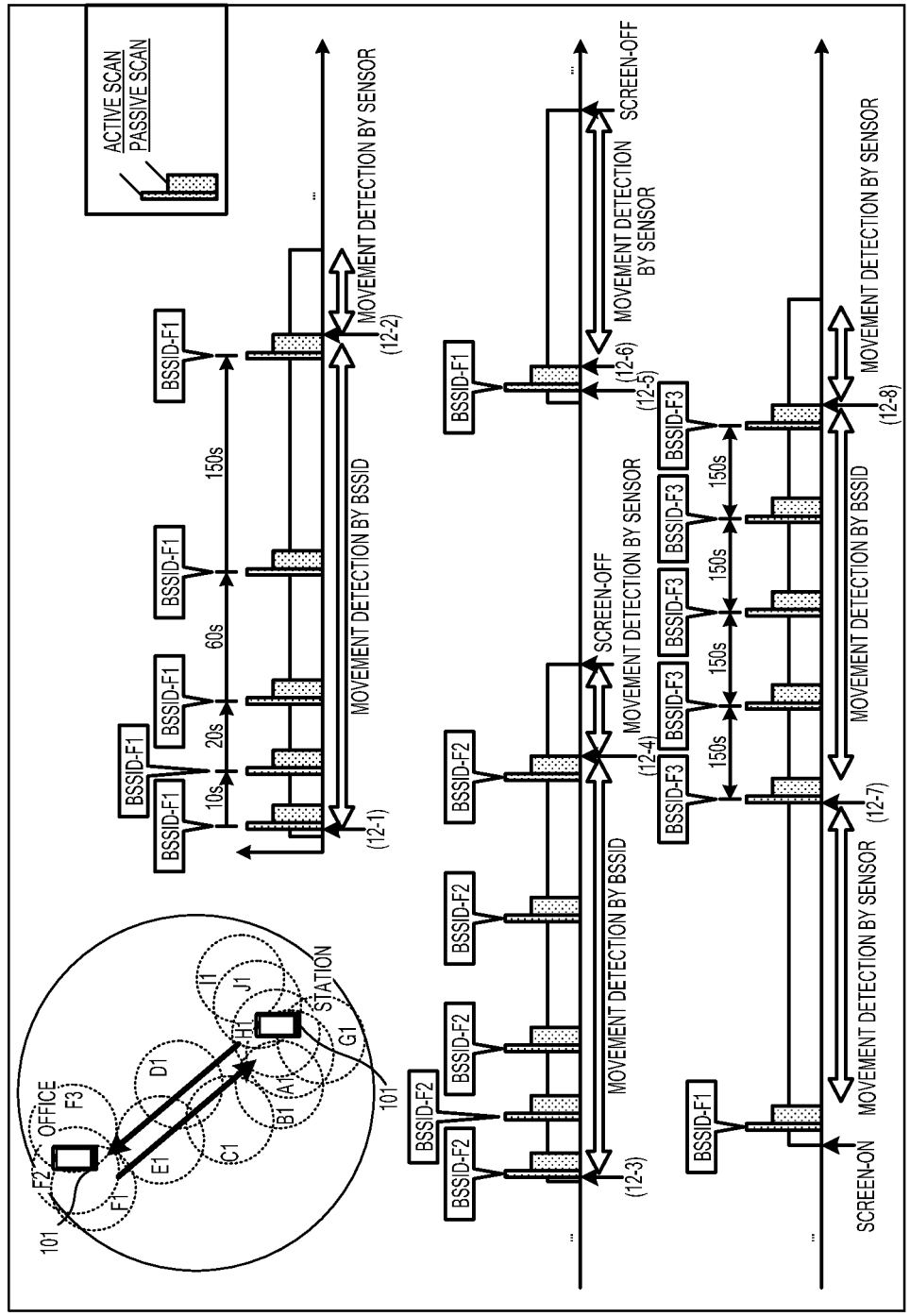
FIG. 12 is an explanatory view of a third operation example of the mobile terminal device 101 according to the first embodiment.

Operation examples of the mobile terminal device 101 will be described with reference to FIGS. 8, 10, and 12. A situation is assumed where the user of the mobile terminal device 101 moves between a "station" and an "office". In FIGS. 8, 10, and 12, a dotted line circle designates the communication area of each access point APi, while a reference letter and numeral corresponding to the dotted line circle denotes the BSSID of each access point APi. "N=5" is given as the given number of times N to be compared with the search count of an access point APi.

FIG. 8 is an explanatory view of a first operation example of the mobile terminal device 101 according to the first embodiment. (8-1) When the display state of the display 303 transitions from non-display to display, the mobile terminal device 101 starts a periodic scanning operation of searching for an access point APi. In the example depicted in FIG. 8, an access point of a BSSID "BSSID-F1" is found five successive times as a result of repeating a scanning operation at a cycle T of 10 [s], 20 [s], 60 [s], and 150 [s].

(8-2) The mobile terminal device 101 suspends the scanning operation of searching for an access point APi since the access point of the BSSID "BSSID-F1" has been found five successive times. The BSSID "BSSID-F1" of the access point that has been found five successive times is registered into the non-connection AP table 500 (refer to FIG. 9 described hereinafter).

(8-3) When the mobile terminal device 101 detects movement of the device itself, the mobile terminal device 101 starts a periodic scanning operation to search for an access point APi. In the example depicted in FIG. 8, an access point of a BSSID "BSSID-E1" is found five successive times as a result of repeating the scanning operation at a cycle T of 150 [s].

(8-4) The mobile terminal device 101 suspends the scanning operation of searching for an access point APi since an access point of the BSSID "BSSID-E1" has been found five successive times. The BSSID "BSSID-E1" of the access point found five successive times is registered into the non-connection AP table 500 (refer to FIG. 9 described hereinafter).

At (8-1), the mobile terminal device 101 suspends the scanning operation if the BSSID of the first found AP is already registered in the non-connection AP table 500.

That is, if the BSSID of the access point AP found first after the screen ON coincides with the BSSID of a found AP found immediately before the screen ON, it can be determined that the mobile terminal device 101 has not moved and therefore, the mobile terminal device 101 suspends the scanning operation. The BSSID of the found AP found immediately before the screen ON is stored in the memory 302, for example.

Description will be given of a transition example of the contents stored in the non-connection AP table that changes according to the first operation example of the mobile terminal device 101.

Figure 9:
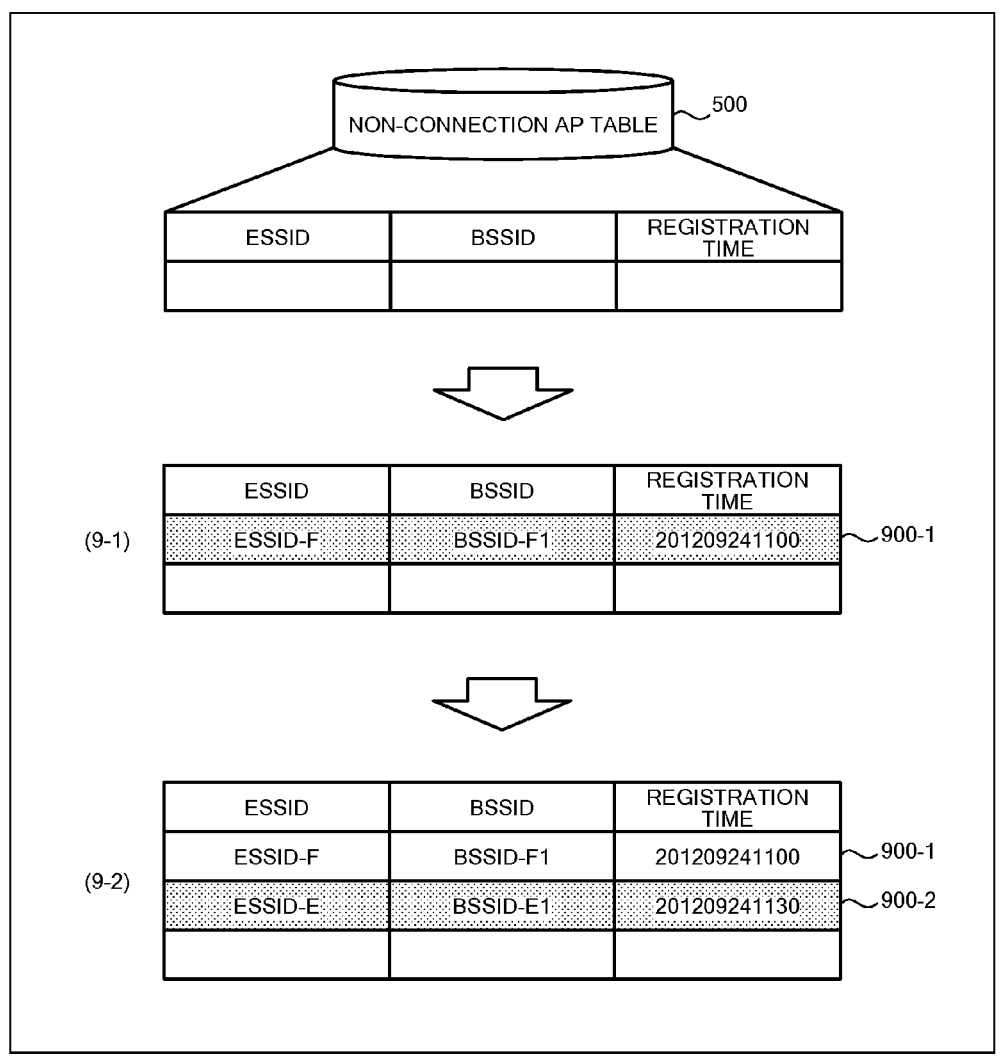
FIG. 9 is an explanatory view of a first transition example of the contents stored in the non-connection AP table 500.

FIG. 9 is an explanatory view of a first transition example of the contents stored in the non-connection AP table 500. A case is assumed where the non-connection AP table 500 is empty.

When the access point of the BSSID "BSSID-F1" is found five successive times as depicted at (8-2) in FIG. 8, non-connection information 900-1 is registered (refer to (9-1) in FIG. 9). The non-connection information 900-1 is information that indicates the ESSID "ESSID-F" and the BSSID "BSSID-F1" of the found AP found five successive times, correlated with a registration time "201209241100".

When the access point of the BSSID "BSSID-E1" is found five successive times as depicted at (8-4) in FIG. 8, non-connection information 900-2 is registered (refer to (9-2) in FIG. 9). The non-connection information 900-2 is information indicates the ESSID "ESSID-E" and the BSSID "BSSID-E1" of the found AP found five successive times, correlated with a registration time "201209241130".

FIG. 10 is an explanatory view of a second operation example of the mobile terminal device 101 according to the first embodiment. (10-1) When the display state of the display 303 transitions from non-display to display, the mobile terminal device 101 starts a periodic scanning operation of searching for an access point APi. In the example depicted in FIG. 10, an access point of a BSSID "BSSID-F1" is found five successive times as a result of repeating the scanning operation.

(10-2) The mobile terminal device 101 suspends the scanning operation of searching for an access point APi since the access point of the BSSID "BSSID-F1" has been found five successive times. The BSSID "BSSID-F1" of the access point that has been found five successive times is registered into the non-connection AP table 500 (refer to FIG. 11 described hereinafter).

(10-3) When the mobile terminal device 101 detects movement of the device itself, the mobile terminal device 101 starts a periodic scanning operation to search for an access point APi. In the example depicted in FIG. 10, an access point of a BSSID "BSSID-D1" is found five successive times after an access point of a BSSID "BSSID-E1" is found two successive times as a result of repeating the scanning operation.

(10-4) The mobile terminal device 101 suspends the scanning operation of searching for an access point APi since an access point of the BSSID "BSSID-D1" has been found five successive times. The BSSID "BSSID-D1" of the access point found five successive times is registered into the non-connection AP table 500 (refer to FIG. 11 described hereinafter).

Description will be given of a transition example of the contents stored in the non-connection AP table that changes according to the second operation example of the mobile terminal device 101.

Figure 11:
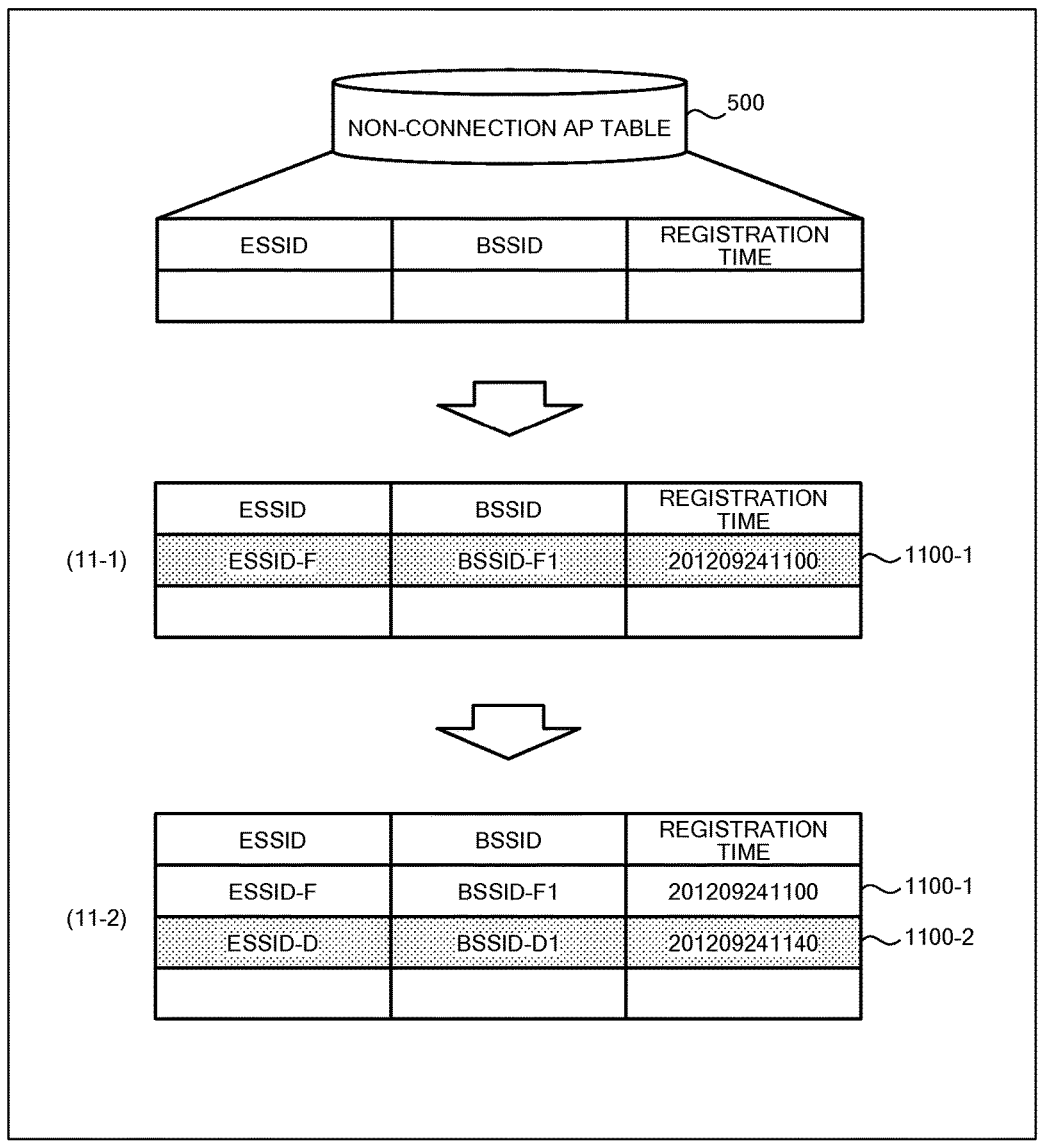
FIG. 11 is an explanatory view of a second transition example of the contents stored in the non-connection AP table 500.

FIG. 11 is an explanatory view of a second transition example of the contents stored in the non-connection AP table 500. A case is assumed where the non-connection AP table 500 is empty.

When the access point of the BSSID "BSSID-F1" is found five successive times as depicted at (10-2) in FIG. 10, non-connection information 1100-1 is registered (refer to (11-1) in FIG. 11). The non-connection information 1100-1 is information that indicates the ESSID "ESSID-F" and the BSSID "BSSID-F1" of the found AP found five successive times, correlated with a registration time "201209241100".

When the access point of the BSSID "BSSID-D1" is found five successive times as depicted at (10-4) in FIG. 10, non-connection information 1100-2 is registered (refer to (11-2) in FIG. 11). The non-connection information 1100-2 is information indicates the ESSID "ESSID-D" and the BSSID "BSSID-D1" of the found AP found five successive times, correlated with a registration time "201209241140".

FIG. 12 is an explanatory view of a third operation example of the mobile terminal device 101 according to the first embodiment. (12-1) When the display state of the display 303 transitions from non-display to display, the mobile terminal device 101 starts a periodic scanning operation of searching for an access point APi. In the example depicted in FIG. 12, an access point of a BSSID "BSSID-F1" is found five successive times as a result of repeating the scanning operation.

(12-2) The mobile terminal device 101 suspends the scanning operation of searching for an access point APi since the access point of the BSSID "BSSID-F1" has been found five successive times. The BSSID "BSSID-F1" of the access point that has been found five successive times is registered into the non-connection AP table 500 (refer to FIG. 13 described hereinafter).

(12-3) When the mobile terminal device 101 detects movement of the device itself, the mobile terminal device 101 starts a periodic scanning operation to search for an access point APi. In the example depicted in FIG. 12, an access point of a BSSID "BSSID-F2" is found five successive times as a result of repeating the scanning operation.

(12-4) The mobile terminal device 101 suspends the scanning operation of searching for an access point APi since an access point of the BSSID "BSSID-F2" has been found five successive times. The BSSID "BSSID-F2" of the access point found five successive times is registered into the non-connection AP table 500 (refer to FIG. 13 described hereinafter).

A case is assumed where after (12-4), the display state of the display 303 transitions from display to non-display ("screen OFF" in FIG. 12).

(12-5) When the display state of the display 303 transitions from display to non-display, the mobile terminal device 101 starts a periodic scanning operation to search for an access point APi. In the example depicted in FIG. 12, an access point of the BSSID "BSSID-F1" is first found as a result of starting the periodic scanning operation.

(12-6) Since the BSSID "BSSID-F1" is already registered in the non-connection AP table 500, the mobile terminal device 101 suspends the scanning operation of searching for an access point APi.

A case is assumed where after (12-6), the display state of the display 303 transitions from display to non-display and thereafter, the display state of the display 303 transitions from non-display to display. A case is also assumed where thereafter, as a result of starting the periodic scanning operation to search for an access point APi, the access point of the BSSID "BSSID-F1" registered in the non-connection AP table 500 is found, and the scanning operation of searching for an access point APi is suspended.

(12-7) When the mobile terminal device 101 detects movement of the device itself, the mobile terminal device 101 starts a periodic scanning operation to search for an access point APi. In the example depicted in FIG. 12, an access point of a BSSID "BSSID-F3" is found five successive times as a result of repeating the scanning operation.

(12-8) The mobile terminal device 101 suspends the scanning operation of searching for an access point APi since an access point of the BSSID "BSSID-F3" has been found five successive times. The BSSID "BSSID-F3" of the access point that has been found five successive times is registered into the non-connection AP table 500 (refer to FIG. 13 described hereinafter).

Description will be given of a transition example of the contents stored in the non-connection AP table that changes according to the third operation example of the mobile terminal device 101.

Figure 13:
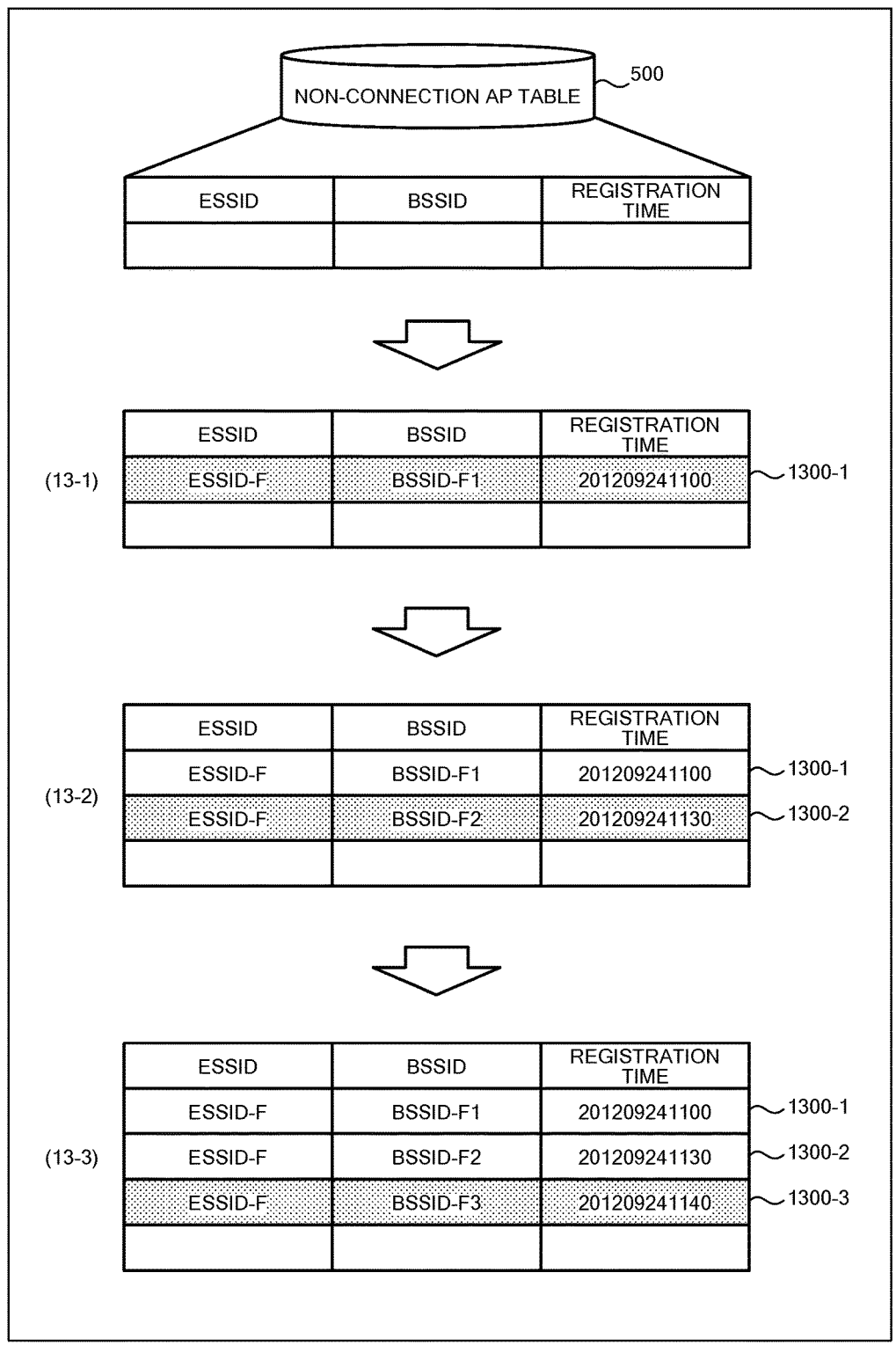
FIG. 13 is an explanatory view of a third transition example of the contents stored in the non-connection AP table 500.

FIG. 13 is an explanatory view of a third transition example of the contents stored in the non-connection AP table 500. A case is assumed where the non-connection AP table 500 is empty.

When the access point of the BSSID "BSSID-F1" is found five successive times as depicted at (12-2) in FIG. 12, non-connection information 1300-1 is registered (refer to (13-1) in FIG. 13). The non-connection information 1300-1 is information that indicates the ESSID "ESSID-F" and the BSSID "BSSID-F1" of the found AP found five successive times, correlated with a registration time "201209241100".

When the access point of the BSSID "BSSID-F2" is found five successive times as depicted at (12-4) in FIG. 12, non-connection information 1300-2 is registered (refer to (13-2) in FIG. 13). The non-connection information 1300-2 is information indicates the ESSID "ESSID-F" and the BSSID "BSSID-F2" of the found AP found five successive times, correlated with a registration time "201209241130".

When the access point of the BSSID "BSSID-F3" is found five successive times, as depicted at (12-8) in FIG. 12, non-connection information 1300-3 is registered (refer to (13-3) in FIG. 13). The non-connection information 1300-3 is information that indicates the ESSID "ESSID-F" and the BSSID "BSSID-F3" of the found AP found five successive times, correlated with a registration time "201209241140".

A management example of managing the search count of the number of times that a found AP is successively found using the first management table 600 depicted in FIG. 6 will be described. Description will first be given of a scan result table 1400 that stores scan results. The scan result table 1400 is realized for example by the memory 302 depicted in FIG. 3.

Figure 14:
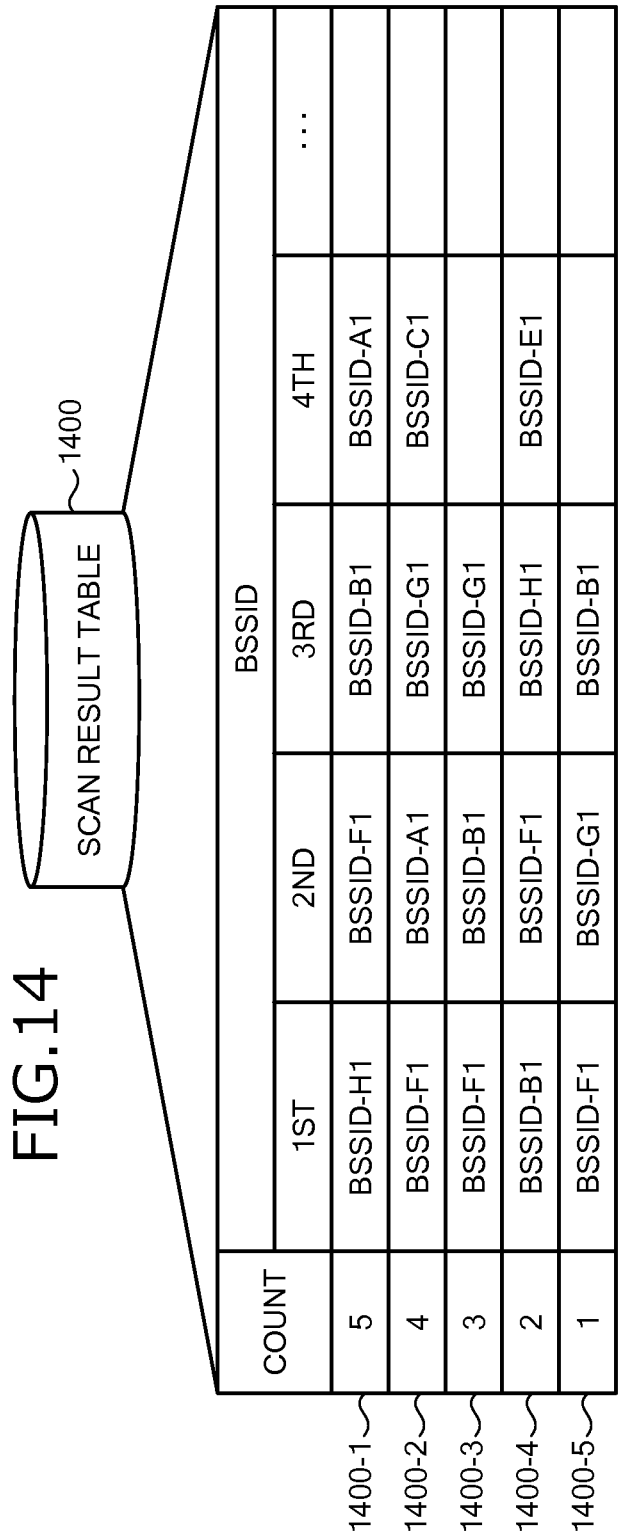
FIG. 14 is an explanatory view of an example of the contents stored in a scan result table 1400.

FIG. 14 is an explanatory view of an example of the contents stored in the scan result table 1400. In FIG. 14, the scan result table 1400 has fields of counts and BSSIDs, to store as records, scan results (e.g., scan results 1400-1 to 1400-5) obtained as a result of executing the scanning operation of searching for an access point APi.

Set into the count field is the count specifying the number of times that the scanning operation has been executed to obtain the scan result. The BSSID of the found AP is set into the BSSID field in descending order of the BSSID. In the case of the scan result 1400-5, for example, the BSSIDs of the found AP found by the first scanning operation are shown in descending order of the RSSI. Although not depicted, the scan result table 1400 stores the ESSID of each found AP, correlated with the BSSID of each found AP.

A management example of the search count based on the contents stored in the scan result table 1400 depicted in FIG. 14 will be described with reference to FIG. 15.

Figure 15:
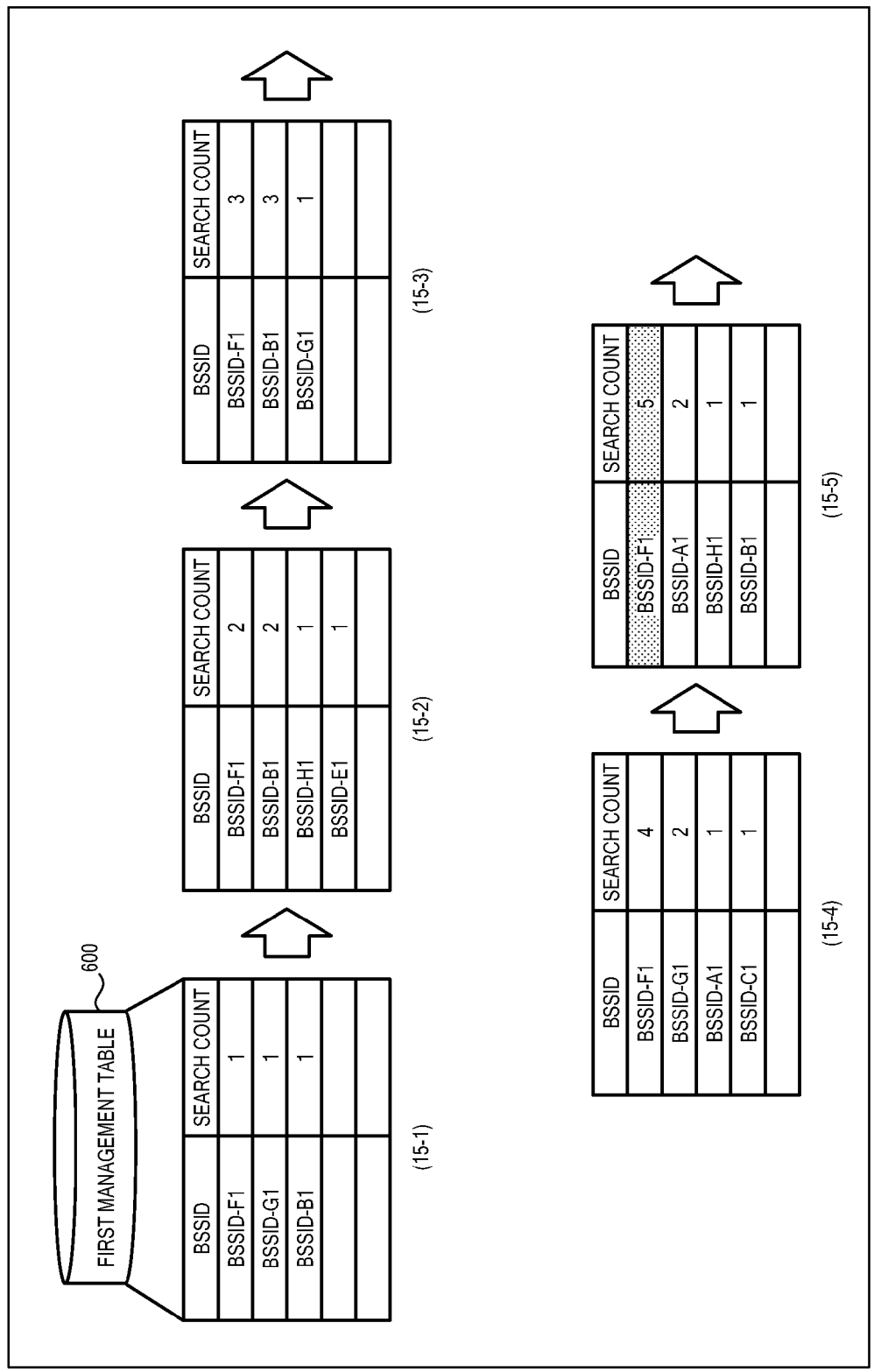
FIG. 15 is an explanatory view of a transition example of the contents stored in the first management table 600.

FIG. 15 is an explanatory view of a transition example of the contents stored in the first management table 600. At (15-1) in FIG. 15, when acquiring the scan result 1400-5 (refer to FIG. 14), the mobile terminal device 101 sets a BSSID specified in the scan result 1400-5 into the BSSID field and sets "1" into the search count field.

At (15-2) in FIG. 15, when acquiring the scan result 1400-4 (refer to FIG. 14), the mobile terminal device 101 sets a BSSID that is not yet set among BSSIDs specified in the scan result 1400-4 into the BSSID field and sets "1" into the search count field.

The mobile terminal device 101 increments the search count corresponding to a BSSID that is already set among BSSIDs specified from the scan result 1400-4. For example, the search count is incremented that corresponds to the BSSID "BSSID-F1" already set among BSSIDs specified in the scan result 1400-4.

The mobile terminal device 101 deletes a record of an already set BSSID not included in the BSSIDs specified in the scan result 1400-4. For example, a record is deleted of an already set BSSID "BSSID-G1" not included in the BSSIDs specified in the scan result 1400-4.

In the same manner, at (15-3), (15-4), and (15-5) in FIG. 15, the mobile terminal device 101 acquires the scan results 1400-3, 1400-2, and 1400-1 (refer to FIG. 14) in sequence, and performs the same processing as at (15-2) in sequence.

This results in the search count "5" corresponding to the BSSID "BSSID-F1" in the first management table 600. In this case, the scanning operation of searching for an access point APi is suspended and the BSSID "BSSID-F1" is registered into the non-connection AP table 500 (N=5).

Control processing examples of the mobile terminal device 101 according to the first embodiment will be described with reference to FIGS. 16 to 19. In the description hereinafter, some processes in the control processing of the mobile terminal device 101 may be omitted. "N=5" is given as the given number of times N to be compared with the search count of an access point APi.

Figure 16:
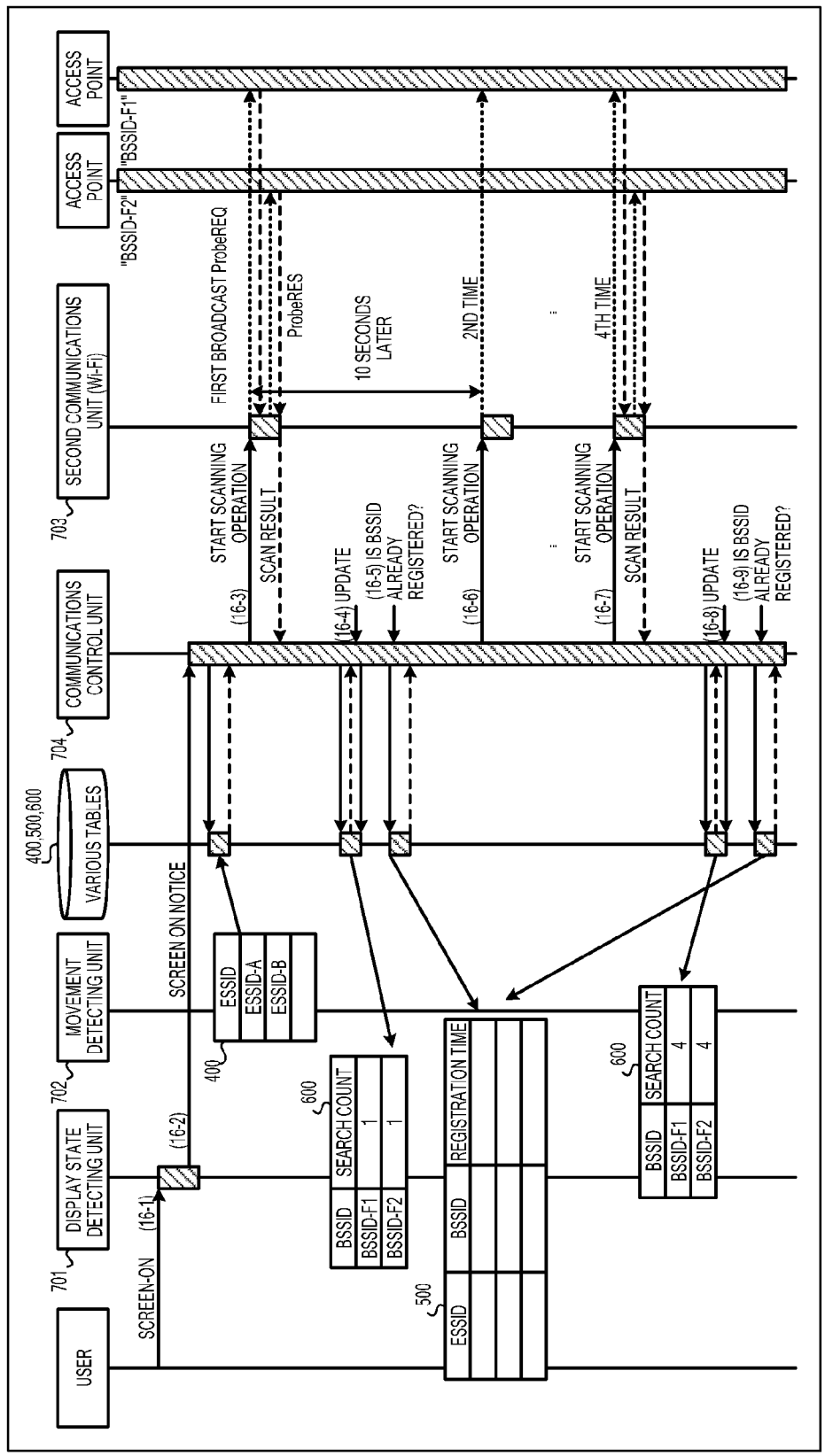
FIGS. 16 and 17 are explanatory views of a first control processing example of the mobile terminal device 101 according to the first embodiment.
Figure 17:
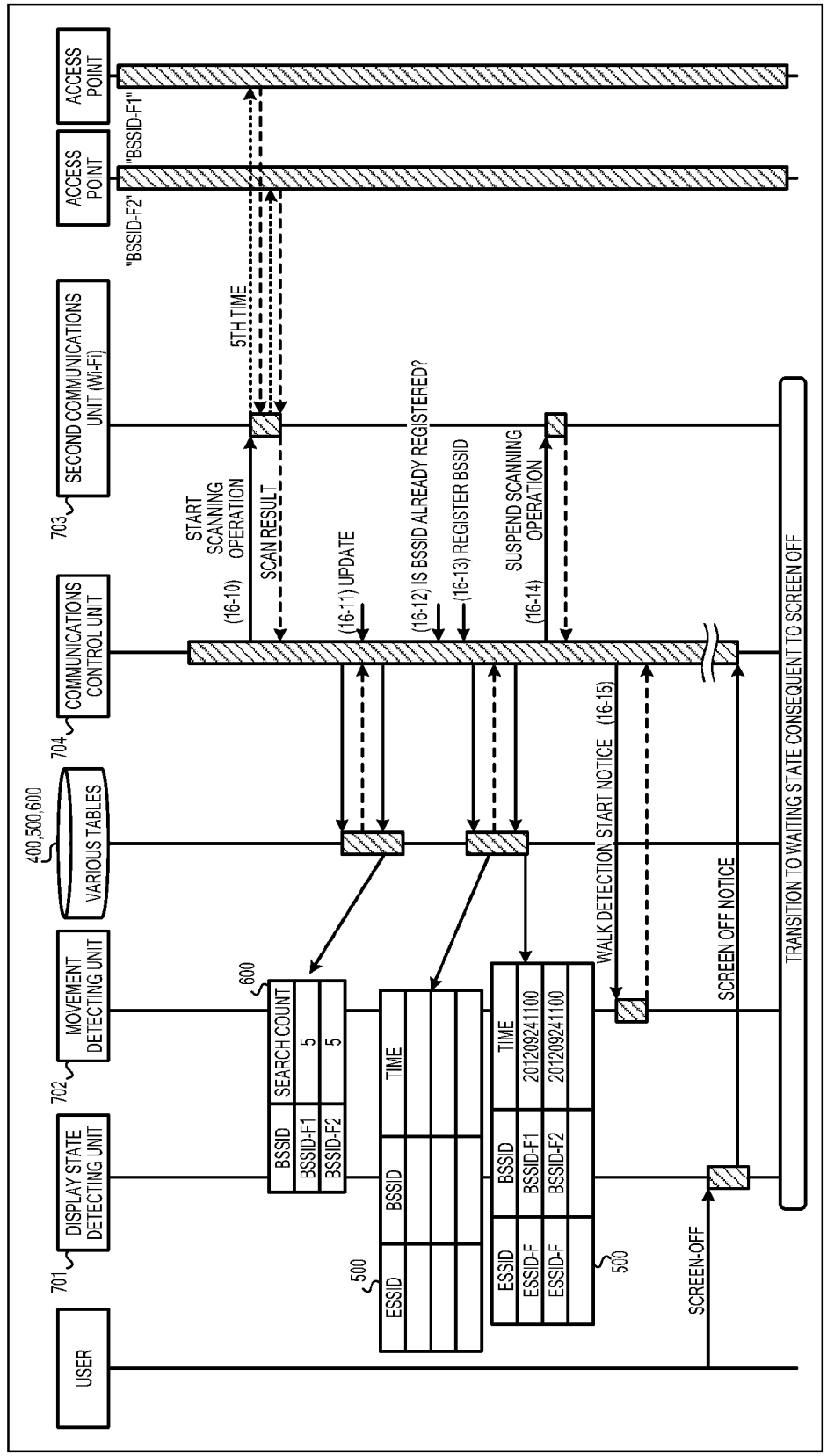

FIGS. 16 and 17 are explanatory views of a first control processing example of the mobile terminal device 101 according to the first embodiment. In FIG. 16, (16-1) the display state detecting unit 701 detects a transition from non-display to display in the display state of the display 303. In this case, a transition from non-display to display in the display state of the display 303 is detected as a result of switching, consequent to user operation, from non-display to display in the display state of the display 303.

(16-2) When detecting a transition from non-display to display in the display state of the display 303, the display state detecting unit 701 sends a screen ON notice to the communications control unit 704. The screen ON notice is a notice indicating a transition from non-display to display in the display state of the display 303.

(16-3) The communications control unit 704 controls the communications unit 703 to start the scanning operation to search for an access point APi (first time). In the example depicted in FIG. 16, execution of the scanning operation results in finding an access point whose BSSID is "BSSID-F1" and an access point whose BSSID is "BSSID-F2".

The communications control unit 704 reads the connection AP table 400 and determines whether an ESSID included in the scan result from the communications unit 703 is already registered in the connection AP table 400. If the ESSID is already registered, the communications control unit 704 controls the communications unit 603 to perform a connection process of connecting to the found AP. On the other hand, if the ESSID is not yet registered, the communications control unit 704 does not perform the connection process of connecting to the found AP.

The communications control unit 704 determines whether the obtained found AP is an access point that automatically establishes a connection with the mobile terminal device 101. If the found AP is an access point that automatically establishes a connection with the mobile terminal device 101, the communications control unit 704 controls the communications unit 704 to perform a connection process of connecting to the found AP.

On the other hand, if the found AP is not an access point that automatically establishes a connection with the mobile terminal device 101, the communications control unit 704 does not perform the connection process of connecting to the found AP. Cases are assumed where the ESSID of the found AP is not yet registered in the connection AP table 400 and where the found AP is not an access point that automatically establishes a connection with the mobile terminal device 101. In this case, the connection process of connecting to the found AP is not performed.

In the description hereinafter, an access point automatically establishing a connection with the mobile terminal device 101 may be referred to as "automatic connection AP".

(16-4) The communications control unit 704 updates the contents stored in the first management table 600. In this case, the BSSID "BSSID-F1" and the search count "1" are correlated and registered. The BSSID "BSSID-F2" and the search count "1" are correlated and registered.

(16-5) The communications control unit 704 reads the non-connection AP table 500 and determines whether the BSSID of the found AP is already registered in the non-connection AP table 500. If the BSSID of the found AP is already registered, the communications control unit 704 suspends the scanning operation of searching for an access point APi.

On the other hand, if the BSSID of the found AP is not yet registered, the communications control unit 704 continues the scanning operation of searching for an access point APi. In this case, since the BSSIDs "BSSID-F1" and "BSSID-F2" of the found AP are not yet registered in the non-connection AP table 500, the scanning operation of the access point APi is continued.

(16-6) If a period of time corresponding to the cycle T has elapsed since the start of the last scanning operation, the communications control unit 704 controls the communications unit 703 to start the scanning operation to search for an access point APi (second time). This scanning operation results in finding an access point of the BSSID "BSSID-F1" and an access point of the BSSID "BSSID-F2". Since the ESSID of the found AP is not yet registered in the connection AP table 400 and since the found AP is not an automatic connection AP, the connection process of connecting to the found AP is not performed.

(16-7) If a period of time corresponding to the cycle T has elapsed since the start of the last scanning operation, the communications control unit 704 controls the communications unit 703 to start the scanning operation to search for an access point APi (fourth time). This scanning operation results in finding the access point of the BSSID "BSSID-F1" and the access point of the BSSID "BSSID-F2". Since the ESSID of the found AP is not yet registered in the connection AP table 400 and since the found AP is not an automatic connection AP, the connection process of connecting to the found AP is not performed.

(16-8) The communications control unit 704 updates the contents stored in the first management table 600. In this case, the search count of the BSSID "BSSID-F1" is incremented to "4" and the search count of the BSSID "BSSID-F2" is incremented to "4".

(16-9) The communications control unit 704 reads the non-connection AP table 500 and determines whether the BSSID of the found AP is already registered in the non-connection AP table 500. In this case, since the BSSIDs "BSSID-F1" and "BSSID-F2" of the found APs are not yet registered in the non-connection AP table 500, the scanning operation of the access point APi is continued.

In FIG. 17, (16-10) if a period of time corresponding to the cycle T has elapsed since the start of the last scanning operation, the communications control unit 704 controls the communications unit 703 to start the scanning operation to search for an access point APi (fifth time). This scanning operation results in finding the access point of the BSSID "BSSID-F1" and the access point of the BSSID "BSSID-F2". Since the ESSID of the found AP is not yet registered in the connection AP table 400 and since the found AP is not an automatic connection AP, the connection process of connecting to the found AP is not performed.

(16-11) The communications control unit 704 updates the contents stored in the first management table 600. In this case, the search count of the BSSID "BSSID-F1" is incremented to "5" and the search count of the BSSID "BSSID-F2" is incremented to "5".

(16-12) The communications control unit 704 determines whether the BSSIDs "BSSID-F1" and "BSSID-F2" whose search count has reached or exceeded the given number of times N are already registered in the connection AP table 400. In this case, the BSSIDs "BSSID-F1" and "BSSID-F2" are not yet registered in the non-connection AP table 500.

(16-13) The communications control unit 704 registers into the non-connection AP table 500, the BSSIDs "BSSID-F1" and "BSSID-F2" whose search count has reached or exceeded the given number of times N. At this time, the communications control unit 704 registers into the non-connection AP table 500, not only the BSSID of the found AP but also the ESSID of the found AP and the registration time.

(16-14) The communications control unit 704 suspends the scanning operation of searching for an access point APi. The communications control unit 704 causes the state of the communications unit 703 to transition from an active state enabling the scanning operation of searching for an access point APi to a sleep state.

(16-15) The communications control unit 704 sends a walk detection start notice to the movement detecting unit 702. The walk detection start notice is a notice requesting the start of walk detection of the user of the mobile terminal device 101. This results in the start of movement detection of the mobile terminal device 101 by the movement detecting unit 702, i.e., a walk detection of the user.

Figure 18:
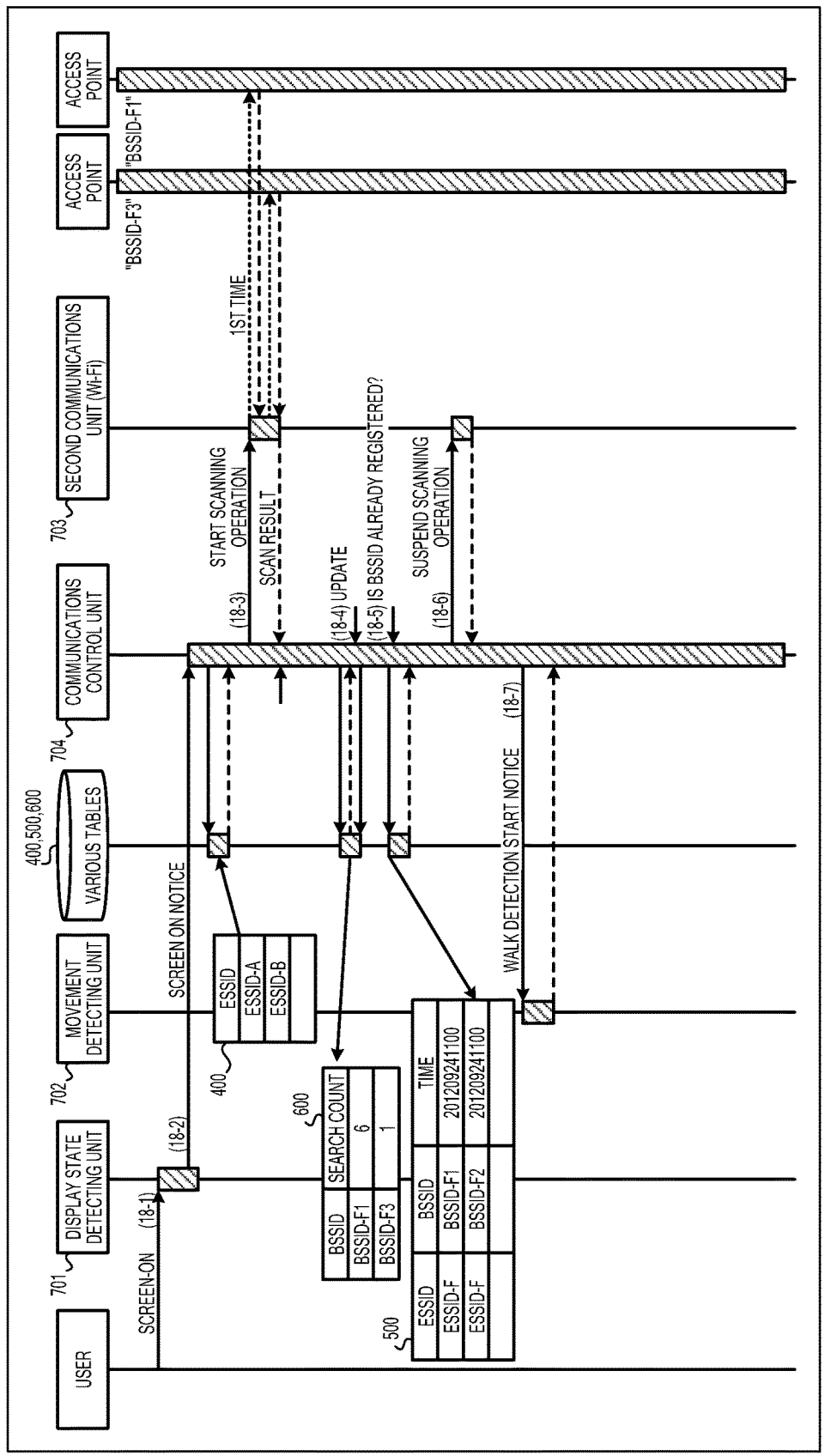
FIG. 18 is an explanatory view of a second control processing example of the mobile terminal device 101 according to the first embodiment.

FIG. 18 is an explanatory view of a second control processing example of the mobile terminal device 101 according to the first embodiment. In FIG. 18, (18-1) the display state detecting unit 701 detects a transition from non-display to display in the display state of the display 303. In this case, a transition from non-display to display in the display state of the display 303 is detected as a result of switching, consequent to user operation, from non-display to display in the display state of the display 303.

(18-2) When detecting a transition from non-display to display in the display state of the display 303, the display state detecting unit 701 sends a screen ON notice to the communications control unit 704.

(18-3) The communications control unit 704 controls the communications unit 703 to start the scanning operation of searching for an access point APi (first time). This scanning operation results in finding an access point of the BSSID "BSSID-F1" and an access point of the BSSID "BSSID-F3". Since the ESSID of the found AP is not yet registered in the connection AP table 400 and since the found AP is not an automatic connection AP, the connection process of connecting to the found AP is not performed.

(18-4) The communications control unit 704 updates the contents stored in the first management table 600. In this case, the search count of the BSSID "BSSID-F1" is incremented to "6" and the search count of the BSSID "BSSID-F3" is incremented to "1", the resulting incremented values being correlated and registered. In the current scanning operation, since the access point of the BSSID "BSSID-F2" is not found, the record of the BSSID "BSSID-F2" is deleted from the first management table 600.

(18-5) The communications control unit 704 determines whether the BSSID of the found AP is already registered in the non-connection AP table 500. In this case, the BSSID "BSSID-F1" of the found AP is registered in the non-connection AP table 500.

(18-6) The communications control unit 704 suspends the scanning operation of searching for an access point APi. The communications control unit 704 causes the state of the communications unit 703 to transition from the active state enabling the scanning operation of searching for an access point APi to the sleep state.

(18-7) The communications control unit 704 sends a walk detection start notice to the movement detecting unit 702. This results in the start of movement detection of the mobile terminal device 101 by the movement detecting unit 702, i.e., a walk detection of the user.

Figure 19:
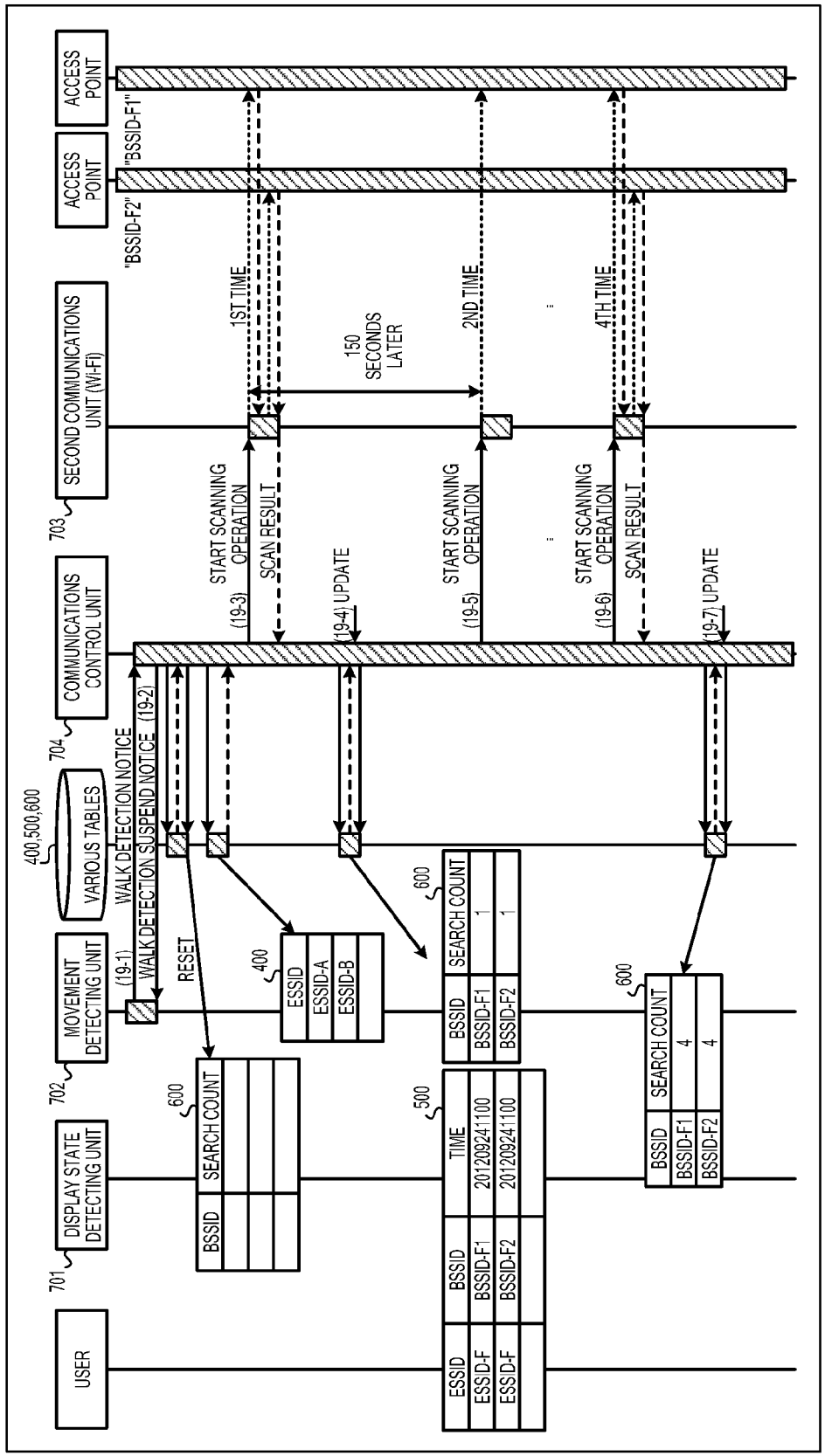
FIG. 19 is an explanatory view of a third control processing example of the mobile terminal device 101 according to the first embodiment.

FIG. 19 is an explanatory view of a third control processing example of the mobile terminal device 101 according to the first embodiment. In FIG. 19, (19-1) when detecting movement of the mobile terminal device 101, the movement detecting unit 702 sends a walk detection notice to the communications control unit 704. The walk detection notice is a notice indicating detection of movement of the mobile terminal device 101, i.e., walking of the user of the mobile terminal device 101.

(19-2) When receiving the walk detection notice, the communications control unit 704 sends a walk detection suspend notice to the movement detecting unit 702. The walk detection suspend notice is a notice requesting suspension of the walk detection of the user of the mobile terminal device 101. This results in a suspension of the movement detection of the mobile terminal device 101, i.e., the walk detection of the user, by the movement detecting unit 702.

When receiving the walk detection notice, the communications control unit 704 resets the contents stored in the first management table 600. This enables the counting of the search count to restart from the beginning each time walking by the user walk is detected. As a result, even though walking by the user may be detected often, the search count of the found AP can be prevented from exceeding the given number of times N consequent to the scanning operation being triggered by the walk detection of the user.

(19-3) When receiving the walk detection notice, the communications control unit 704 controls the communications unit 703 to start the scanning operation to search for an access point APi (first time). This scanning operation results in finding an access point of the BSSID "BSSID-F1" and an access point of the BSSID "BSSID-F2". Since the ESSID of the found AP is not yet registered in the connection AP table 400 and since the found AP is not an automatic connection AP, the connection process of connecting to the found AP is not performed.

(19-4) The communications control unit 704 updates the contents stored in the first management table 600. In this case, the BSSID "BSSID-F1" and the search count "1" are correlated and registered. Further, the BSSID "BSSID-F2" and the search count "1" are correlated and registered.

(19-5) If a period of time corresponding to the cycle T has elapsed since the start of the last scanning operation, the communications control unit 704 controls the communications unit 703 to start the scanning operation to search for an access point APi (second time). This scanning operation results in finding the access point of the BSSID "BSSID-F1" and the access point of the BSSID "BSSID-F2". Since the ESSID of the found AP is not yet registered in the connection AP table 400 and since the found AP is not an automatic connection AP, the connection process of connecting to the found AP is not performed.

(19-6) If a period of time corresponding to the cycle T has elapsed since the start of the last scanning operation, the communications control unit 704 controls the communications unit 703 to start the scanning operation to search for an access point APi (fourth time). This scanning operation results in finding the access point of the BSSID "BSSID-F1" and the access point of the BSSID "BSSID-F2". Since the ESSID of the found AP is not yet registered in the connection AP table 400 and since the found AP is not an automatic connection AP, the connection process of connecting to the found AP is not performed.

(19-7) The communications control unit 704 updates the contents stored in the first management table 600. In this case, the search count of the BSSID "BSSID-F1" is incremented to "4" and the search count of the BSSID "BSSID-F2" is incremented to "4".

A control procedure of the mobile terminal device 101 according to the first embodiment will be described. "N=5" is given as the given number of times N to be compared with the search count of an access point APi.

Figure 20:
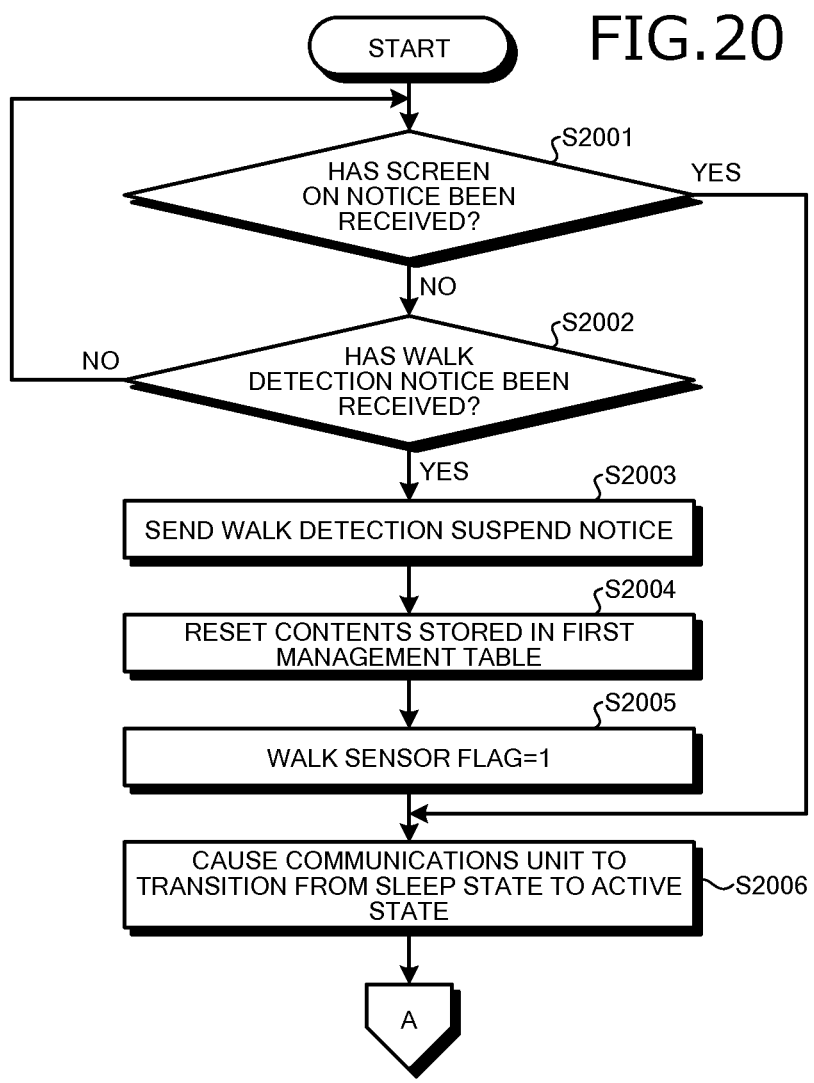
FIGS. 20, 21, and 22 are flowcharts of an example of a first control procedure of the mobile terminal device 101 according to the first embodiment.
Figure 21:
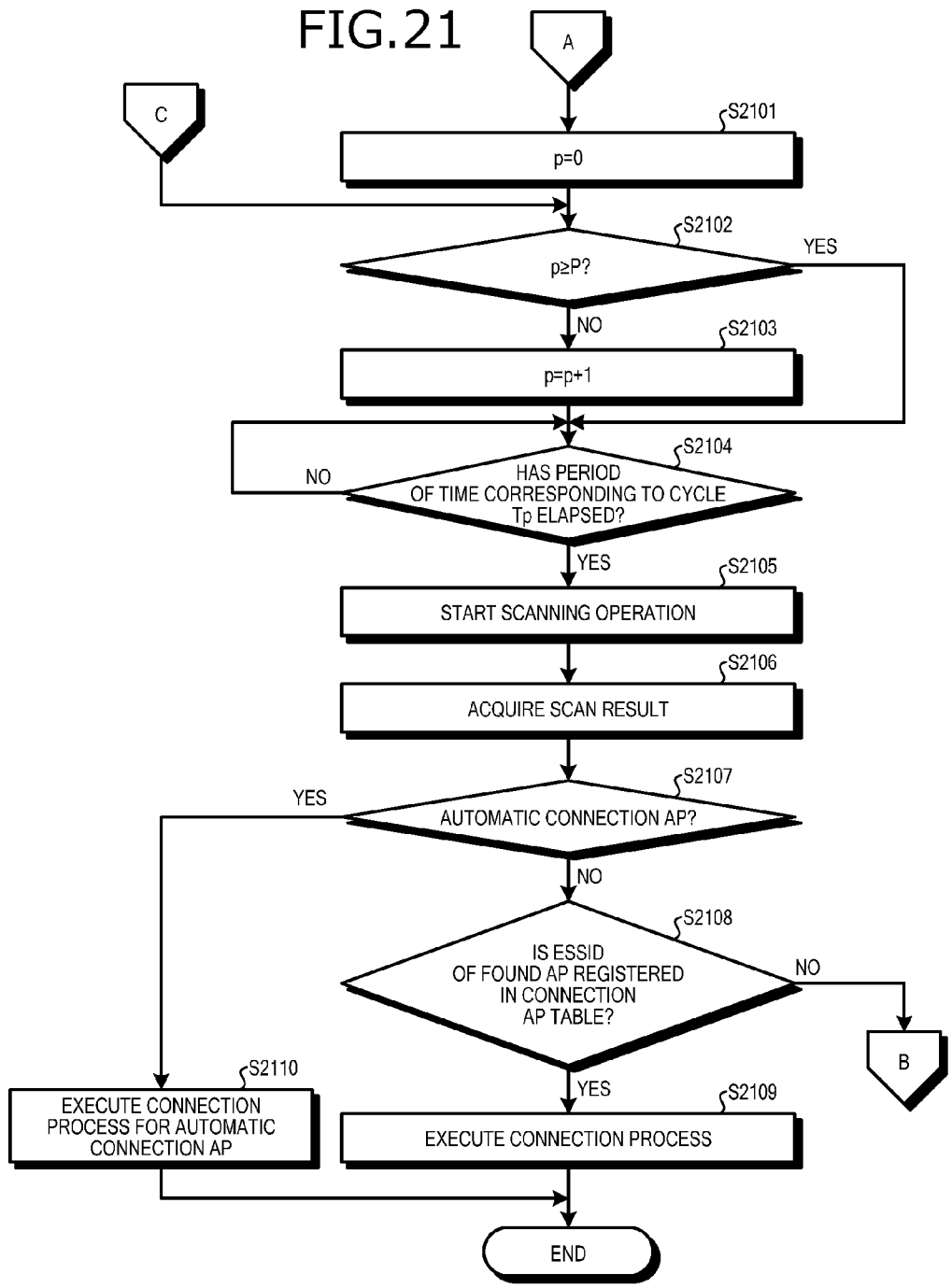
Figure 22:
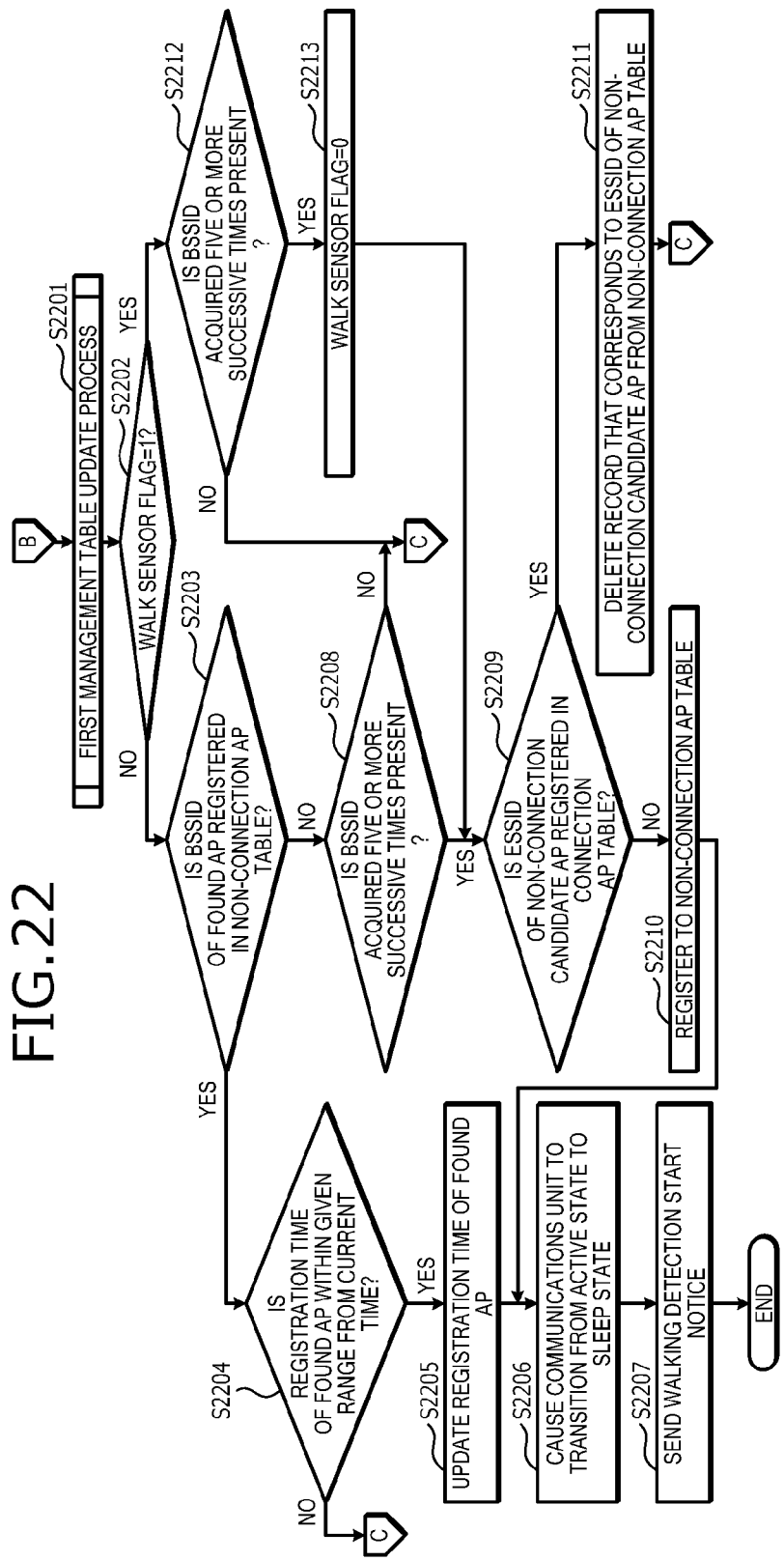

FIGS. 20, 21, and 22 are flowcharts of an example of a first control procedure of the mobile terminal device 101 according to the first embodiment. In the flowchart depicted in FIG. 20, the communications control unit 704 first determines whether a screen ON notice has been received from the display state detecting unit 701 (step S2001).

If a screen ON notice has been received (step S2001: YES), the communications control unit 704 proceeds to step S2006. On the other hand, if no screen ON notice has been received (step S2001: NO), the communications control unit 704 determines whether a walk detection notice has been received from the movement detecting unit 702 (step S2002).

If no walk detection notice has been received (step S2002: NO), the communications control unit 704 returns to step S2001. On the other hand, if a walk detection notice has been received (step S2002: YES), the communications control unit 704 sends a walk detection suspend notice to the movement detecting unit 702 (step S2003).

The communications control unit 704 then resets the contents stored in the first management table 600 (step S2004) and sets a walk sensor flag to "1" (step S2005). The walk sensor flag is information that indicates whether walking by the user has been detected. In the initial state, the walk sensor flag is set to "0", which is stored in the memory 302.

The communications control unit 704 then causes the communications unit 703 to transition from the sleep state to the active state (step S2006), and proceeds to step S2101 depicted in FIG. 21.

In the flowchart depicted in FIG. 21, the communications control unit 704 first sets "p" of a cycle Tp to "p=0" (step S2101) and determines if "p" has reached or exceeded "P" (step S2102). If "p" has reached or exceeded "P" (step S2102: YES), the communications control unit 704 proceeds to step S2104.

On the other hand, if "p" is less than "P" (step S2102: NO), the communications control unit 704 increments "p" of the cycle Tp (step S2103) and determines whether a period of time corresponding to the cycle Tp has elapsed (step S2104). The communications control unit 704 waits until a period of time corresponding to the cycle Tp has elapsed (step S2104: NO).

When a period of time corresponding to the cycle Tp has elapsed (step S2104: YES), the communications control unit 704 controls the communications unit 703 to start the scanning operation of searching for an access point APi (step S2105). The communications control unit 704 then acquires a scan result from the communications unit 703 (step S2106).

The communications control unit 704 determines whether the found AP is an automatic connection AP (step S2107). If the found AP is not an automatic connection AP (step S2107: NO), the communications control unit 704 determines whether the ESSID of the found AP is already registered in the connection AP table 400 (step S2108).

If the ESSID of the found AP is already registered (step S2108: YES), the communications control unit 704 executes a connection process of connecting to the found AP (step S2109) and terminates a series of operations according to the flowchart. On the other hand, if the ESSID of the found AP is not yet registered (step S2108: NO), the communications control unit 704 proceeds to step S2201 depicted in FIG. 22.

If the found AP is an automatic connection AP at step S2107 (step S2107: YES), the communications control unit 704 executes a connection process for the automatic connection AP (step S2110) and terminates a series of operations according to the flowchart.

The connection process for the automatic connection AP is a process of automatically connecting to the network 210 via the access point APi without a registration procedure or an authentication procedure performed by a user. The authentication process in this case is automatically executed by the mobile terminal device 101 or the access point APi, for example.

In the flowchart depicted in FIG. 22, the communications control unit 704 executes a first management table update process of updating the contents stored in the first management table 600 (step S2201). The communications control unit 704 determines whether the walking sensor flag is set to "1" (step S2202).

If the walking sensor flag is set to "0" (step S2202: NO), the communications control unit 704 determines whether the BSSID of the found AP is registered in the non-connection AP table 500 (step S2203). If the BSSID of the found AP is registered (step S2203: YES), the communications control unit 704 refers to the non-connection AP table 500 and determines whether the registration time of the found AP is within a given range from the current time (step S2204).

If the registration time of the found AP is outside the given range (step S2204: NO), the communications control unit 704 proceeds to step S2102 depicted in FIG. 21. On the other hand, if the registration time of the found AP is within the given range (step S2204: YES), the communications control unit 704 updates the registration time of the found AP in the non-connection AP table 500 to the current time (step S2205).

The communications control unit 704 causes the communications unit 703 to transition from the active state to the sleep state (step S2206). The communications control unit 704 sends a walking detection start notice to the movement detection unit 702 (step S2207) and terminates a series of operations according to the flowchart.

If the BSSID of the found AP is not registered at S2203 (step S2203: NO), the communications control unit 704 refers to the first management table 600 and determines whether a BSSID acquired five or more successive times is present (step S2208). If a BSSID acquired five or more successive times is not present (step S2208: NO), the communications control unit 704 proceeds to step S2102 depicted in FIG. 21.

In the description hereinafter, an access point having a BSSID acquired successively a given number of times N or more (in this case, N=5) may be referred to as a "non-connection candidate AP".

On the other hand, if a BSSID acquired five or more successive times is present (step S2208: YES), the communications control unit 704 determines whether the ESSID of the non-connection candidate AP is registered in the connection AP table 400 (step S2209).

If the ESSID of the non-connection candidate AP is not registered (step S2209: NO), the communications control unit 704 registers the ESSID, BSSID, and registration time of the non-connection candidate AP to the non-connection AP table 500 (step S2210) and proceeds to step S2206.

On the other hand, if the ESSID of the non-connection candidate AP is registered (step S2209: YES), the communications control unit 704 deletes the record that corresponds to the ESSID of the non-connection candidate AP from the non-connection AP table 500 (step S2211) and proceeds to step S2102 depicted in FIG. 21.

If the walking sensor flag is set to "1" at step S2202 (step S2202: YES), the communications control unit 704 refers to the first management table 600 and determines whether a BSSID acquired five or more successive times is present (step S2212). If a BSSID acquired five or more successive times is not present (step S2212: NO), the communications control unit 704 proceeds to step S2102 depicted in FIG. 21.

On the other hand, if a BSSID acquired five or more successive times is present (step S2212: YES), the communications control unit 704 sets the walking sensor flag to "0" (step S2213) and proceeds to step S2209.

As a result, if the access point APi of the same BSSID is found N successive times, the scanning operation of searching for an access point APi can be suspended.

A specific procedure of the first management table update process depicted at step S2201 in FIG. 22 will be described.

Figure 23:
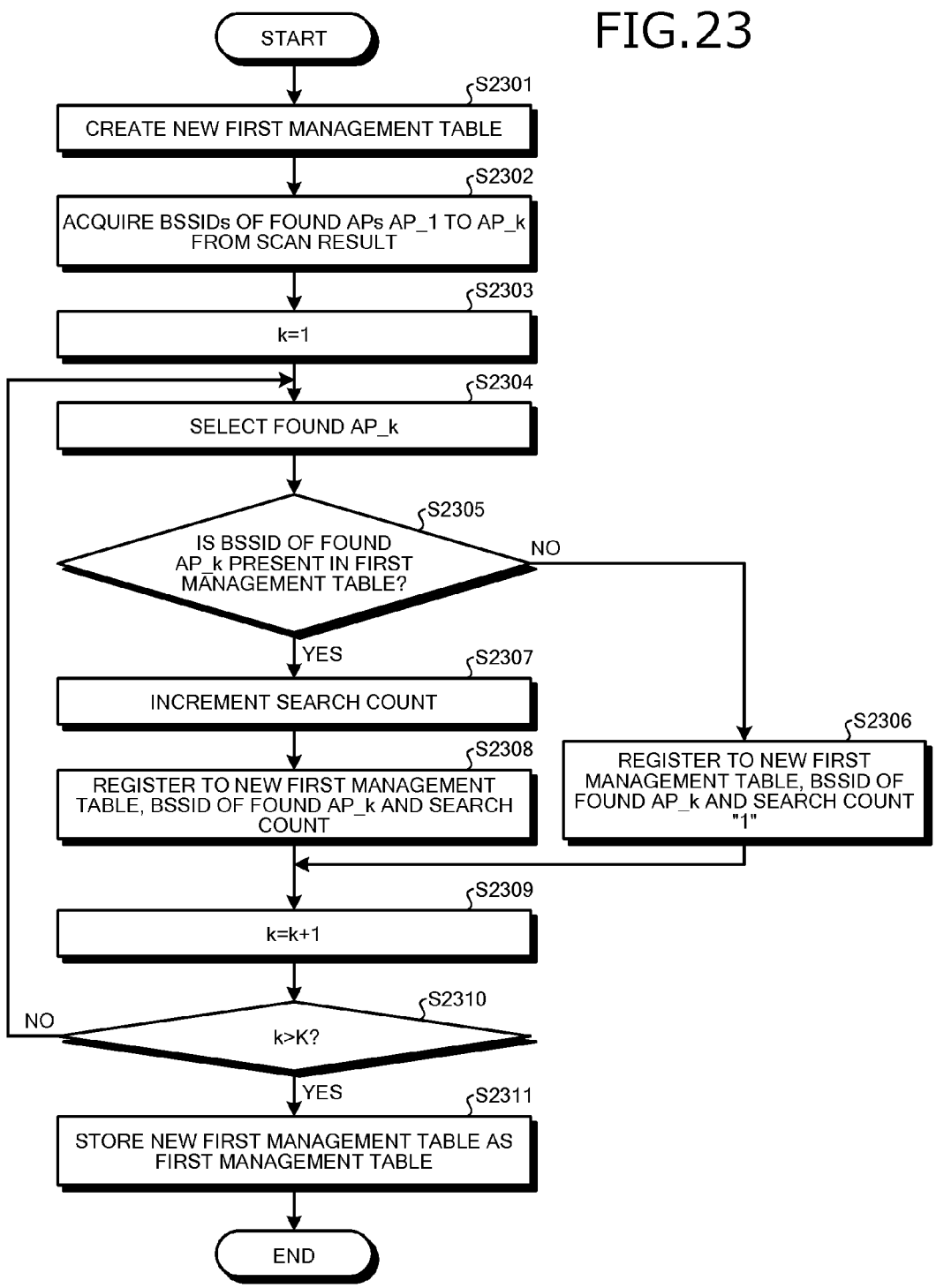
FIG. 23 is a flowchart of an example of a specific procedure of a first management table update process.

FIG. 23 is a flowchart of an example of a specific procedure of the first management table update process. In the flowchart depicted in FIG. 23, the communications control unit 704 creates a new first management table (step S2301). The new first management table is the first management table 600 without storage contents.

The communications control unit 704 acquires the BSSIDs of the found APs AP_1 to AP_K from the scan result acquired at step S2106 depicted in FIG. 21 (step S2302), where K is a natural number of one or more.

The communications control unit 704 sets "k=1" (step S2303), and selects a found AP_k from among the found Aps, AP_1 to AP_K (step S2304). The communications control unit 704 determines whether the BSSID of the found AP_k is present in the first management table 600 (step S2305).

If the BSSID of the found AP_k is not present (step S2305: NO), the communications control unit 704 correlates and registers to the new first management table, the BSSID of the found AP_k and a search count "1" (step S2306) and proceeds to step S2309.

On the other hand, if the BSSID of the found AP_k is present (step S2305: YES), the communications control unit 704 increments the search count that corresponds to the BSSID of the found AP_k (step S2307). The communications control unit 704 correlates and registers to the new first management table, the BSSID of the found AP_k and the search count (step S2308).

The communications control unit 704 increments "k" (step S2309) and determines whether "k" exceeds "K" (step S2310). If "k" is equal to or less than "K" (step S2310: NO), the communications control unit 704 returns to step S2304.

On the other hand, if "k" exceeds "K" (step S2310: YES), the communications control unit 704 stores the new first management table as the first management table 600 (step S2311), terminates a series of operations according to the flowchart, and returns to the step at which the first management table update process is called.

As a result, the number of times that a found AP successively found can be managed. If the BSSID of a found AP is not included in the scan result, the communications control unit 704 terminates a series of operations of the flowchart and returns to the step at which the first management table update process is called.

A non-connection AP table update procedure of the mobile terminal device 101 according to the first embodiment will be described.

Figure 24:
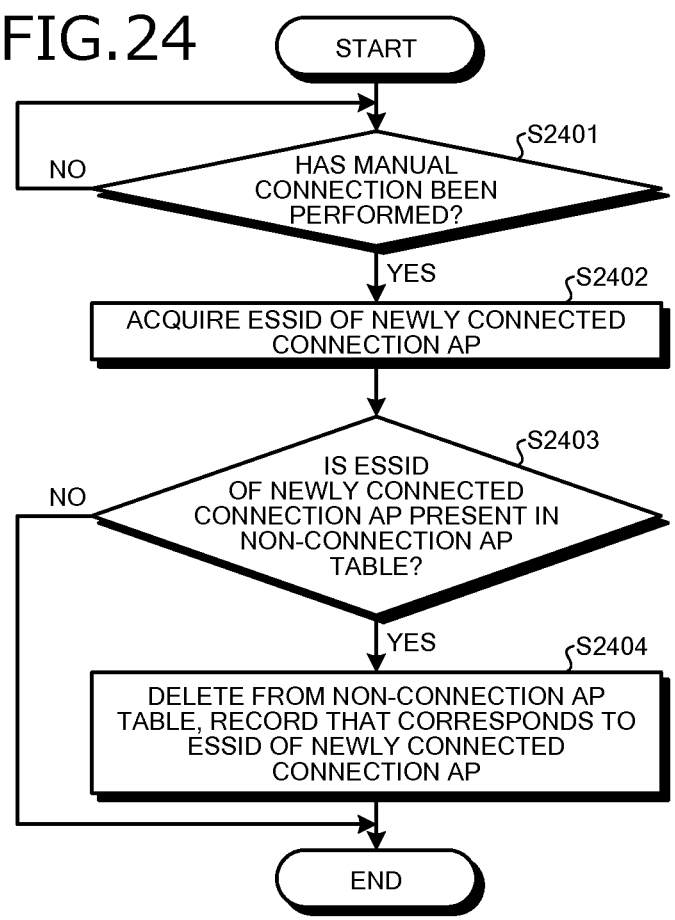
FIG. 24 is a flowchart of an example of a non-connection AP table update procedure of the mobile terminal device 101 according to the first embodiment.

FIG. 24 is a flowchart of an example of the non-connection AP table update procedure of the mobile terminal device 101 according to the first embodiment. In the flowchart depicted in FIG. 24, the mobile terminal device 101 determines whether manual connection to the access point APi has been performed by user operation (step S2401).

The mobile terminal device 101 waits until manual connection to the access point APi is performed (step S2401: NO). When manual connection to the access point APi is performed (step S2401: YES), the mobile terminal device 101 acquires the ESSID of the newly connected connection AP (step S2402).

The mobile terminal device 101 determines whether the ESSID of the newly connected connection AP is present in the non-connection AP table 500 (step S2403). If the ESSID of the newly connected connection AP is not present (step S2403: NO), the mobile terminal device 101 terminates a series of operations according to the flowchart.

On the other hand, if the ESSID of the newly connected connection AP is present (step S2403: YES), the mobile terminal device 101 deletes from the non-connection AP table 500, the record that corresponds to the ESSID of the newly connected connection AP (step S2404) and terminates a series of operations according to the flowchart.

As a result, the BSSID of the newly available access point APi can be deleted from the non-connection AP table 500.

Although the mobile terminal device 101 registers to the non-connection AP table 500, the BSSID of a found AP found N or more successive times, configuration is not limited hereto. For example, the mobile terminal device 101 may register to the non-connection AP table 500, the BSSID of the found AP found continuously for a given period R.

Description will be made of specific process details of the communications control unit 704 registering to the non-connection AP table 500, the BSSID of a found AP found continuously for the given period R.

First, the communications control unit 704 saves search count information in which the BSSID of a found AP is correlated with the search time at which the communications unit 703 found the found AP. Specifically, for example, the communications control unit 704 registers to a second management table 2500 (refer to FIG. 25 described hereinafter), search time information that indicates the BSSID of the found AP and the search time at which the found AP is found in a correlated manner.

Figure 25:
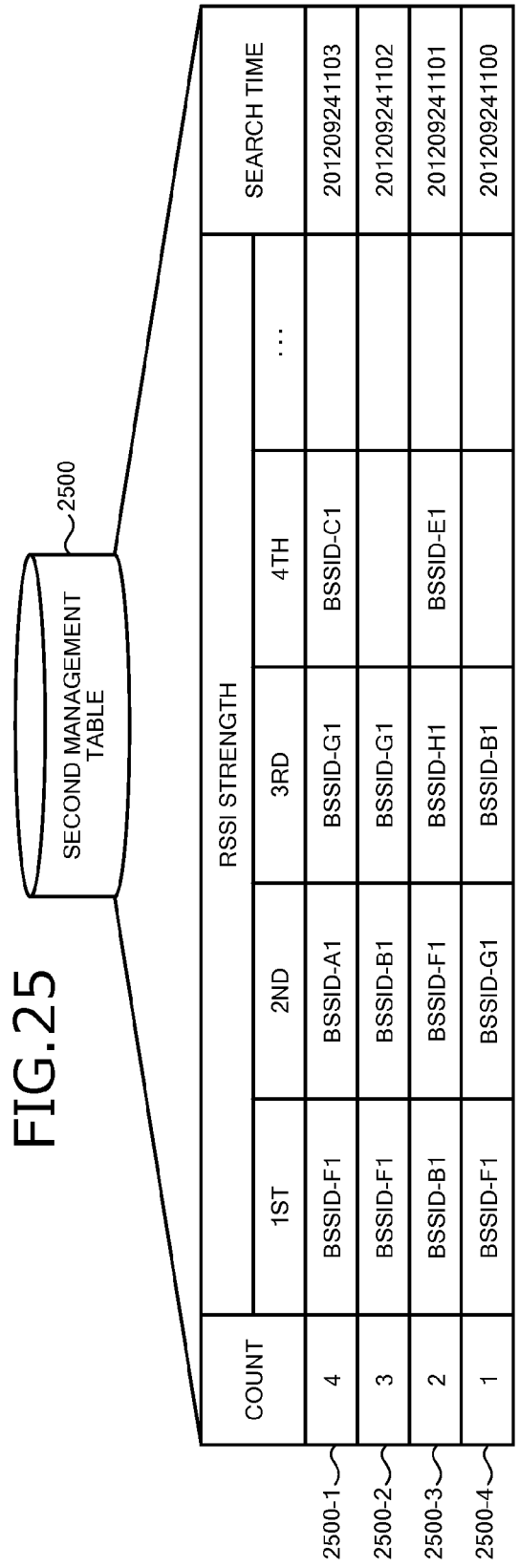
FIG. 25 is an explanatory diagram of an example of the contents stored in a second management table 2500.

FIG. 25 is an explanatory diagram of an example of the contents stored in the second management table 2500. In FIG. 25, the second management table 2500 has count, BSSID, and search time fields, and the search time information (e.g., search time information 2500-1 to 2500-4) is stored as records by setting information in the fields.

In the count field, a count is set that identifies the number of times the scanning operation has been performed when the scan result is acquired. In the BSSID field, the BSSIDs of the found APs are set in descending order of the RSSI strength. In the search time field, the time is set at which the found APs are found, for example, the time at which the communications control unit 704 acquires the scan result from the communications unit 703.

Taking the search time information 2500-4 as an example, the BSSIDs of the found APs found by the first scanning operation are indicated in descending order of the RSSI strength. The search time of the found APs found by the first scanning operation is also indicated. Although not depicted, the ESSID of the access point APi is stored in correlation with the BSSID of the access point APi in the second management table 2500.

The communications control unit 704 registers the BSSID of the search time information to the non-connection AP table 500 according to the search time correlated with the BSSID of the search time information. Specifically, for example, the communications control unit 704 refers to the second management table 2500 to register to the non-connection AP table 500, the BSSID of the found AP found by the communications unit 703 continuously for a given period R.

The given period R can arbitrarily be set. For example, the given period R is set to a value (e.g., 3 [minutes], 5 [minutes]) from which it can be determined that the user of the mobile terminal device 101 is not moving if the found AP of the same BSSID is found continuously for the given period R.

More specifically, for example, the communications control unit 704 may correlate and register to the non-connection AP table 500, the BSSID acquired continuously for the given period R, the ESSID that corresponds to the BSSID, and the registration time. As a result, the scanning operation can be suspended in a situation where the possibility of connecting to the access point APi is low, so as to suppress power consumed for the scanning operation of searching the access point APi.

Description will hereinafter be made of an operation example of the mobile terminal device 101 registering to the non-connection AP table 500, the BSSID of the found AP found continuously for the given period R with reference to FIG. 26. It is noted that the given period R is "R=3 [minutes]".

Figure 26:
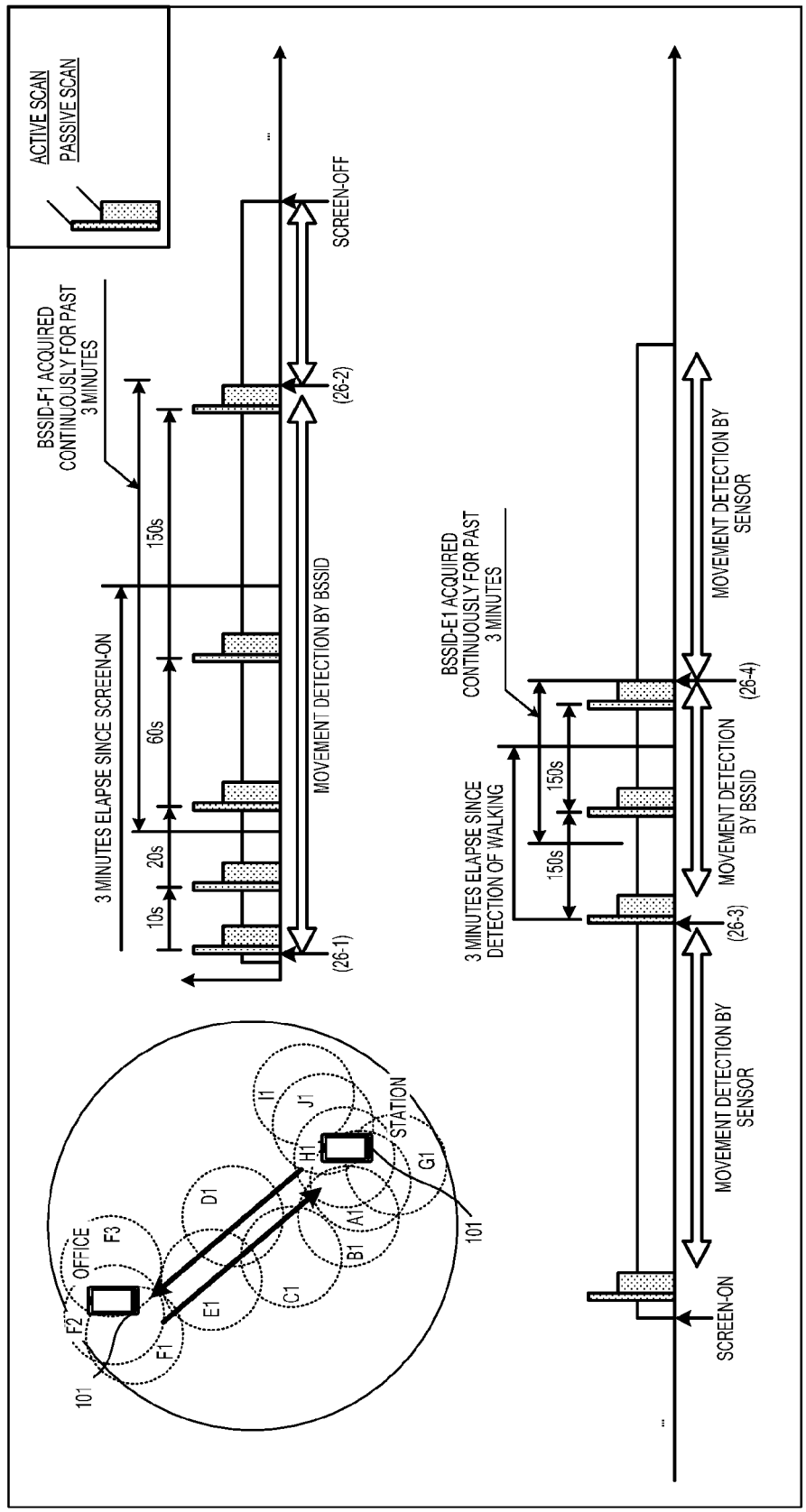
FIG. 26 is an explanatory diagram of a fourth operation example of the mobile terminal device 101 according to the first embodiment.

FIG. 26 is an explanatory diagram of a fourth operation example of the mobile terminal device 101 according to the first embodiment. (26-1) If the display state of the display 303 transitions from non-display to display, the mobile terminal device 101 starts a periodic operation of searching for an access point APi. In the example depicted in FIG. 26, as a result of the scanning operation repeated at the cycles T of 10 [s], 20 [s], 60 [s], and 150 [s], an access point of the BSSID "BSSID-F1" is found continuously for three minutes (R=3 [minutes]).

(26-2) Since the access point of the BSSID "BSSID-F1" is found continuously for three minutes, the mobile terminal device 101 suspends the scanning operation of searching for an access point APi. The mobile terminal device 101 registers to the non-connection AP table 500, the BSSID "BSSID-F1" of the access point found continuously for three minutes.

It is assumed that after (26-2) described above, the display state of the display 303 transitions from display to non-display and that the display state of the display 303 then transitions from non-display to display. It is also assumed that as a result of starting the periodic scanning operation of searching for an access point APi, an access point of a BSSID registered in the non-connection AP table 500 is subsequently found and that the scanning operation of searching for an access point APi is suspended.

(26-3) If the mobile terminal device 101 detects movement thereof, the mobile terminal device 101 starts the periodic scanning operation of searching for an access point APi. In the example depicted in FIG. 26, as a result of the scanning operation being repeated at the cycle T of 150 [s], an access point of the BSSID "BSSID-E1" is found continuously for three minutes (R=3 [minutes]).

(26-4) Since the access point of the BSSID "BSSID-E1" is found continuously for three minutes, the mobile terminal device 101 suspends the scanning operation of searching for an access point APi. The mobile terminal device 101 registers to the non-connection AP table 500, the BSSID "BSSID-E1" of the access point found continuously for three minutes.

In the example depicted in FIG. 26, the time point three minutes before the time point of the first scanning operation performed after the elapse of three minutes from screen-on (or walking detection) is used as the starting point to register to the non-connection AP table 500, the BSSID of the access point APi found continuously for three minutes; however, configuration is not limited hereto. For example, the mobile terminal device 101 uses the screen-on (or walking detection) as the starting point to register the BSSID of the access point APi found continuously for three minutes to the non-connection AP table 500.

Description will hereinafter be made of a control process example of the mobile terminal device 101 registering to the non-connection AP table 500, the BSSID of the found AP found continuously for the given period R. It is noted that the given period R is "R=3 [minutes]".

Figure 27:
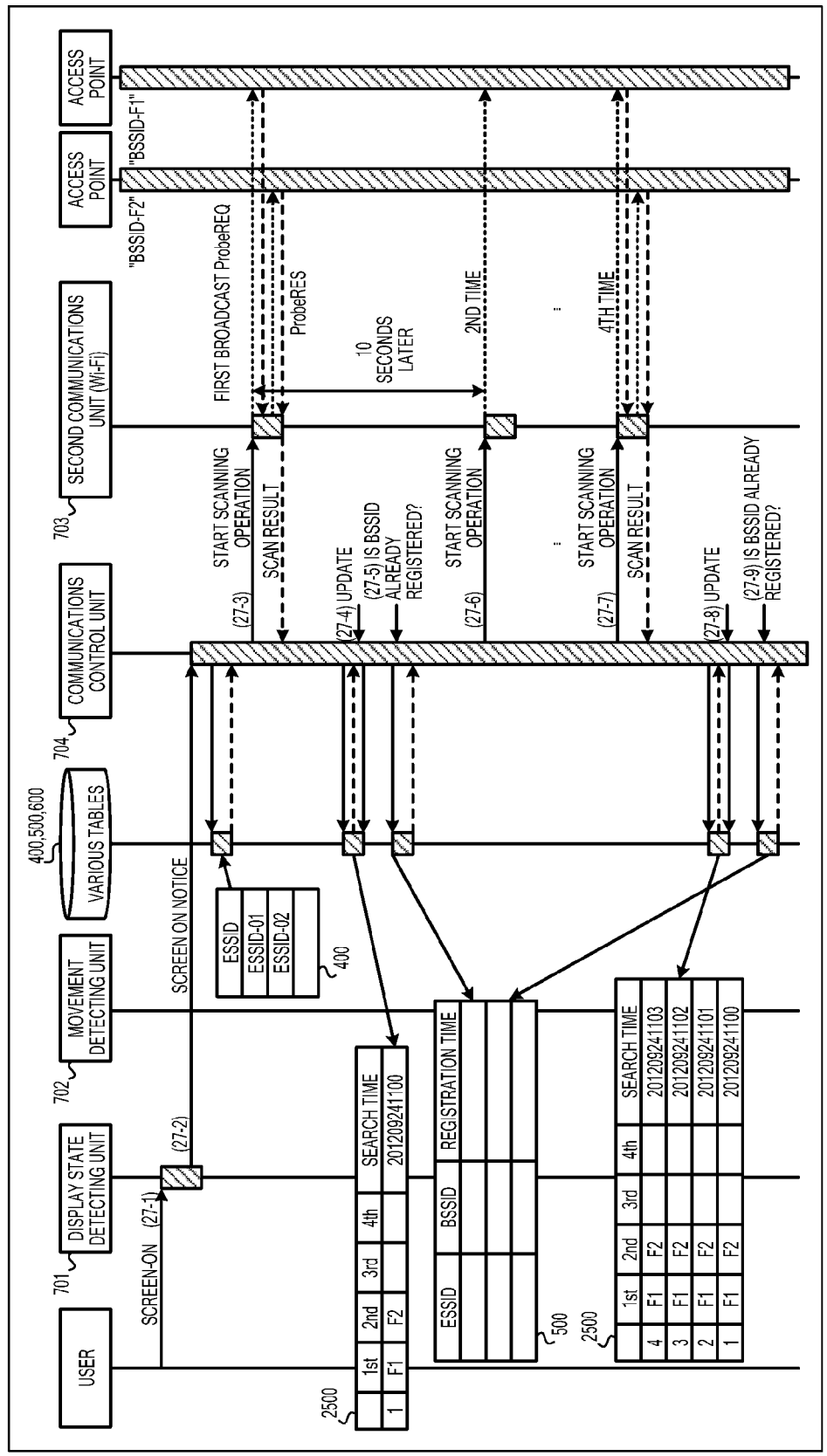
FIGS. 27 and 28 are explanatory diagrams of a fourth control process example of the mobile terminal device 101 according to the first embodiment.
Figure 28:
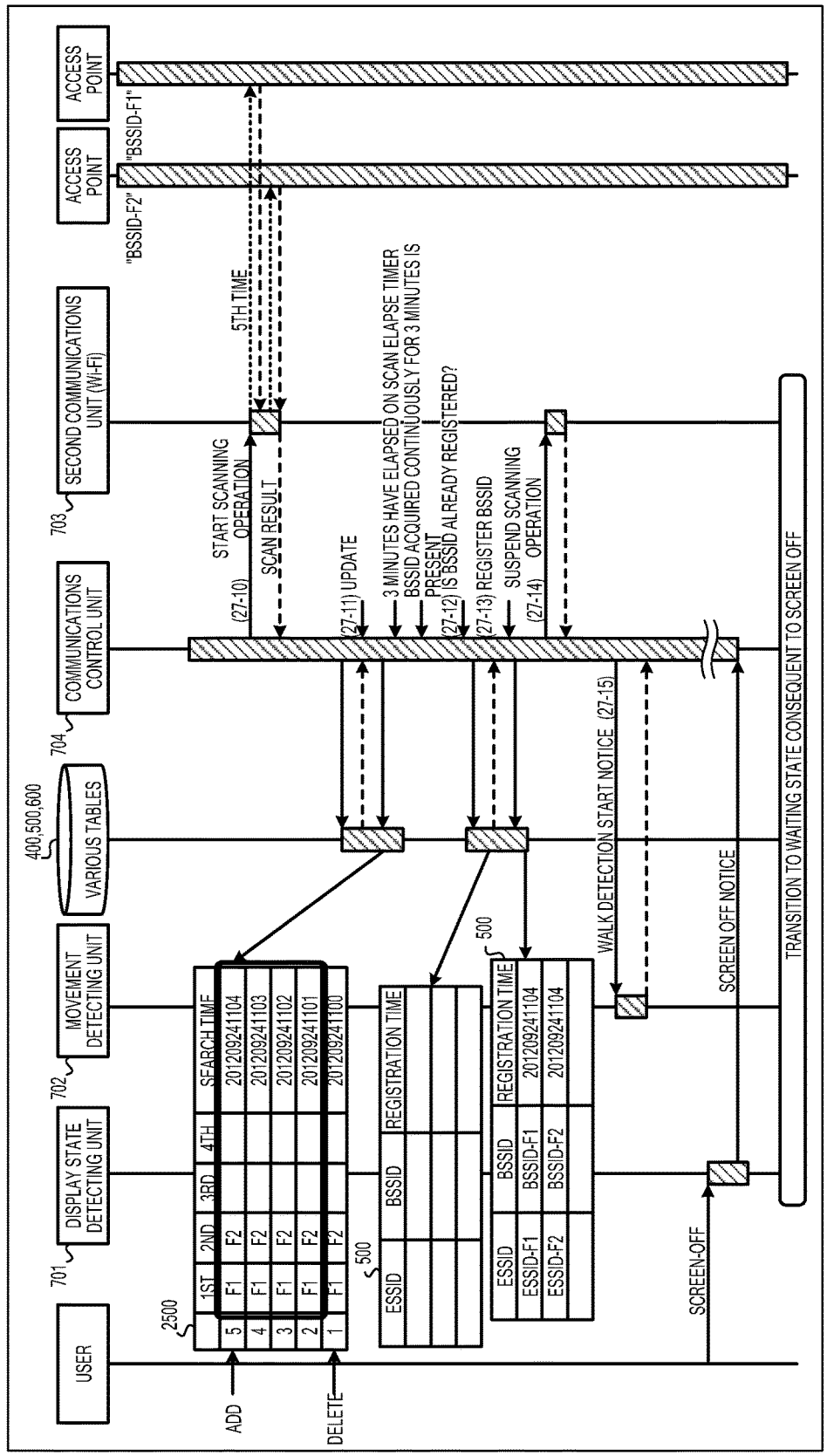

FIGS. 27 and 28 are explanatory diagrams of a fourth control process example of the mobile terminal device 101 according to the first embodiment. In FIG. 27, (27-1) the display state detecting unit 701 detects that the display state of the display 303 transitions from non-display to display. In this example, as a result of a switching of the display state of the display 303 from non-display to display consequent to user operation, it is detected that the display state of the display 303 transitions from non-display to display.

(27-2) Upon detecting that the display state of the display 303 has transitioned from non-display to display, the display state detecting unit 701 sends a screen ON notice to the communications control unit 704. The screen ON notice is a notice indicating the transition of the display state of the display 303 from non-display to display.

(27-3) Upon receiving the screen ON notice, the communications control unit 704 starts a scan elapse timer. The scan elapse timer is a timer that measures the time that elapses since the receipt of the screen ON notice or a walking detection notice. Upon receiving the screen ON notice, the communications control unit 704 controls the communications unit 703 to start the scanning operation of searching for an access point APi (first time).

In the example depicted in FIG. 27, as a result of performing the scanning operation, an access point with the BSSID of "BSSID-F1" and an access point with the BSSID of "BSSID-F2" are found. Since the ESSIDs of the found APs are not registered in the connection AP table 400 and the found APs are not automatic connections AP, the connection process of connecting to the found APs is not executed.

(27-4) The communications control unit 704 updates the contents stored in the second management table 2500. In this case, the BSSID "BSSID-F1" and the BSSID "BSSID-F2" of the found APs and the search time "201209241100" are correlated and registered. In FIGS. 27 and 28, the BSSIDs of the found APs in the second management table 2500 are partially depicted.

(27-5) The communications control unit 704 reads the non-connection AP table 500 and determines whether the BSSIDs of the found APs are registered in the non-connection AP table 500. In this case, since the BSSIDs "BSSID-F1" and "BSSID-F2" of the found APs are not registered in the non-connection AP table 500, the scanning operation of searching for an access point APi is continued. At this time point, three minutes have not elapsed on the scan elapse timer.

(27-6) If a period of time corresponding to the cycle T has elapsed since the start of the previous scanning operation, the communications control unit 704 controls the communications unit 703 to start the scanning operation of searching for an access point APi (second time). In this case, as a result of performing the scanning operation, the access point with the BSSID of "BSSID-F1" and the access point with the BSSID of "BSSID-F2" are found. Since the ESSIDs of the found APs are not registered in the connection AP table 400 and the found APs are not automatic connection APs, the connection process of connecting to the found APs is not executed.

(27-7) If a period of time corresponding to the cycle T has elapsed since the start of the previous scanning operation, the communications control unit 704 controls the communications unit 703 to start the scanning operation of searching for an access point APi (fourth time). In this case, as a result of performing the scanning operation, the access point with the BSSID of "BSSID-F1" and the access point with the BSSID of "BSSID-F2" are found. Since the ESSIDs of the found APs are not registered in the connection AP table 400 and the found APs are not automatic connection APs, the connection process of connecting to the found APs is not executed.

(27-8) The communications control unit 704 updates the contents stored in the second management table 2500. In this case, the BSSID "BSSID-F1" and the BSSID "BSSID-F2" of the found APs and the search time "201209241103" are correlated and registered.

(27-9) The communications control unit 704 reads the non-connection AP table 500 and determines whether the BSSIDs of the found APs are registered in the non-connection AP table 500. In this case, since the BSSIDs "BSSID-F1" and "BSSID-F2" of the found APs are not registered in the non-connection AP table 500, the scanning operation of searching for an access point APi is continued. At this time point, three minutes have not elapsed on the scan elapse timer.

It is assumed that three minutes have elapsed on the scan elapse timer between the fourth scanning operation and the fifth scanning operation.

In FIG. 28, (27-10) if a period of time corresponding to the cycle T has elapsed since the start of the previous scanning operation, the communications control unit 704 controls the communications unit 703 to start the scanning operation of searching for an access point APi (fifth time). In this case, as a result of performing the scanning operation, the access point with the BSSID of "BSSID-F1" and the access point with the BSSID of "BSSID-F2" are found. Since the ESSIDs of the found APs are not registered in the connection AP table 400 and the found APs are not automatic connection APs, the connection process of connecting to the found APs is not executed.

(27-11) The communications control unit 704 updates the contents in the second management table 2500. In this case, the BSSID "BSSID-F1" and the BSSID "BSSID-F2" of the found APs and the search time "201209241104" are correlated and registered. The records before the time point preceding the current time point by the given period R are deleted.

As a result, the BSSID "BSSID-F1" and the BSSID "BSSID-F2" acquired continuously for three minutes exist.

(27-12) The communications control unit 704 determines whether the BSSID "BSSID-F1" and the BSSID "BSSID-F2" acquired continuously for three minutes are registered in the non-connection AP table 500. In this example, the BSSID "BSSID-F1" and the BSSID "BSSID-F2" are not registered in the non-connection AP table 500.

(27-13) The communications control unit 704 registers to the non-connection AP table 500, the BSSID "BSSID-F1" and the BSSID "BSSID-F2" of the found APs acquired continuously for three minutes. In this case, the communications control unit 704 registers the ESSIDs of the found APs and the registration time to the non-connection AP table 500 along with the BSSIDs of the found APs.

(27-14) The communications control unit 704 suspends the scanning operation of searching for an access point APi. The communications control unit 704 causes the communications unit 703 to transition from the active state enabling the scanning operation of searching for an access point APi to the sleep state.

(27-15) The communications control unit 704 sends a walking detection start notice to the movement detecting unit 702. This causes the movement detecting unit 702 to start detecting for movement of the mobile terminal device 101, i.e., detecting walking by the user.

A second control procedure of the mobile terminal device 101 according to the first embodiment will be described. It is noted that the given period R is "R=3 [minutes]".

Figure 29:
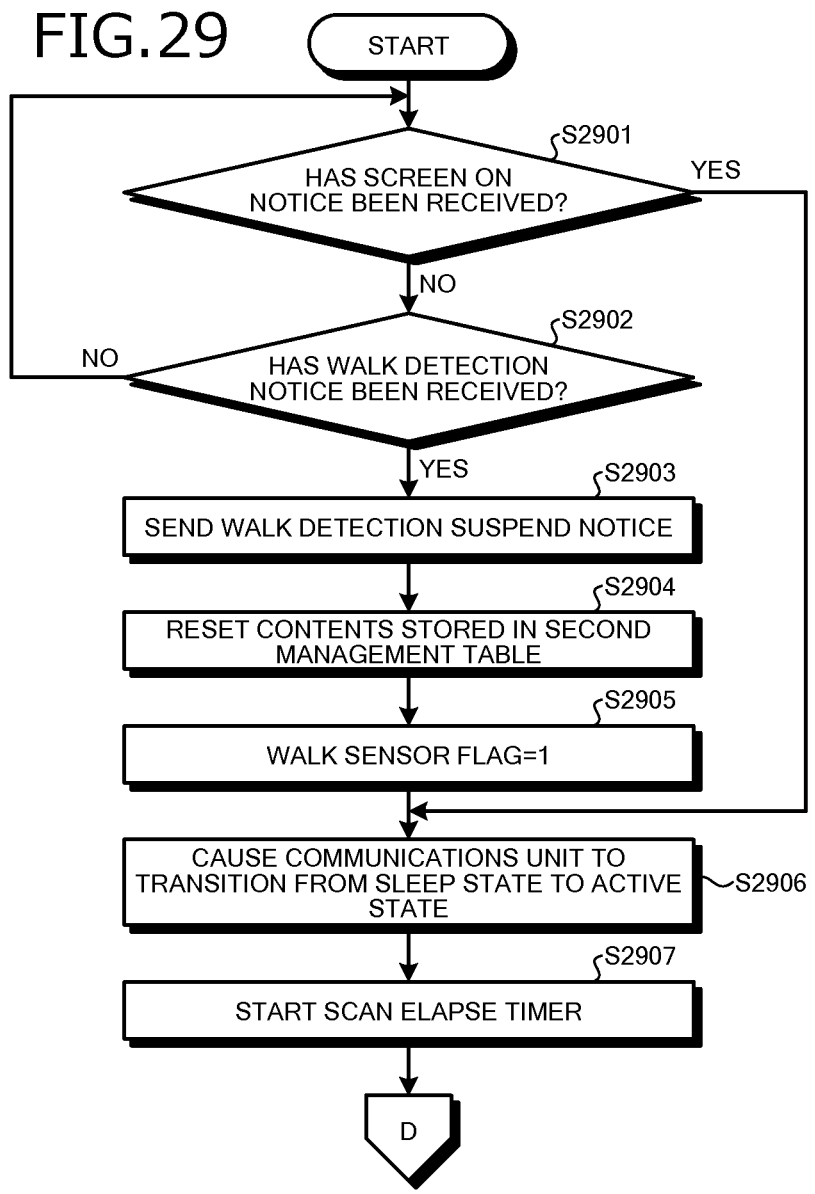
FIGS. 29, 30, and 31 are flowcharts of an example of a second control procedure of the mobile terminal device 101 according to the first embodiment.
Figure 30:
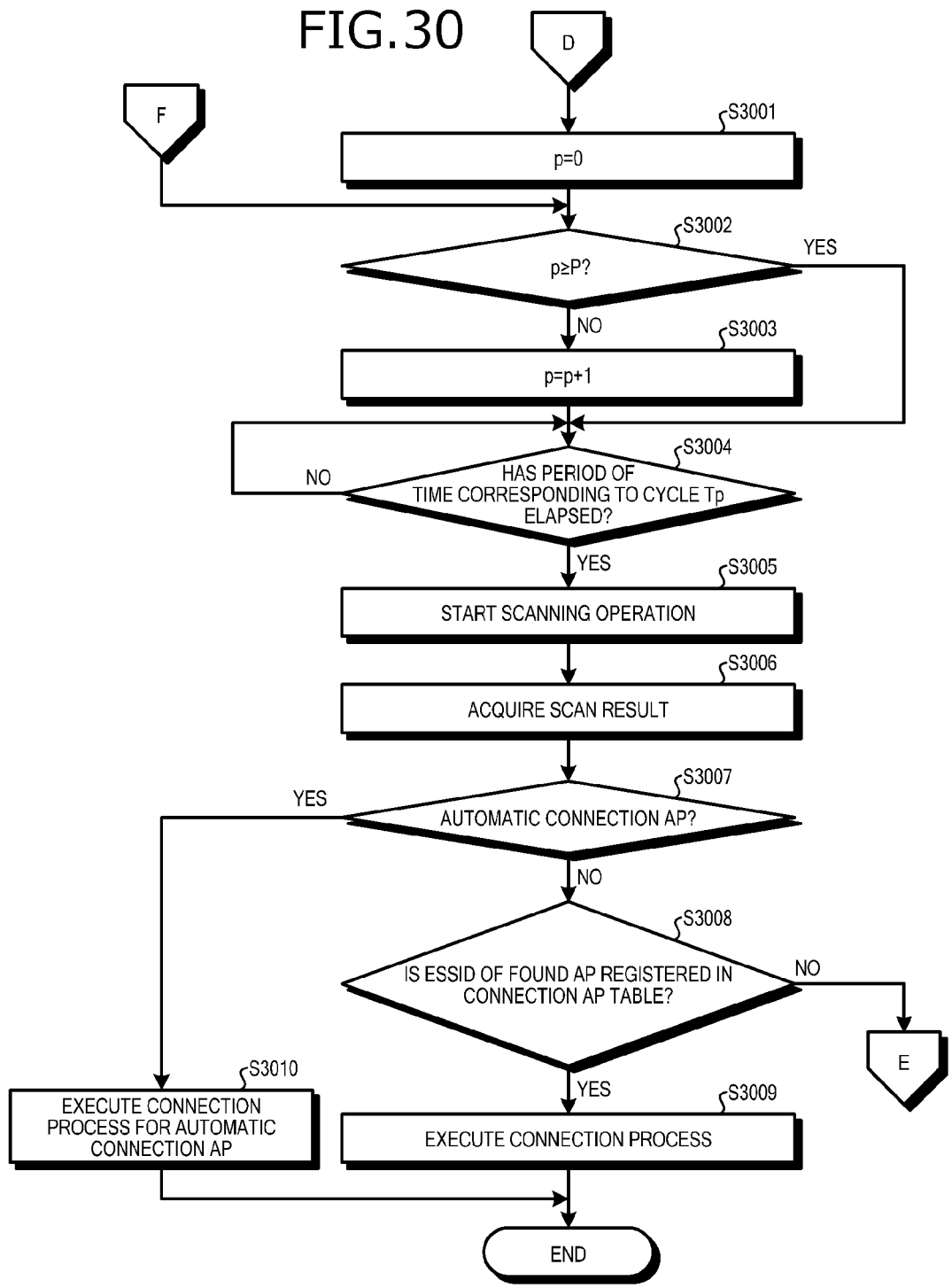
Figure 31:
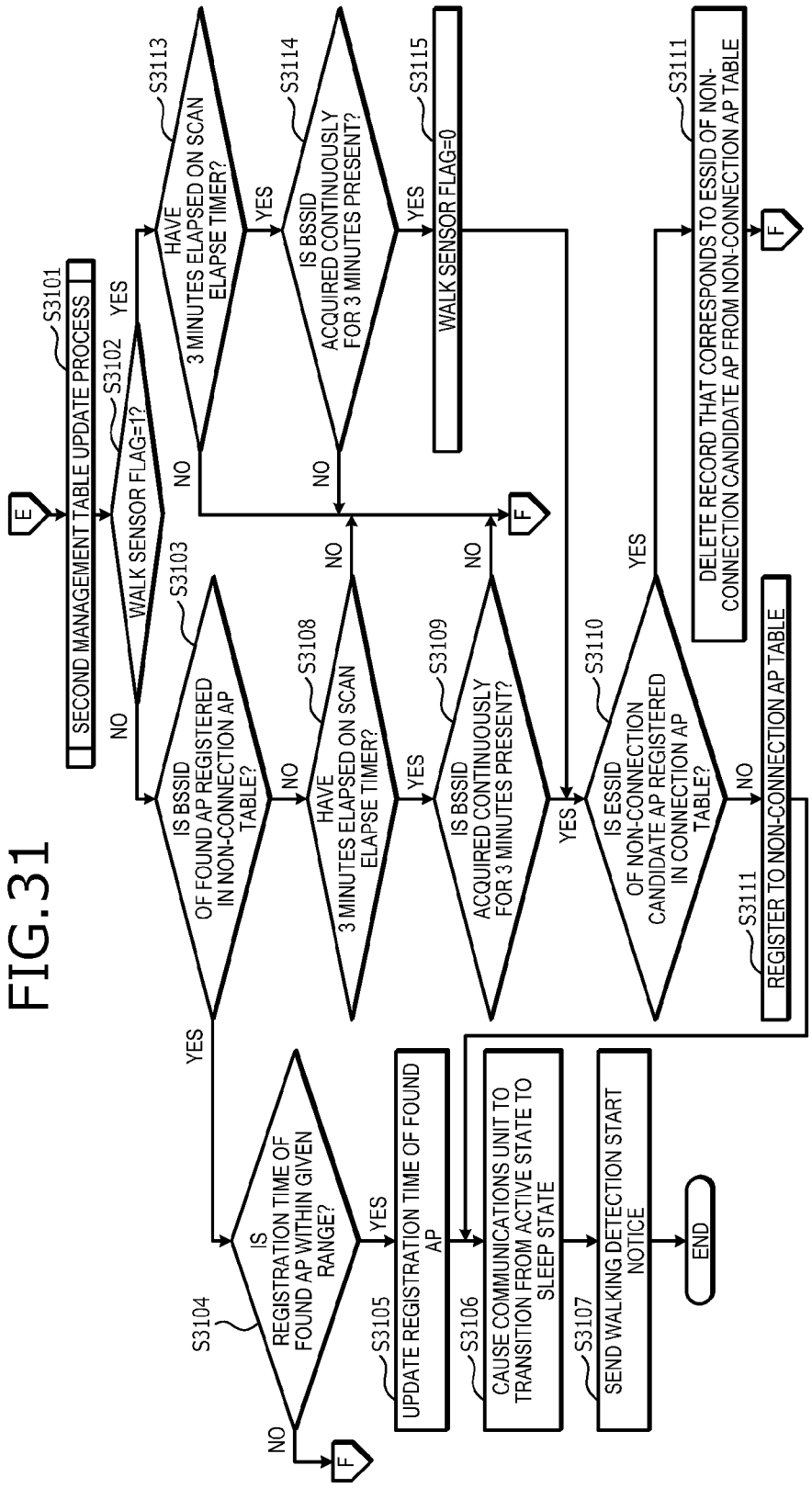

FIGS. 29, 30, and 31 are flowcharts of an example of a second control procedure of the mobile terminal device 101 according to the first embodiment. In the flowchart depicted in FIG. 29, the communications control unit 704 first determines whether a screen ON notice has been received from the display state detecting unit 701 (step S2901).

If a screen ON notice has been received (step S2901: YES), the communications control unit 704 proceeds to step S2906. On the other hand, if no screen ON notice has been received (step S2901: NO), the communications control unit 704 determines whether a walk detection notice has been received from the movement detecting unit 702 (step S2902).

If no walk detection notice has been received (step S2902: NO), the communications control unit 704 returns to step S2901. On the other hand, if a walk detection notice has been received (step S2902: YES), the communications control unit 704 sends a walk detection suspend notice to the movement detecting unit 702 (step S2903).

The communications control unit 704 then resets the contents stored in the second management table 2500 (step S2904) and sets a walk sensor flag to "1" (step S2905). The communications control unit 704 then causes the communications unit 703 to transition from the sleep state to the active state (step S2906), starts the scan elapse timer (step S2907), and proceeds to step S3001 depicted in FIG. 30.

In the flowchart depicted in FIG. 30, the communications control unit 704 first sets "p" of a cycle Tp to "p=0" (step S3001) and determines if "p" has reached or exceeded "P" (step S3002). If "p" has reached or exceeded "P" (step S3002: YES), the communications control unit 704 proceeds to step S3004.

On the other hand, if "p" is less than "P" (step S3002: NO), the communications control unit 704 increments "p" of the cycle Tp (step S3003) and determines whether a period of time corresponding to the cycle Tp has elapsed (step S3004). The communications control unit 704 waits until a period of time corresponding to the cycle Tp has elapsed (step S3004: NO).

When a period of time corresponding to the cycle Tp has elapsed (step S3004: YES), the communications control unit 704 controls the communications unit 703 to start the scanning operation of searching for an access point APi (step S3005). The communications control unit 704 then acquires a scan result from the communications unit 703 (step S3006).

The communications control unit 704 determines whether the found AP is an automatic connection AP (step S3007). If the found AP is not an automatic connection AP (step S3007: NO), the communications control unit 704 determines whether the ESSID of the found AP is already registered in the connection AP table 400 (step S3008).

If the ESSID of the found AP is already registered (step S3008: YES), the communications control unit 704 executes a connection process of connecting to the found AP (step S3009) and terminates a series of operations according to the flowchart. On the other hand, if the ESSID of the found AP is not yet registered (step S3008: NO), the communications control unit 704 proceeds to step S3101 depicted in FIG. 31.

If the found AP is an automatic connection AP at step S3007 (step S3007: YES), the communications control unit 704 executes a connection process for the automatic connection AP (step S3010) and terminates a series of operations according to the flowchart.

In the flowchart depicted in FIG. 31, the communications control unit 704 executes a second management table update process of updating the contents stored in the second management table 2500 (step S3101). The communications control unit 704 determines whether the walking sensor flag is set to "1" (step S3102).

If the walking sensor flag is set to "0" (step S3102: NO), the communications control unit 704 determines whether the BSSID of the found AP is registered in the non-connection AP table 500 (step S3103). If the BSSID of the found AP is registered (step S3103: YES), the communications control unit 704 refers to the non-connection AP table 500 and determines whether the registration time of the registered AP is within a given range from the current time (step S3104).

If the registration time of the found AP is outside the given range (step S3104: NO), the communications control unit 704 proceeds to step S3002 depicted in FIG. 30. On the other hand, if the registration time of the found AP is within the given range (step S3104: YES), the communications control unit 704 updates the registration time of the found AP in the non-connection AP table 500 to the current time (step S3105).

The communications control unit 704 causes the communications unit 703 to transition from the active state to the sleep state (step S3106). The communications control unit 704 sends a walking detection start notice to the movement detection unit 702 (step S3107) and terminates a series of operations according to the flowchart.

If the BSSID of the found AP is not registered at S3103 (step S3103: NO), the communications control unit 704 determines whether three minutes have elapsed on the scan elapse timer (step S3108). If three minutes have not elapsed on the scan elapse timer (step S3108: NO), the communications control unit 704 proceeds to step S3002 depicted in FIG. 30.

On the other hand, if three minutes have elapsed on the scan elapse timer (step S3108: YES), the communications control unit 704 refers to the second management table 2500 and determines whether a BSSID acquired continuously for three minutes is present (step S3109). If a BSSID acquired continuously for three minutes is not present (step S3109: NO), the communications control unit 704 proceeds to step S3002 depicted in FIG. 30.

In the description hereinafter, an access point having a BSSID acquired continuously for the given period R (in this case, R=3 [minute]) may be referred to as a "non-connection candidate AP".

On the other hand, if a BSSID acquired continuously for three minutes is present (step S3109: YES), the communications control unit 704 determines whether the ESSID of the non-connection candidate AP is registered in the connection AP table 400 (step S3110).

If the ESSID of the non-connection candidate AP is not registered (step S3110: NO), the communications control unit 704 registers the ESSID, BSSID, and registration time of the non-connection candidate AP to the non-connection AP table 500 (step S3111) and proceeds to step S3106.

On the other hand, if the ESSID of the non-connection candidate AP is registered (step S3111: YES), the communications control unit 704 deletes the record that corresponds to the ESSID of the non-connection candidate AP from the non-connection AP table 500 (step S3112) and proceeds to step S3002 depicted in FIG. 30.

If the walking sensor flag is set to "1" at step S3102 (step S3102: YES), the communications control unit 704 determines whether three minutes have elapsed on the scan elapse timer (step S3113). If three minutes have not elapsed on the scan elapse timer (step S3113: NO), the communications control unit 704 proceeds to step S3002 depicted in FIG. 30.

On the other hand, if three minutes have elapsed on the scan elapse timer (step S3113: YES), the communications control unit 704 refers to the second management table 2500 and determines whether a BSSID acquired continuously for three minutes is present (step S3114). If a BSSID acquired continuously for three minutes is not present (step S3114: NO), the communications control unit 704 proceeds to step S3002 depicted in FIG. 30.

On the other hand, if a BSSID acquired continuously for three minutes is present (step S3114: YES), the communications control unit 704 sets the walking sensor flag to "0" (step S3115) and proceeds to step S3110.

As a result, if the access point APi of the same BSSID is found continuously for the given period R, the scanning operation of searching for an access point APi can be suspended.

A specific procedure of the second management table update process depicted at step S3101 in FIG. 31 will be described.

Figure 32:
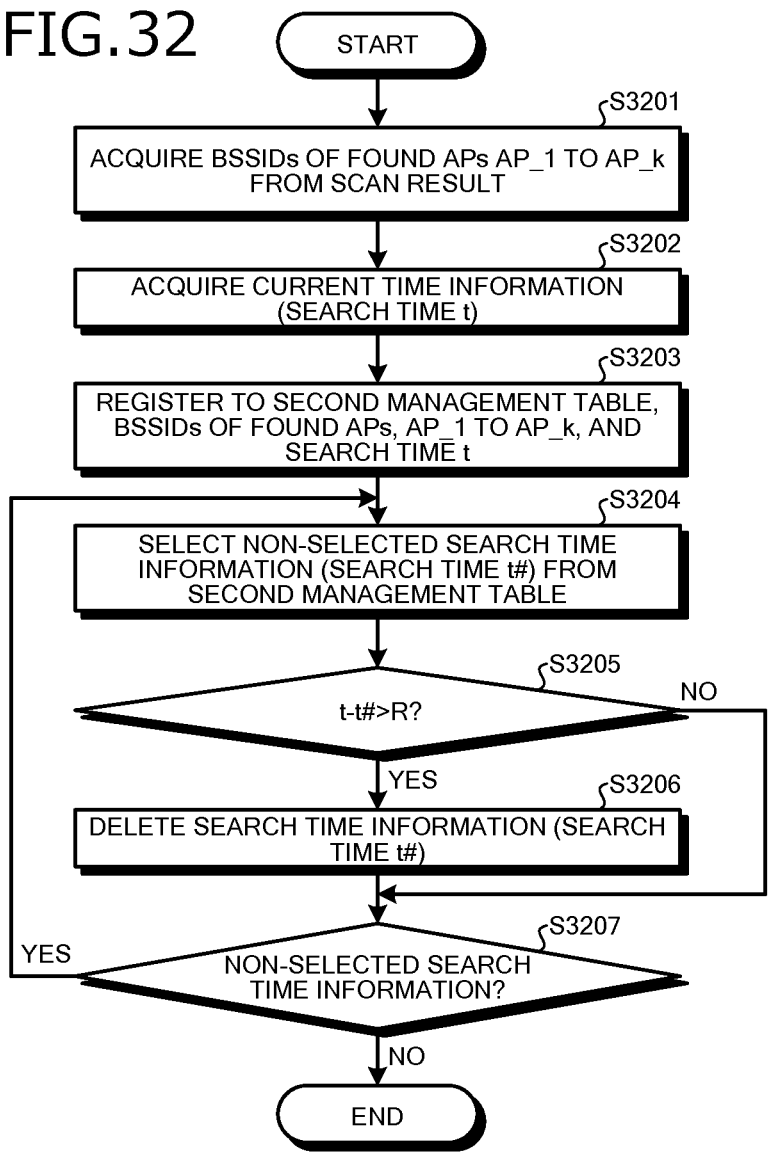
FIG. 32 is a flowchart of an example of a specific procedure of a second management table update process.

FIG. 32 is a flowchart of an example of the specific procedure of the second management table update process. In the flowchart of FIG. 32, the communications control unit 704 acquires the BSSIDs of the found Aps, AP_1 to AP_K, from the scan result acquired at step S3006 depicted in FIG. 30 (step S3201).

The communications control unit 704 acquires current time information (search time t) (step S3202). The communications control unit 704 correlates and registers to the second management table 2500, the BSSIDs of the found APs, AP_1 to AP_K, and the search time t (step S3203). The communications control unit 704 selects non-selected search time information (search time t#) that has not yet been selected from the second management table 2500 (step S3204).

The communications control unit 704 determines whether a value acquired by subtracting the search time t# from the search time t is greater than the given period R (step S3205). If the value acquired by subtracting the search time t# from the search time t is equal to or less than the given period R (step S3205: NO), the communications control unit 704 proceeds to step S3207.

On the other hand, if the value acquired by subtracting the search time t# from the search time t is greater than the given period R (step S3205: YES), the communications control unit 704 deletes the search time information (search time t#) selected from the second management table 2500 (step S3206). The communications control unit 704 determines whether non-selected search time information that is has not selected from the second management table 2500 is present (step S3207).

If non-selected search time information is present (step S3207: YES), the communications control unit 704 returns to step S3204. On the other hand, if no non-selected search time information is present (step S3207: NO), the communications control unit 704 terminates a series of operations according to the flowchart and returns to the step at which the second management table update process is called.

As a result, the contents stored in the second management table 2500 can be prevented from increasing while retaining the latest search time information corresponding to the given period R. If the BSSID of a found AP is not included in the scan result at step S3201, the communications control unit 704 terminates a series of operations according to the flowchart and returns to the step at which the second management table update process is called.

As described above, if the display state of the display 303 transitions from non-display to display, the mobile terminal device 101 according to the first embodiment can start the periodic scanning operation of searching for an access point APi. If the ESSID of a found AP is not present in the connection AP table 400 and the BSSID of the found AP is present in the non-connection AP table 500, the mobile terminal device 101 can suspend the scanning operation of searching for an access point APi.

The mobile terminal device 101 can refer to the first management table 600 to register to the non-connection AP table 500, the BSSID of a found AP found N or more successive times. As a result, the scanning operation can be suspended in a situation where the possibility of connecting to an access point APi is low, so as to suppress the power consumed for the scanning operation of searching for an access point APi.

If the difference of the current time and the registration time correlated with the BSSID of the found AP found N or more successive times in the non-connection AP table 500 is outside a given range, the mobile terminal device 101 can continue the scanning operation to search for an access point APi. As a result, assuming a case where a new access point is located near the non-connection AP, the scanning operation of searching for an access point APi can be continued even when near a non-connection AP.

The mobile terminal device 101 can refer to the second management table 2500 to register to the non-connection AP table 500, the BSSID of a found AP that is found continuously for the given period R. As a result, the scanning operation can be suspended in a situation where the possibility of connecting to an access point APi is low, so as to suppress the power consumed for the scanning operation of searching for an access point APi.

If the ESSID of the found AP is in the connection AP table 400 and the BSSID of the found AP is in the non-connection AP table 500, the mobile terminal device 101 can continue the scanning operation of searching for an access point APi. As a result, the scanning operation for the access point APi is continued if a found AP is an available access point even when the found AP is an access point that has been found N or more successive times.

If movement of the mobile terminal device 101 is detected, the mobile terminal device 101 can start the scanning operation of searching for an access point APi. As a result, if the user of the mobile terminal device 101 moves, the suspended scanning operation can be resumed to ensure the connectability to an available access point.

The mobile terminal device 101 according to a second embodiment will be described. Description of portions identical to those described in the first embodiment will be omitted hereinafter.

Figure 33:
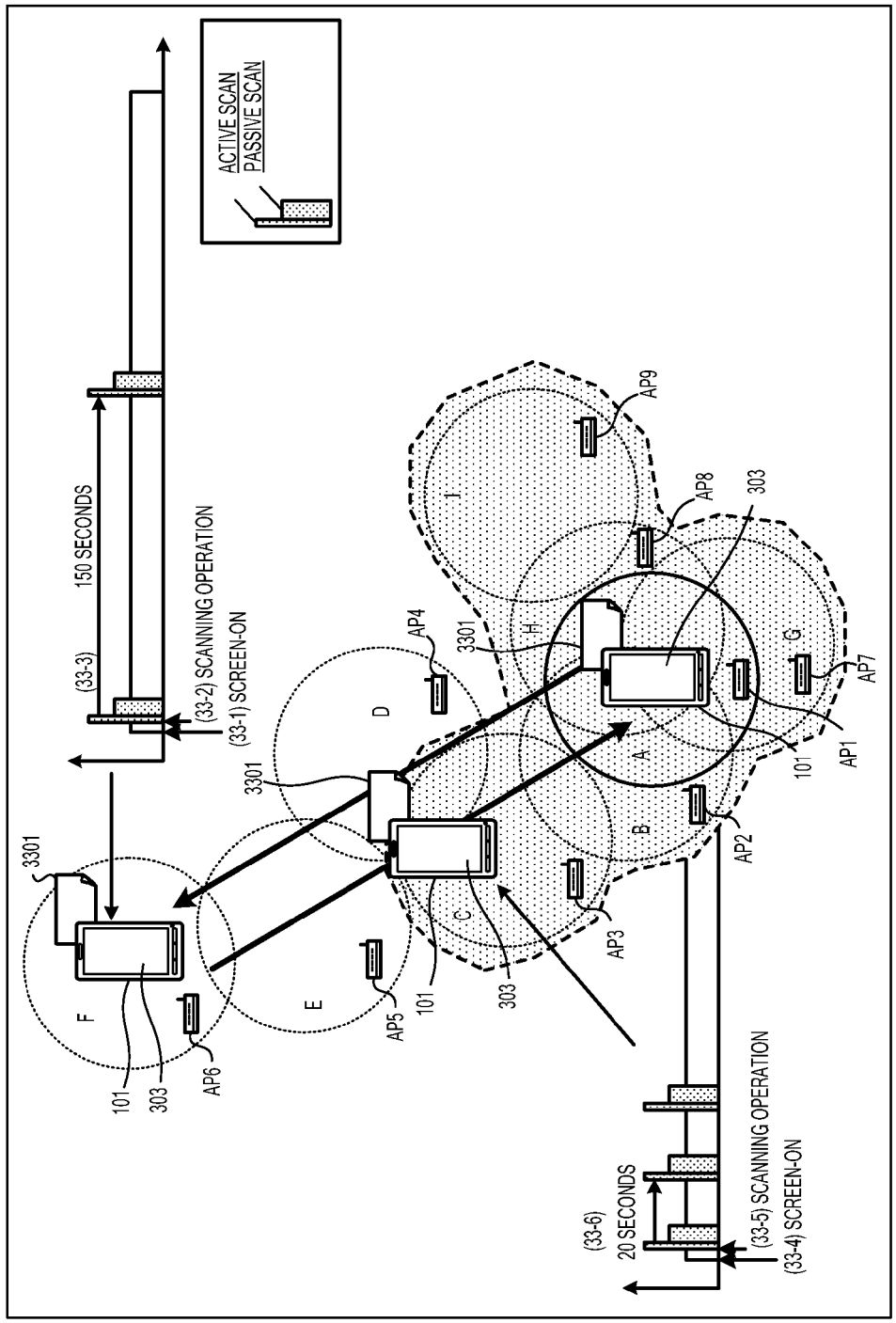
FIG. 33 is an explanatory diagram of an example of a control method according to a second embodiment.

FIG. 33 is an explanatory diagram of an example of a control method according to the second embodiment. In FIG. 33, the mobile terminal device 101 has neighboring access point information 3301 and can wirelessly communicate with the access points APi (access points AP1 to AP9 in the example depicted in FIG. 33). Among the access points AP1 to AP9, the access point AP1 is the access point connecting the mobile terminal device 101 to the network 210 (refer to FIG. 2).

In FIG. 33, "A to I" correspond to the ESSIDs of the respective access points APi. In FIG. 33, a solid circle represents the communication area of the access point connecting the mobile terminal device 101 to the network 210 (refer to FIG. 2). In FIG. 33, a dotted circle represents the communication area of an access point not connecting the mobile terminal device 101 to the network 210 (refer to FIG. 2).

The neighboring access point information 3301 is information that includes entries correlating the BSSID of an access point connected to the network 210 (refer to FIG. 2) and the BSSID of a neighboring access point present in a vicinity of the connected access point.

In the description hereinafter, an access point that has connected the mobile terminal device 101 to the network 210 (refer to FIG. 2) may be indicated as a "connection AP". A neighboring access point present in the vicinity of the connection AP may be indicated as a "neighboring AP".

The mobile terminal device 101 controls the cycle T of the scanning operation of searching for an access point APi, based on a result of determination on whether an entry corresponding to the BSSID of the found AP has been retrieved from the neighboring access point information 3301.

An operation example of the mobile terminal device 101 according to the second embodiment will be described hereinafter. It is assumed that, in the neighboring access point information 3301, the BSSID of the connection AP1 is correlated with the BSSIDs of the neighboring APs, AP2, AP3, AP7, AP8, and AP9, present in the vicinity of the connection AP1.

(33-1) The mobile terminal device 101 detects that the display state of the display 303 (refer to FIG. 3) transitions from non-display to display.

(33-2) Upon detecting that the display state of the display 303 has transitioned from non-display to display, the mobile terminal device 101 starts the scanning operation of searching for an access point APi. It is assumed that the access point AP6 is found. It is also assumed that since the ESSID of the access point AP6 is not registered in the connection AP table 400, the connection process of connecting to the access point AP6 is not executed.

(33-3) The mobile terminal device 101 determines whether an entry corresponding to the BSSID of the found AP has been retrieved from the neighboring access point information 3301. An entry corresponding to the BSSID of the found AP is, for example, an entry in which the BSSID of the found AP is the BSSID of a neighboring AP correlated with the BSSID of a given connection AP.

If an entry corresponding to the BSSID of the found AP has been retrieved, the mobile terminal device 101 sets the cycle T of the scanning operation of searching for an access point APi to a cycle T1. On the other hand, if an entry corresponding to the BSSID of the found AP has not been retrieved, the mobile terminal device 101 sets the cycle T of the scanning operation of searching for an access point APi to a cycle T2, which is longer than the cycle T1. In other words, if the mobile terminal device 101 is located in the vicinity of a connection AP, the mobile terminal device 101 makes the cycle T of the scanning operation shorter as compared to when the mobile terminal device 101 is not located in the vicinity of a connection AP.

In this example, an entry corresponding to the BSSID of the found AP6 is not retrieved from the neighboring access point information 3301. In this case, the mobile terminal device 101 sets the cycle T of the scanning operation of searching the access point APi to the cycle T2. In the example depicted in FIG. 33, "T2=150 [seconds]" is set as the cycle T2. In this case, the scanning operation is subsequently performed at intervals of 150 seconds.

It is assumed that after moving from the communication area of the access point AP6 to the communication area of the access point AP3, the user of the mobile terminal device 101 switches the display state of the display 303 from non-display to display.

(33-4) The mobile terminal device 101 detects that the display state of the display 303 (refer to FIG. 3) transitions from non-display to display.

(33-5) Upon detecting that the display state of the display 303 has transitioned from non-display to display, the mobile terminal device 101 starts the scanning operation of searching for an access point APi. It is assumed that the access point AP3 is found. It is also assumed that since the ESSID of the access point AP3 is not registered in the connection AP table 400, the connection process of connecting to the access point AP3 is not executed.

(33-6) The mobile terminal device 101 determines whether an entry corresponding to the BSSID of the found AP3 has been retrieved from the neighboring access point information 3301. In this example, an entry corresponding to the BSSID of the found AP3 is retrieved from the neighboring access point information 3301. In this case, the mobile terminal device 101 sets the cycle T of the scanning operation of searching the access point APi to the cycle T1. In the example depicted in FIG. 33, "T1=00 [seconds]", which is shorter than the cycle T2, is set as the cycle T1. In this case, the scanning operation is subsequently performed at intervals of 20 seconds.

In the description above, if an entry corresponding to the BSSID of the found AP is not retrieved from the neighboring access point information 3301, the mobile terminal device 101 sets the cycle T of the scanning operation to the cycle T2; however, configuration is not limited hereto. For example, if an entry including the BSSID of a neighboring AP correlated to the BSSID of the found AP is not retrieved from the neighboring access point information 3301, the mobile terminal device 101 may suspend the scanning operation of searching for an access point APi.

As described above, if the mobile terminal device 101 is located in the vicinity of a connection AP, the mobile terminal device 101 can make the cycle T of the scanning operation shorter as compared to when the mobile terminal device 101 is not located in the vicinity of a connection AP. As a result, the connectability to the available access point APi can be enhanced.

If the mobile terminal device 101 is not located in the vicinity of a connection AP, the mobile terminal device 101 can make the cycle T of the scanning operation longer as compared to when the mobile terminal device 101 is located in the vicinity of a connection AP. As a result, the power consumed for the scanning operation of searching for an access point APi can be suppressed.

A neighboring AP table 3400 used by the mobile terminal device 101 will be described. The neighboring AP table 3400 is realized by the memory 302 depicted in FIG. 3, for example. The neighboring access point information 3301 depicted in FIG. 33 corresponds to the neighboring AP table 3400.

Figure 34:
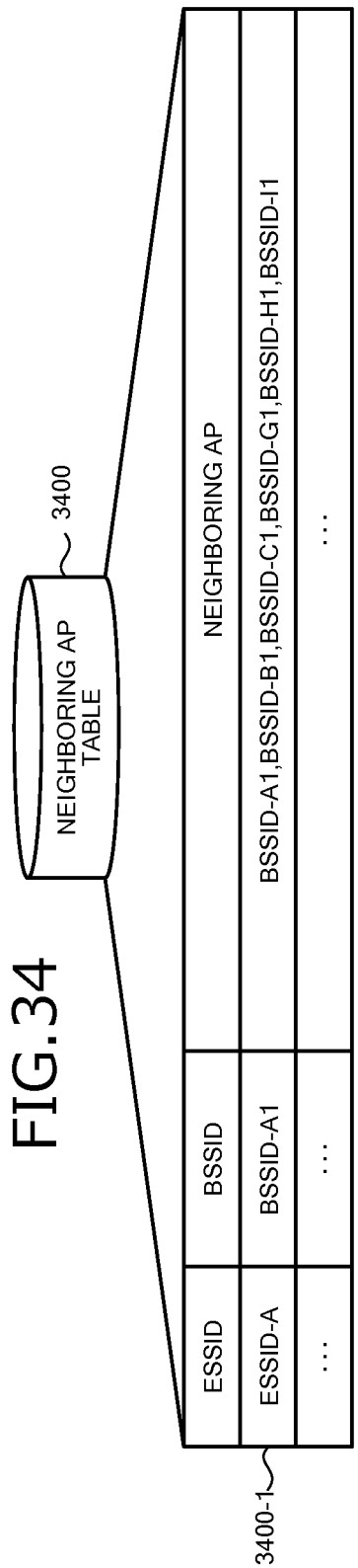
FIG. 34 is an explanatory diagram of an example of the contents stored in a neighboring AP table 3400.

FIG. 34 is an explanatory diagram of an example of the contents stored in the neighboring AP table 3400. In FIG. 34, the neighboring AP table 3400 has ESSID, BSSID, and neighboring-AP fields. By setting information in the fields, neighboring access point information (e.g., neighboring access point information 3400-1) is stored as records.

The ESSID is the ESSID of a connection AP. The BSSID is the BSSID of the connection AP. The neighboring AP is the BSSID of a neighboring AP present in the vicinity of the connection AP. The neighboring AP table 3400 enables the identification of the BSSIDs of the neighboring APs present in the vicinity of the connection AP.

For example, the neighboring access point information 3400-1 enables identification of the BSSIDs "BSSID-A1", "BSSID-B1", "BSSID-C1", "BSSID-G1", "BSSID-H1", and "BSSID-I1" of the neighboring APs present in the vicinity of the connection AP of the ESSID "ESSID-A" and the BSSID "BSSID-A1".

Figure 35:
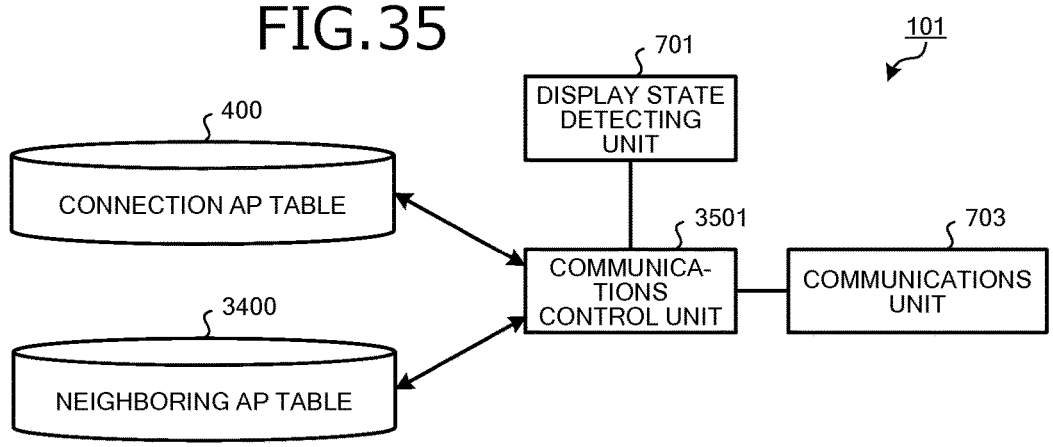
FIG. 35 is a block diagram of a functional configuration example of the mobile terminal device 101 according to the second embodiment.

FIG. 35 is a block diagram of a functional configuration example of the mobile terminal device 101 according to the second embodiment. In FIG. 35, the mobile terminal device 101 is configured to include the display state detecting unit 701, the communications unit 703, and a communications control unit 3501. Functions of the functional units are realized by, for example, causing the CPU 301 to run a program stored in the memory 302 depicted in FIG. 3 or by hardware such as the public network I/F 305, the WLAN I/F 306, and sensor 310. Processing results of the functional units are stored, for example, to the memory 302. Functional units identical to those described in the first embodiment are given the same reference numerals used in the first embodiment and redundant description thereof is omitted hereinafter.

The communications control unit 3501 has a function of controlling the cycle T of the scanning operation of searching the access point APi. Specifically, for example, if an access point APi is found, the communications control unit 3501 searches for neighboring access point information in which the BSSID of the found AP is set in the BSSID field of the neighboring AP table 3400 depicted in FIG. 34.

If such neighboring access point information is retrieved, it can be considered that a connection AP is likely to be present in the vicinity of the mobile terminal device 101. Therefore, if neighboring access point information is retrieved, the communications control unit 3501 sets the cycle T of the scanning operation of searching for an access point APi by the communications unit 703 to the cycle T1. The cycle T1 is set to a relatively short time interval of about 20 seconds.

As a result, if a connection AP is present in the vicinity of the mobile terminal device 101, the scanning operation can be performed at relatively short time intervals of about 20 seconds to increase the connectability to the available access point APi.

On the other hand, if neighboring access point information is not retrieved, it can be considered that a connection AP is less likely to be present in the vicinity of the mobile terminal device 101. Therefore, if neighboring access point information is not retrieved, the communications control unit 3501 sets the cycle T of the scanning operation of searching for an access point APi by the communications unit 703 to the cycle T2. The cycle T2 is set to a relatively long time interval of about 150 seconds.

As a result, if a connection AP is not present in the vicinity of the mobile terminal device 101, the scanning operation can be performed at relatively long time intervals of about 150 seconds to suppress the power consumed for the scanning operation to search for an access point APi.

If neighboring access point information is not retrieved, the communications control unit 3501 may suspend the scanning operation of searching for an access point APi by the communications unit 703. As a result, if a connection AP is not present in the vicinity of the mobile terminal device 101, the scanning operation of searching for an access point APi can be suspended to suppress the power consumed for the scanning operation to search for an access point APi.

The communications control unit 3501 has a function of registering the BSSID of a neighboring AP present in the vicinity of the connection AP. Specifically, for example, the communications control unit 3501 may correlate and register to the neighboring AP table 3400, the BSSID of the connection AP and the BSSID of a found AP included in the scan result that includes the BSSID of the connection AP.

For example, the communications control unit 3501 may correlate and register to the neighboring AP table 3400, the BSSID of the connection AP and the BSSID of a found AP included in the scan result of a scanning operation performed within a certain time W from disconnection of the connection to the connection AP. In this case, for example, if the RSSI strength of the signal received from the connection AP becomes a given strength or less, the communications control unit 3501 may determine that the connection to the connection AP has been lost.

The cycle T of the scanning operation performed within the certain time W from disconnection of the connection to the connection AP may be, for example, on the order of 10 seconds or may sequentially be made longer such as "10 seconds, 20 seconds, 30 seconds, . . . ". A registration example of the BSSID of the neighboring AP to the neighboring AP table 3400 will be described hereinafter with reference to FIGS. 37 and 38.

For example, the mobile terminal device 101 broadcasts a probe request signal to channels of a wireless LAN until neighboring access point information having the BSSID of the found AP set therein is retrieved from the neighboring AP table 3400. On the other hand, if neighboring access point information has been retrieved, the mobile terminal device 101 may unicast the probe request signal to the available access point APi, for example. The available access point APi is the access point APi of the ESSID set in the ESSID field of the retrieved neighboring access point information.

A control process example of the mobile terminal device 101 according to the second embodiment will be described with reference to FIG. 36. In the description hereinafter, some of the operation included in the control process of the mobile terminal device 101 may be omitted.

Figure 36:
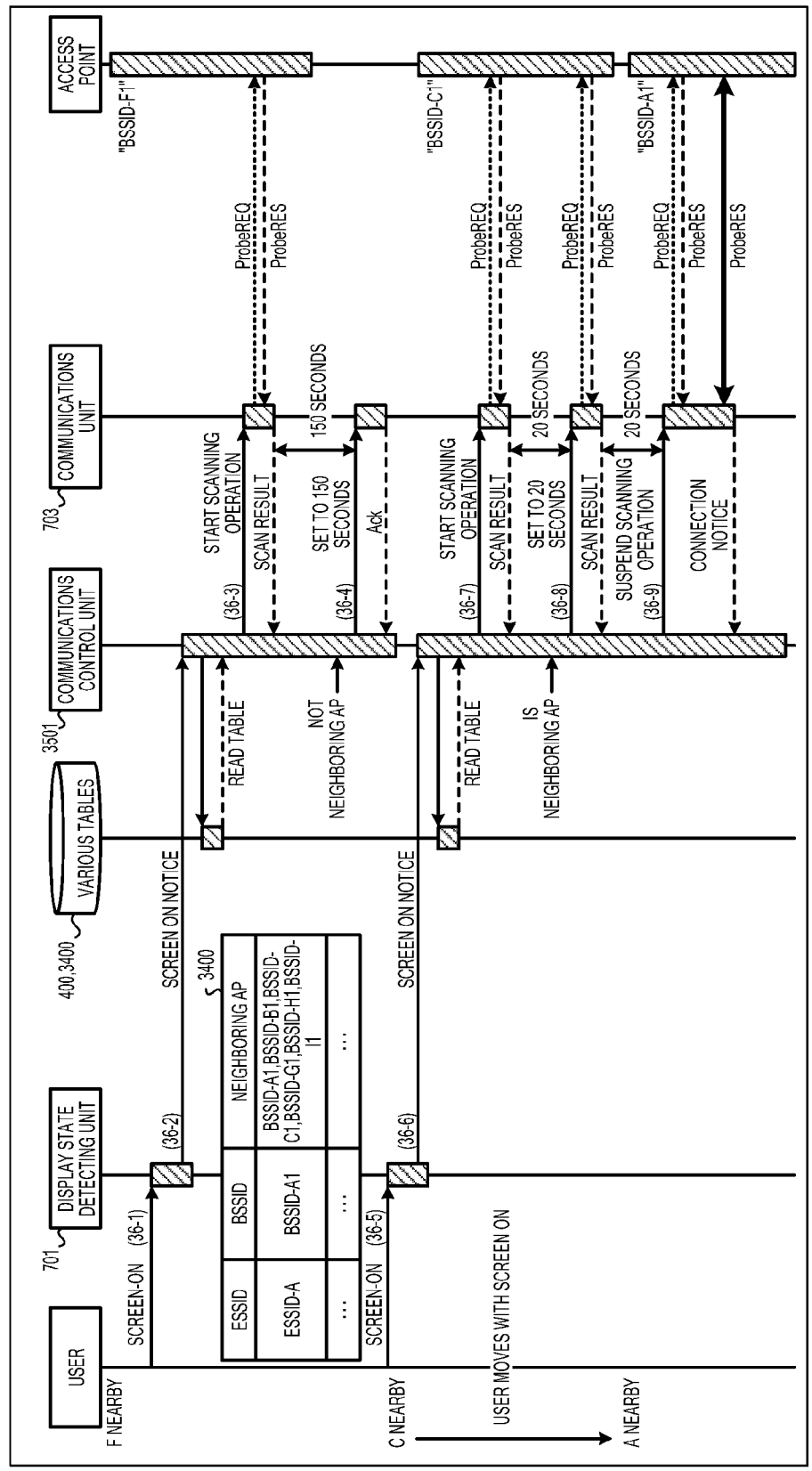
FIG. 36 is an explanatory view of a control process example of the mobile terminal device 101 according to the second embodiment.

FIG. 36 is an explanatory view of a control process example of the mobile terminal device 101 according to the second embodiment. In FIG. 36, (36-1) the display state detecting unit 701 detects a transition from non-display to display in the display state of the display 303. In this case, a transition from non-display to display in the display state of the display 303 is detected as a result of switching, consequent to user operation, from non-display to display in the display state of the display 303.

(36-2) When detecting a transition from non-display to display in the display state of the display 303, the display state detecting unit 701 sends a screen ON notice to the communications control unit 704.

(36-3) The communications control unit 704 controls the communications unit 703 to start the scanning operation to search for an access point APi. In the example depicted in FIG. 36, execution of the scanning operation results in finding the access point AP6 whose BSSID is "BSSID-F1" (refer to FIG. 33).

It is assumed that the ESSID "ESSID-F" of the found AP (access point AP6) is not registered in the connection AP table 400 (refer to FIG. 4). In this case, the connection process of connecting to the found AP is not executed.

(36-4) The communications control unit 3501 searches for neighboring access point information having the BSSID "BSSID-F1" of the found AP (access point AP6) set in the BSSID field of the neighboring AP table 3400 (refer to FIG. 34). It is assumed that no such neighboring access point information is retrieved. In this case, the communications control unit 3501 sets the cycle T of the scanning operation of searching for an access point APi by the communications unit 703 to the cycle T2. In the example depicted in FIG. 36, the cycle T2 is set to 150 seconds.

It is assumed that the user of the mobile terminal device 101 turns off the screen and moves from the communication area of the access point AP6 to the communication area of the access point AP3 (refer to FIG. 33).

(36-5) The display state detecting unit 701 detects a transition from non-display to display in the display state of the display 303. In this case, a transition from non-display to display in the display state of the display 303 is detected as a result of switching, consequent to user operation, from non-display to display in the display state of the display 303.

(36-6) When detecting a transition from non-display to display in the display state of the display 303, the display state detecting unit 701 sends a screen ON notice to the communications control unit 3501.

(36-7) The communications control unit 3501 controls the communications unit 703 to start the scanning operation of searching for an access point APi. In the example depicted in FIG. 36, this scanning operation results in finding the access point AP3 of the BSSID "BSSID-C1".

It is assumed that the ESSID "ESSID-C" of the found AP (access point AP3) is not registered in the connection AP table 400. In this case, the connection process of connecting to the found AP is not executed.

(36-8) The communications control unit 3501 searches for neighboring access point information having the BSSID "BSSID-C1" of the found AP (access point AP3) set in the BSSID field of the neighboring AP table 3400. In this example, neighboring access point information is retrieved. In this case, the communications control unit 3501 sets the cycle T of the scanning operation of searching for an access point APi by the communications unit 703 to the cycle T1. In the example depicted in FIG. 36, the cycle T1 is set to 20 seconds.

It is assumed that as a result of the scanning operation of searching for an access point APi performed at intervals of 20 seconds, the access point AP1 of the ESSID "ESSID-A" (refer to FIG. 33) is found. It is also assumed that the ESSID "ESSID-A" of the found AP (access point AP1) is registered in the connection AP table 400.

(36-9) Since the ESSID "ESSID-A" of the found AP (access point AP1) is registered in the connection AP table 400, the communications control unit 3501 suspends the scanning operation of searching for an access point APi by the communication unit 703. The communications control unit 3501 controls the communications unit 703 to execute the connection process of connecting to the found AP (access point AP1).

A registration example of the BSSID of the neighboring AP to the neighboring AP table 3400 will be described with reference to FIGS. 37 and 38.

Figure 37:
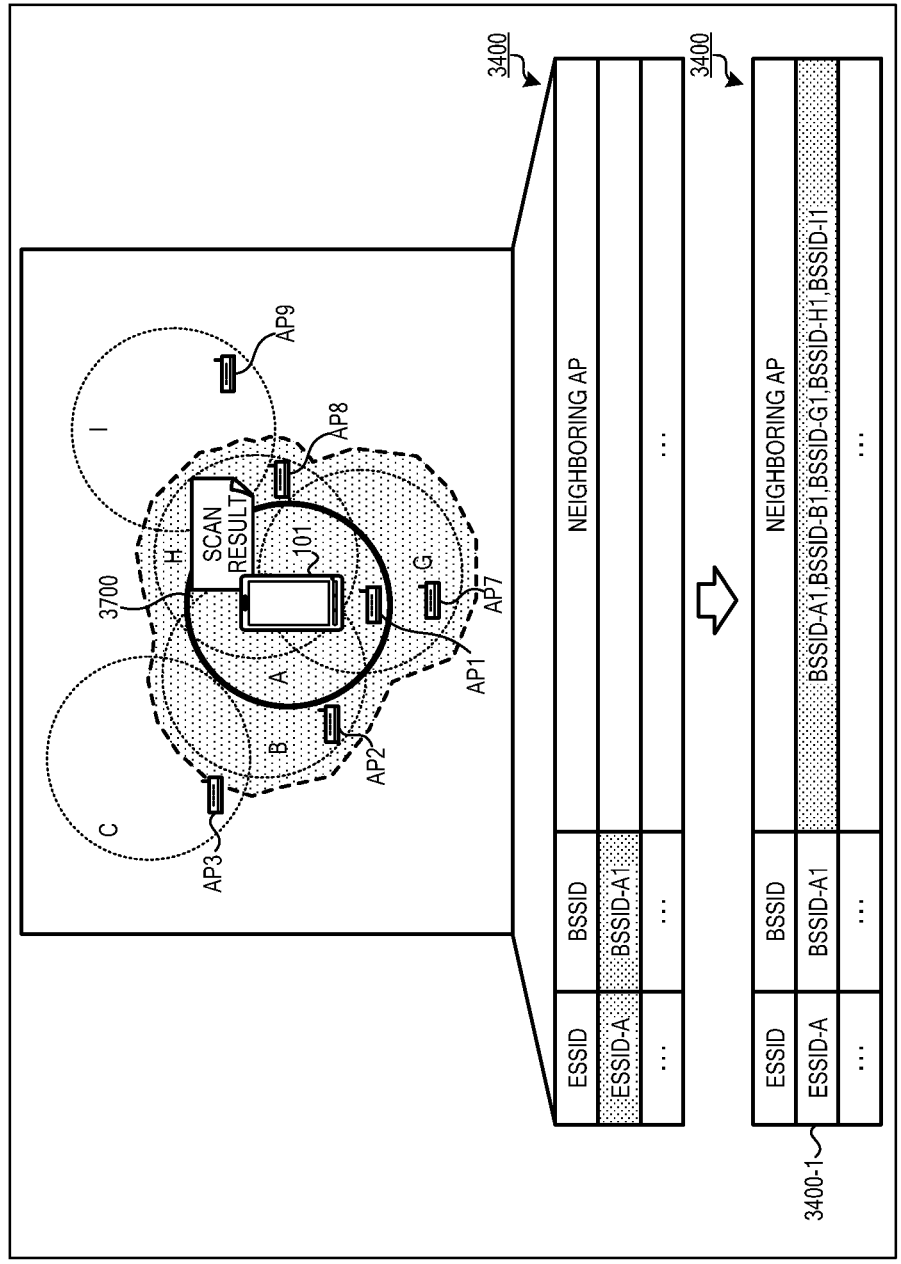
FIG. 37 is an explanatory diagram of a first registration example of a BSSID of a neighboring AP.

FIG. 37 is an explanatory diagram of a first registration example of the BSSID of the neighboring AP. In FIG. 37, it is assumed that the mobile terminal device 101 can wirelessly communicate with the access points AP1, AP2, AP7, and AP8 and that the mobile terminal device 101 connects to the access point AP1 for the first time. It is also assumed that a scan result 3700 is obtained by a scanning operation performed before the connection to the access point AP1.

The scan result 3700 includes the ESSID and BSSID of the access point AP1 as well as the ESSIDs and BSSIDs of the access points AP2, AP7, and AP8. In this case, first, the communications control unit 3501 sets the ESSID and the BSSID of the access point AP1 included in the scan result 3700 into the ESSID field and the BSSID field in the neighboring AP table 3400.

The communications control unit 3501 sets the BSSIDs of the access points AP1, AP2, AP7, and AP8 included in the scan result 3700 into the neighboring AP field in the neighboring AP table 3400. As a result, neighboring access point information 3400-1 is set as a record. The BSSID of the access point AP1, i.e., the connection AP, need not be set in the neighboring AP field.

Figure 38:
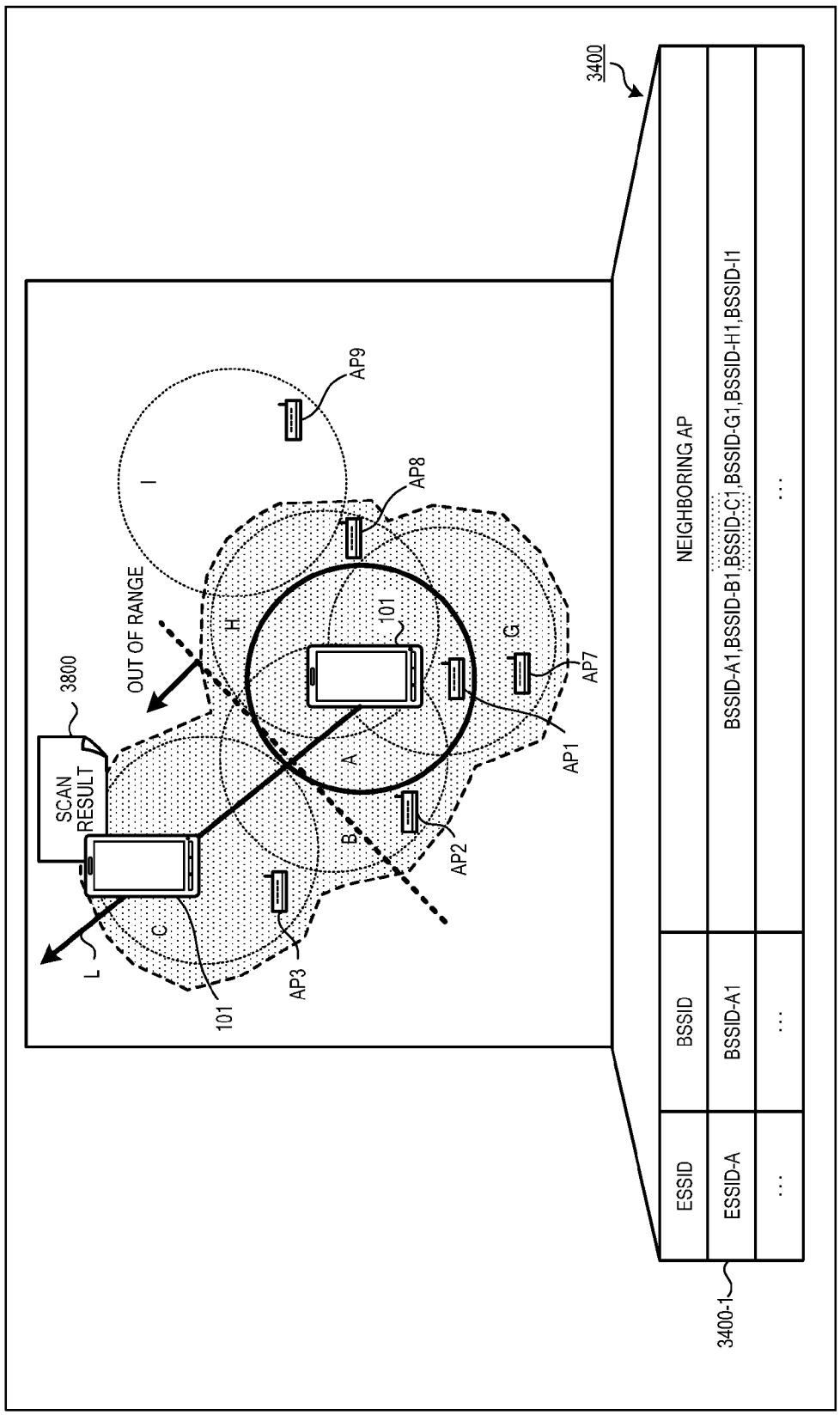
FIG. 38 is an explanatory diagram of a second registration example of the BSSID of the neighboring AP.

FIG. 38 is an explanatory diagram of a second registration example of the BSSID of the neighboring AP. In FIG. 38, it is assumed that as a result of movement of the user in the direction indicated by an arrow L, the connection between the mobile terminal device 101 and the access point AP1 is lost (out of range). It is also assumed that a scan result 3800 is obtained by a scanning operation performed within the certain time W (within one minute in this case) from the disconnection of the connection to the access point AP1.

The scan result 3800 includes the ESSID and BSSID of the access point AP3. In this case, the communications control unit 3501 sets the BSSID of the access point AP3 into the neighboring AP field in the neighboring AP table 3400 corresponding to the ESSID of the access point AP1 of the disconnected connection. As a result, the BSSID of the access point AP3 is added as the BSSID of a neighboring AP of the access point AP1.

A registration process example of the mobile terminal device 101 according to the second embodiment will be described with reference to FIG. 39. In the description hereinafter, some of the operations included in the registration process of the mobile terminal device 101 may be omitted.

Figure 39:
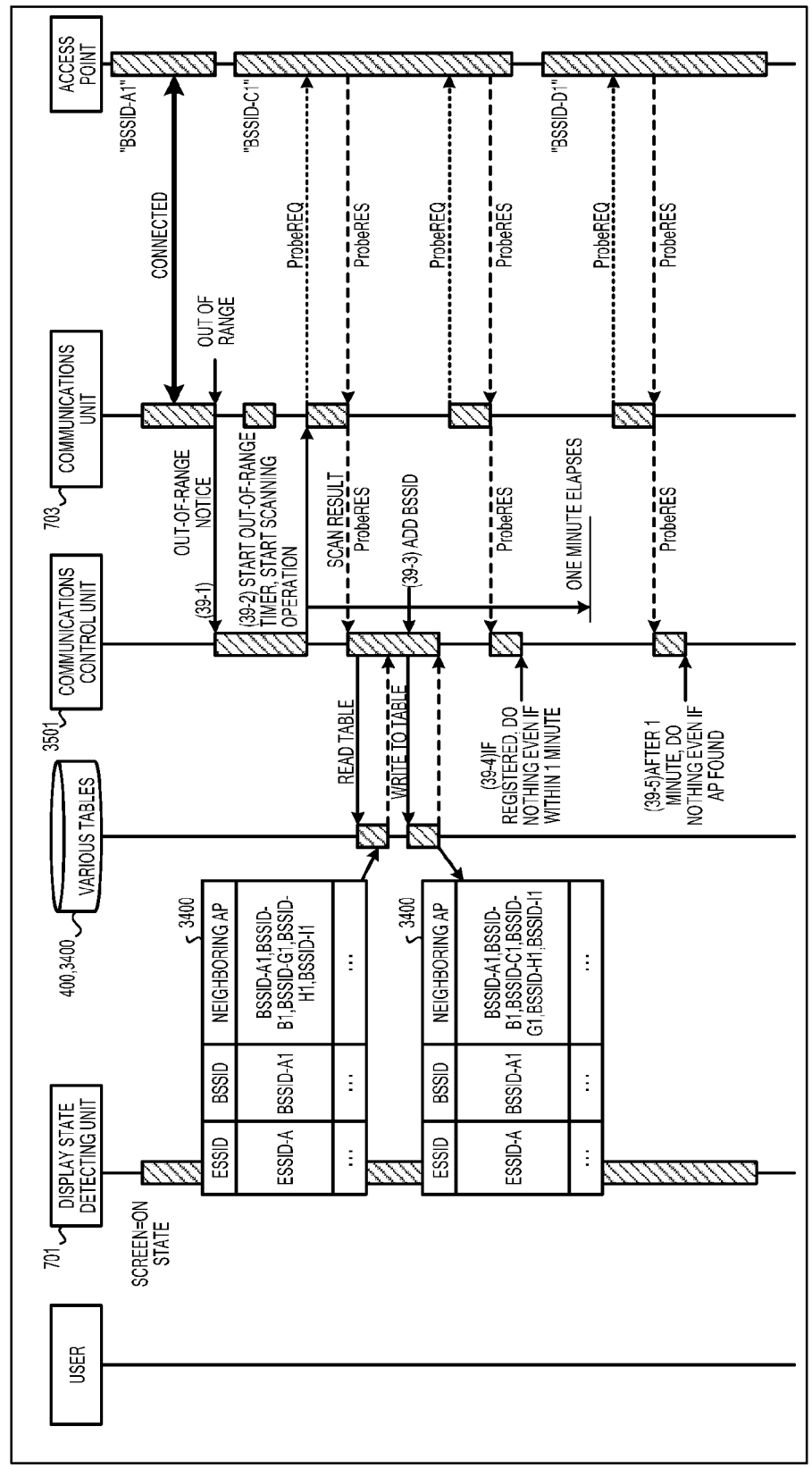
FIG. 39 is an explanatory diagram of a registration process example of the mobile terminal device 101 according to the second embodiment.

FIG. 39 is an explanatory diagram of a registration process example of the mobile terminal device 101 according to the second embodiment. In FIG. 39, (39-1) if the connection to the connection AP is lost, the communications control unit 3501 receives an out-of-range notice from the communications unit 703. The out-of-range notice is a notice indicating disconnection of the connection to the connection AP. In the example depicted in FIG. 39, the out-of-range notice indicating the disconnection of the connection to the access point AP1 is received.

(39-2) Upon receiving an out-of-range notice, the communications control unit 3501 starts an out-of-range timer. The out-of-range timer is a timer that measures the time that elapses since the receipt of the out-of-range notice. If an out-of-range notice is received, the communications control unit 3501 controls the communications unit 703 to start the scanning operation of searching for an access point APi.

In the example depicted in FIG. 39, as a result of a scanning operation performed within the certain time W (within one minute in this case) from the receipt of the out-of-range notice, the access point AP3 with the BSSID of "BSSID-C1" is found. It is assumed that the ESSID "ESSID-C" of the found AP (access point AP3) is not registered in the connection AP table 400 (refer to FIG. 4). In this case, the connection process of connecting to the found AP is not executed.

(39-3) The communications control unit 3501 adds the BSSID "BSSID-C1" of the access point AP3 included in the scan result to the neighboring AP field in the neighboring AP table 3400 corresponding to the ESSID of the access point AP1 of the disconnected connection.

(39-4) Although the scan result including the BSSID "BSSID-C1" is obtained within the certain time W from the receipt of an out-of-range notice, the communications control unit 3501 does not register the BSSID "BSSID-C1" if the BSSID is already registered in the neighboring AP table 3400.

(39-5) Although the scan result including the BSSID "BSSID-D1" is obtained after the elapse of the certain time W from the receipt of the out-of-range notice, the communications control unit 3501 does not register the BSSID "BSSID-D1" to the neighboring AP table 3400.

The control procedure of the mobile terminal device 101 according to the second embodiment will be described. It is noted that the cycle T1 of the scanning operation of searching for an access point APi is "T1=20 [s]" while the cycle T2 is "T2=150 [s]".

Figure 40:
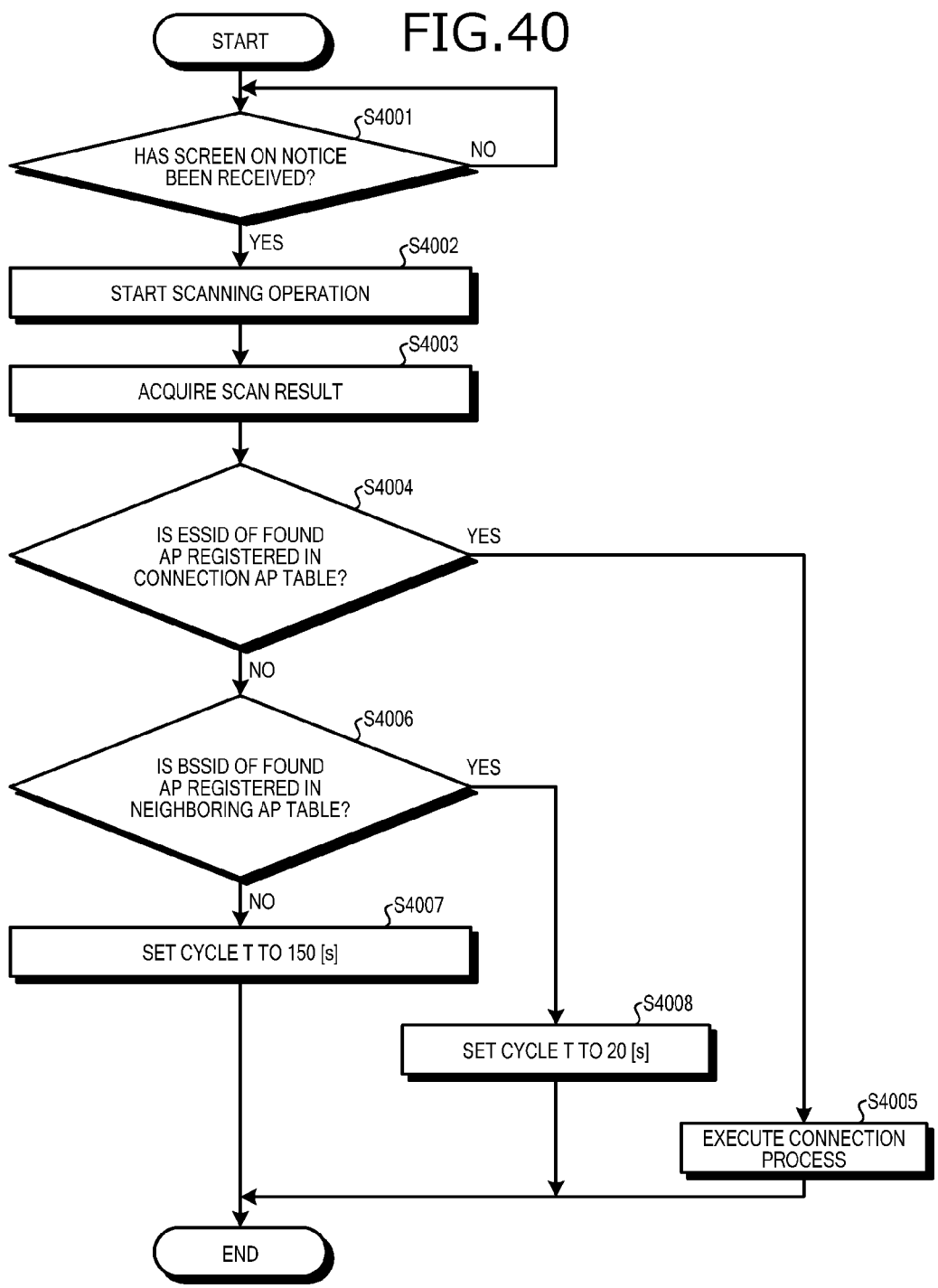
FIG. 40 is a flowchart of an example of a control procedure of the mobile terminal device 101 according to the second embodiment.

FIG. 40 is a flowchart of an example of the control procedure of the mobile terminal device 101 according to the second embodiment. In the flowchart depicted in FIG. 40, the communications control unit 3501 determines whether a screen ON notice has been received from the display state detecting unit 701 (step S4001).

The communications control unit 3501 waits until a screen ON notice has been received (step S4001: NO). When a screen ON notice has been received (step S4001: YES), the communications control unit 3501 controls the communications unit 703 to start the periodic scanning operation of searching for an access point APi (step S4002). As a result, the scanning operation is repeated at the cycle T.

The communications control unit 3501 acquires a scan result from the communications unit 703 (step S4003). The communications control unit 3501 determines whether the ESSID of the found AP is registered in the connection AP table 400 (step S4004).

If the ESSID of the found AP is registered (step S4004: YES), the communications control unit 3501 executes the connection process of connecting to the found AP (step S4005), and terminates a series of operations according to the flowchart.

On the other hand, if the ESSID of the found AP is not registered (step S4004: NO), the communications control unit 3501 determines whether the BSSID of the found AP is registered in the neighboring AP field of the neighboring AP table 3400 (step S4006).

If the BSSID of the found AP is not registered (step S4006: NO), the communications control unit 3501 sets the cycle T of the scanning operation of searching the access point APi to 150 [s] (step S4007), and terminates a series of operations according to the flowchart.

On the other hand, if the BSSID of the found AP is registered (step S4006: YES), the communications control unit 3501 sets the cycle T of the scanning operation of searching for an access point APi to 20 [s] (step S4008), and terminates a series of operations according to the flowchart.

As a result, if it can be determined that a connection AP is present in the vicinity of the mobile terminal device 101, the scanning operation can be performed at intervals of 20 seconds. If it can be determined that a connection AP is not present in the vicinity of the mobile terminal device 101, the scanning operation can be performed at intervals of 150 seconds.

A first registration procedure of the mobile terminal device 101 according to the second embodiment will be described. The first registration process is a process of registering the BSSID of the neighboring AP to the neighboring AP table 3400 at the time of connection to an access point APi.

Figure 41:
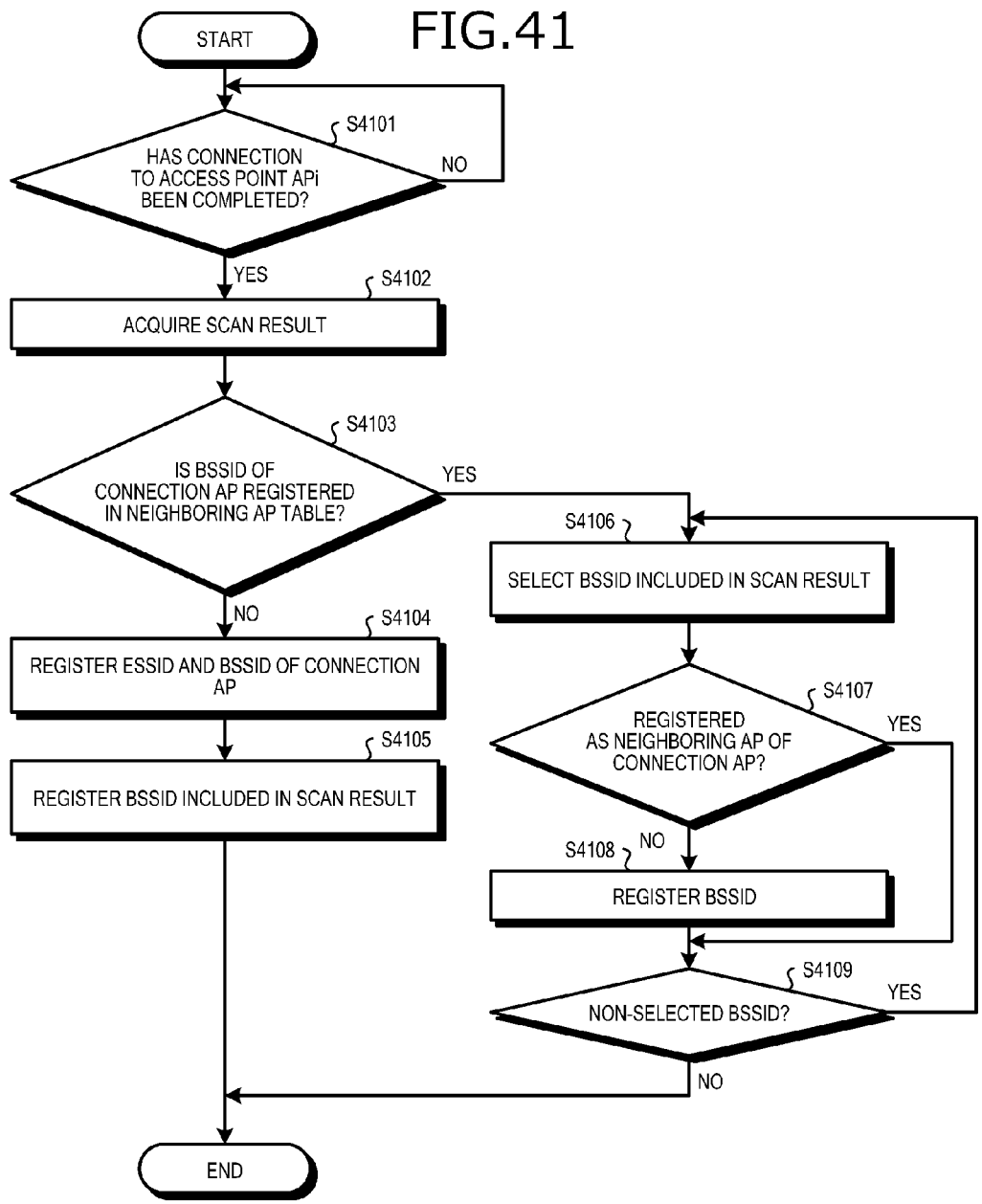
FIG. 41 is a flowchart of an example of a first registration procedure of the mobile terminal device 101 according to the second embodiment.

FIG. 41 is a flowchart of an example of the first registration procedure of the mobile terminal device 101 according to the second embodiment. In the flowchart depicted in FIG. 41, the communications control unit 3501 determines whether connection to the access point APi has been completed (step S4101).

The communications control unit 3501 waits until connection to the access point APi is completed (step S4101: NO). When connection to the access point APi has been completed (step S4101: YES), the communications control unit 3501 acquires the scan result obtained immediately before connection to the access point APi (step S4102).

The communications control unit 3501 determines whether the BSSID of the connection AP is registered in the BSSID field of the neighboring AP table 3400 (step S4103). If the BSSID of the connection AP is not registered (step S4103: NO), the communications control unit 3501 registers the ESSID and the BSSID of the connection AP into the ESSID field and the BSSID field of the neighboring AP table 3400 (step S4104).

The communications control unit 3501 registers the BSSID included in the scan result into the BSSID field that corresponds to the ESSID and the BSSID of the connection AP, in the neighboring AP table 3400 (step S4105) and terminates a series of operations according to the flowchart.

If the BSSID of the connection AP is already registered at step S4103 (step S4103: YES), the communications control unit 3501 selects a non-selected BSSID included in the scan result (step S4106). The communications control unit 3501 refers to the neighboring AP table 3400 and determines whether the selected BSSID is registered as a neighboring AP of the connection AP (step S4107).

If the BSSID is registered as a neighboring AP of the connection AP (step S4107: YES), the communications control unit 3501 proceeds to step S4109. On the other hand, if the BSSID is not registered as a neighboring AP of the connection AP (step S4107: NO), the communications control unit 3501 registers the selected BSSID into the BSSID field that corresponds to the ESSID and BSSID of the connection AP in the neighboring AP table 3400 (step S4108).

The communications control unit 3501 determines whether a non-selected BSSID is present that has not yet been selected from the scan result (step S4109). If a non-selected BSSID is present (step S4109: YES), the communications control unit 3501 returns to step S4106. On the other hand, if no non-selected BSSID is present (step S4109: NO), the communications control unit 3501 terminates a series of operations according to the flowchart.

As a result, the BSSID of the neighboring AP present in the vicinity of the connection AP can be registered to the neighboring AP table 3400 at the time of connection to an access point APi.

A second registration procedure of the mobile terminal device 101 according to the second embodiment will be described. The second registration process is a process of registering the BSSID of the neighboring AP to the neighboring AP table 3400 when the connection to a connection AP is lost. It is noted that the certain time W is "1 [minute]".

Figure 42:
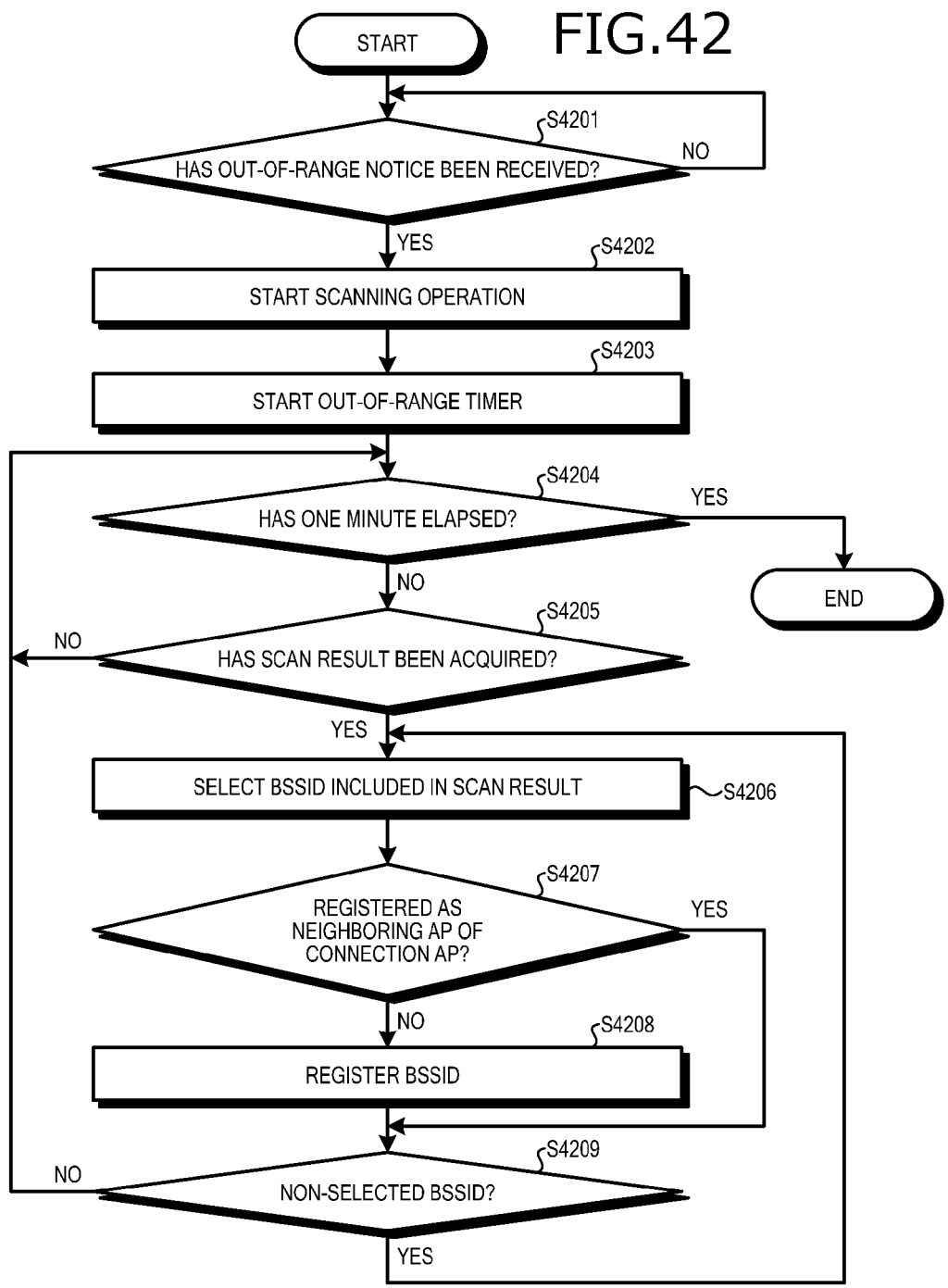
FIG. 42 is a flowchart of an example of a second registration procedure of the mobile terminal device 101 according to the second embodiment.

FIG. 42 is a flowchart of an example of the second registration procedure of the mobile terminal device 101 according to the second embodiment. In the flowchart depicted in FIG. 42, the communications control unit 3501 determines whether an out-of-range notice has been received from the communications unit 703 (step S4201). The out-of-range notice includes the ESSID and the BSSID of the connection AP to which connection has been lost, for example.

The communications control unit 3501 waits until an out-of-range notice is received (step S4201: NO). When an out-of-range notice has been received (step S4201: YES), the communications control unit 3501 starts the periodic scanning operation of searching for an access point APi (step S4002) and starts the out-of-range timer (step S4203).

The communications control unit 3501 determines whether one minute has elapsed on the out-of-range timer (step S4204). If one minute has not elapsed on the out-of-range timer (step S4204: NO), the communications control unit 3501 determines whether a scan result has been acquired from the communications unit 703 (step S4205).

If a scan result has not been acquired (step S4205: NO), the communications control unit 3501 returns to step S4204. On the other hand, if a scan result has been acquired (step S4205: YES), the communications control unit 3501 selects a non-selected BSSID included in the scan result (step S4206).

The communications control unit 3501 refers to the neighboring AP table 3400 and determines whether the selected BSSID is registered as a neighboring AP of the connection AP to which connection has been lost (step S4207). If the BSSID is registered as a neighboring AP of the connection AP to which connection has been lost (step S4207: YES), the communications control unit 3501 proceeds to step S4209.

On the other hand, if the BSSID is not registered as a neighboring AP of the connection AP to which connection has been lost (step S4207: NO), the communications control unit 3501 registers the selected BSSID into the BSSID field that corresponds to the ESSID and the BSSID of the connection AP to which connection has been lost, in the neighboring AP table 3400 (step S4208).

The communications control unit 3501 determines whether a non-selected BSSID is present that has not yet been selected from the scan result (step S4209). If a non-selected BSSID is present (step S4209: YES), the communications control unit 3501 returns to step S4206. On the other hand, if no non-selected BSSID is present (step S4209: NO), the communications control unit 3501 returns to step S4204.

If one minute has elapsed on the out-of-range timer at step S4204 (step S4204: YES), the communications control unit 3501 terminates a series of operations according to the flowchart. As a result, the scope of searching for an access point APi at the cycle T1 is widened and the connectability to a connection AP can be enhanced.

As described above, if a connection AP is present in the vicinity of the mobile terminal device 101, the mobile terminal device 101 according to the second embodiment can perform the scanning operation at relatively short time intervals of about 20 seconds to enhance the connectability to the available access point APi.

If no connection AP is present in the vicinity of the mobile terminal device 101, the mobile terminal device 101 can perform the scanning operation at relatively long time intervals of about 150 seconds to suppress the power consumed for the scanning operation for the access point APi.

The mobile terminal device 101 can register to the neighboring AP table 3400, the BSSID included in the scan result obtained at the time of connection to a connection AP, as the BSSID of the neighboring AP present in the vicinity of the connection AP.

The mobile terminal device 101 can register to the neighboring AP table 3400, the BSSID included in the scan result obtained within the certain time W from disconnection of the connection to the connection AP, as the BSSID of the neighboring AP present in the vicinity of the connection AP. As a result, the scope of searching for an access point APi at the cycle T1 is widened and the connectability to the connection AP can be enhanced.

The mobile terminal device 101 according to a third embodiment will be described. Portions identical to those described in the first and second embodiments will not be described hereinafter.

Figure 43:
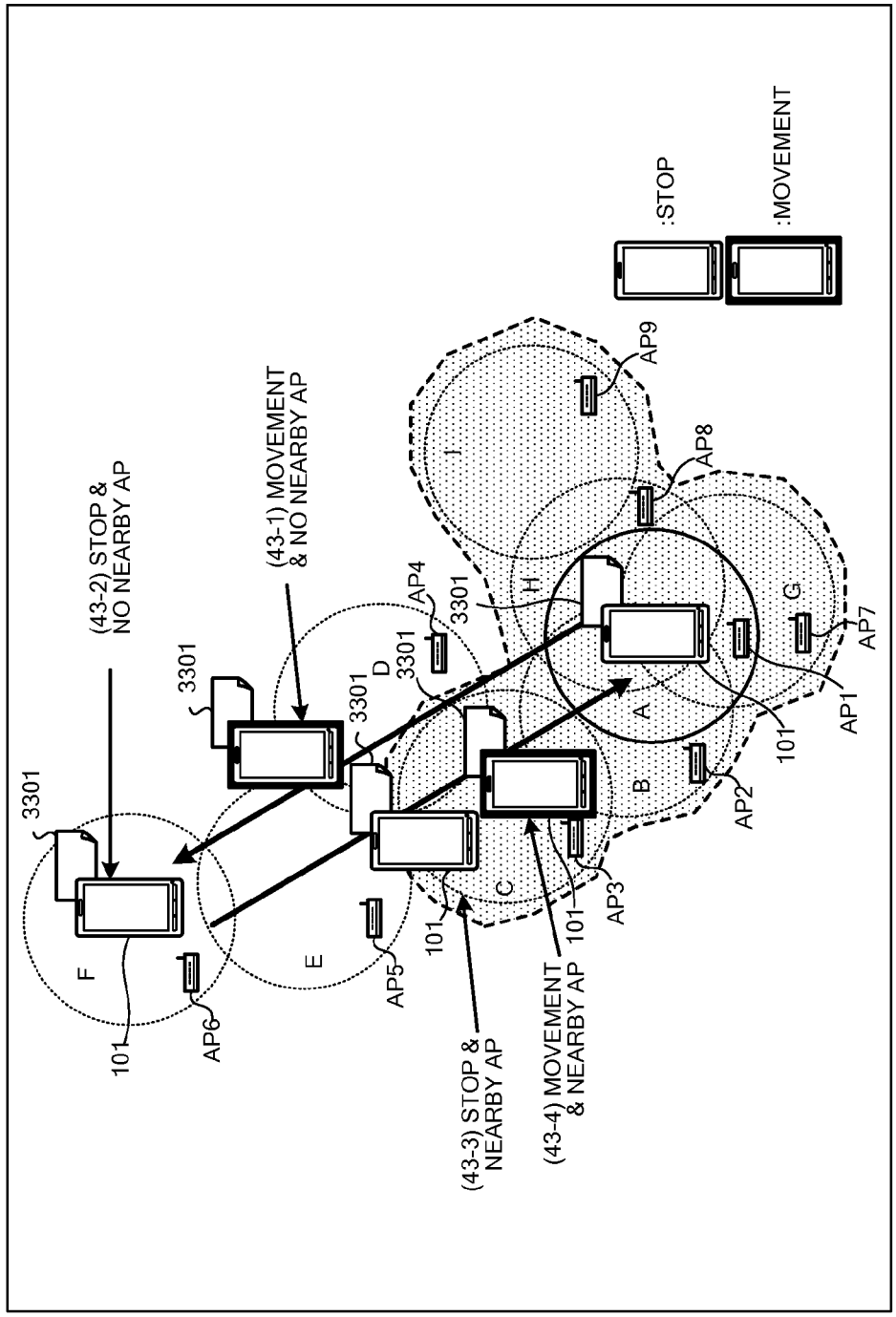
FIG. 43 is an explanatory diagram of an example of a control method according to a third embodiment.

FIG. 43 is an explanatory diagram of an example of a control method according to the third embodiment. In FIG. 43, the mobile terminal device 101 has the neighboring access point information 3301 and can wirelessly communicate with the access points APi (access points AP1 to AP9 in the example depicted in FIG. 43). Among the access points AP1 to AP9, the access point AP1 is the access point connecting the mobile terminal device 101 to the network 210 (refer to FIG. 2). The access points AP2, AP3, and AP7 to AP9 are the neighboring APs present in the vicinity of the access point A1.

The mobile terminal device 101 controls the cycle T of the scanning operation of searching for an access point APi, based on a result of detection of whether the mobile terminal device 101 has moved and a result of determination on whether an entry corresponding to the BSSID of the found AP has been retrieved from the neighboring access point information 3301.

An operation example of the mobile terminal device 101 according to the third embodiment will be described hereinafter. It is assumed that, in the neighboring access point information 3301, the BSSID of the access point AP1 acting as the connection AP is correlated with the BSSIDs of the access points AP2, AP3, and AP7 to AP9 acting as the neighboring APs present in the vicinity of the access point AP1.

(43-1) If the mobile terminal device 101 detects the movement thereof and an entry corresponding to the BSSID of the found AP is not retrieved, the mobile terminal device 101 sets the cycle T of the scanning operation of searching for an access point APi to the cycle T2. In other words, the mobile terminal device 101 sets the cycle T of the scanning operation to a relatively long time interval of about 150 seconds if the mobile terminal device 101 is not located in the vicinity of a connection AP even when the user is moving.

(43-2) If the mobile terminal device 101 detects a stop thereof and the entry corresponding to the BSSID of the found AP is not retrieved, the mobile terminal device 101 suspends the scanning operation of searching the access point APi. In other words, the mobile terminal device 101 suspends the scanning operation if the user is at a stop (has stopped moving) and the mobile terminal device 101 is not located in the vicinity of a connection AP.

(43-3) If the mobile terminal device 101 detects a stop thereof and an entry corresponding to the BSSID of the found AP is retrieved, the mobile terminal device 101 sets the cycle T of the scanning operation of searching for an access point APi to the cycle T2. In other words, the mobile terminal device 101 sets the cycle T of the scanning operation to a relatively long time interval of about 150 seconds if the user is at a stop even when the mobile terminal device 101 is located in the vicinity of a connection AP.

(43-4) If the mobile terminal device 101 detects the movement thereof and an entry corresponding to the BSSID of the found AP is retrieved, the mobile terminal device 101 sets the cycle T of the scanning operation of searching for an access point APi to the cycle T1. In other words, the mobile terminal device 101 sets the cycle T of the scanning operation to a relatively short time interval of about 20 seconds if the user is moving and the mobile terminal device 101 is located in the vicinity of a connection AP.

As described above, the mobile terminal device 101 can set the cycle T of the scanning operation to a relatively long time interval of about 150 seconds if the mobile terminal device 101 is not located in the vicinity of a connection AP even when the user is moving. As a result, the mobile terminal device 101 can suppress the power consumed for the scanning operation of searching to an access point APi while ensuring the connectability to an available access point APi.

The mobile terminal device 101 can suspend the scanning operation if the user is at a stop and the mobile terminal device 101 is not located in the vicinity of a connection AP. As a result, the mobile terminal device 101 can suspend the scanning operation in a situation where the possibility of connecting to the access point APi is low even if the scanning operation of searching for an access point APi is continued, thereby suppressing the power consumed for the scanning operation for the access point APi.

The mobile terminal device 101 can set the cycle T of the scanning operation to a relatively long time interval of about 150 seconds if the user is at a stop even when the mobile terminal device 101 is located in the vicinity of a connection AP. As a result, the mobile terminal device 101 can suppress the power consumed for the scanning operation of searching for an access point APi while ensuring the connectability to an available access point APi.

The mobile terminal device 101 can set the cycle T of the scanning operation to a relatively short time interval of about 20 seconds if the user is moving and the mobile terminal device 101 is located in the vicinity of a connection AP, and can increase the connectability to an available access point APi.

Figure 44:
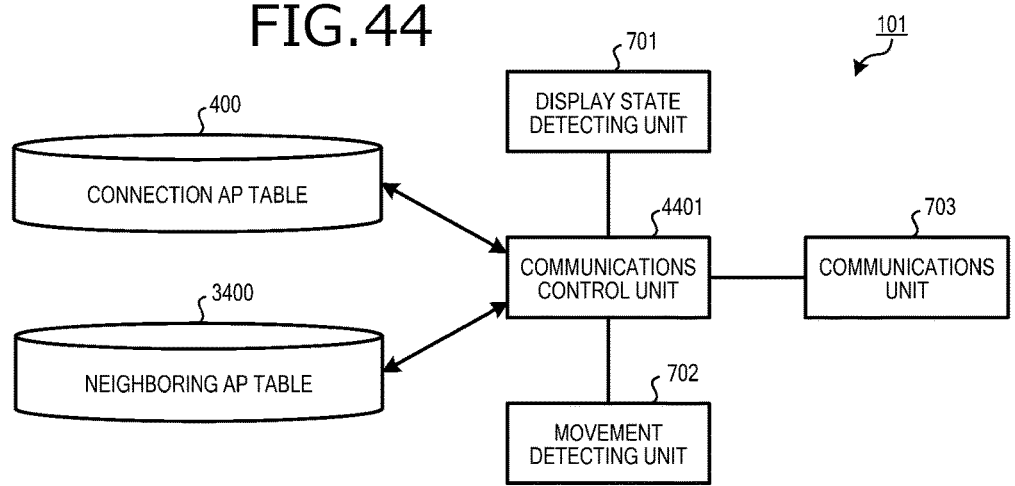
FIG. 44 is a block diagram of a functional configuration example of the mobile terminal device 101 according to the third embodiment.

FIG. 44 is a block diagram of a functional configuration example of the mobile terminal device 101 according to the third embodiment. In FIG. 44, the mobile terminal device 101 is configured to include the display state detecting unit 701, the movement detecting unit 702, the communications unit 703, and a communications control unit 4401. Functions of the functional units are realized by, for example, causing the CPU 301 to run a program stored in the memory 302 depicted in FIG. 3 or by hardware such as the public network I/F 305, the WLAN I/F 306, and sensor 310. Processing results of the functional units are stored, for example, to the memory 302. Functional units identical to those described in the first and second embodiments are given the same reference numerals used in the first and second embodiments, and redundant description thereof is omitted hereinafter.

The communications control unit 4401 has a function of controlling the cycle T of the scanning operation of searching for an access point APi. Specifically, for example, if an access point APi is found, the communications control unit 4401 searches for neighboring access point information in which the BSSID of the found AP is set in the BSSID field of the neighboring AP table 3400 depicted in FIG. 34.

For example, if an access point APi is found, the communications control unit 4401 determines whether the mobile terminal device 101 is moving. More specifically, for example, if an access point APi is found, the communications control unit 4401 sends a movement/stop detection request to the movement detecting unit 702. The movement/stop detection request requests detection of movement of the mobile terminal device 101. If a movement detection notice is received from the movement detecting unit 702, the communications control unit 4401 determines that the mobile terminal device 101 is moving. On the other hand, if a stop detection notice is received from the movement detecting unit 702, the communications control unit 4401 determines that the mobile terminal device 101 is not moving, i.e., that the mobile terminal device 101 is at a stop.

If neighboring access point information is retrieved and it is determined that the mobile terminal device 101 is not moving, the communications control unit 4401 sets the cycle T of the scanning operation of searching for an access point APi by the communications unit 703 to the cycle T2. For example, the cycle T2 is set to a relatively long time interval of about 150 seconds.

As a result, even when a connection AP is present in the vicinity of the mobile terminal device 101, the scanning operation can be performed at a relatively long time interval of about 150 seconds if the user is not moving, and the power consumed for the scanning operation of searching for an access point APi can be suppressed.

If neighboring access point information is retrieved and it is determined that the mobile terminal device 101 is moving, the communications control unit 4401 sets the cycle T of the scanning operation of searching for an access point APi by the communications unit 703 to the cycle T1. For example, the cycle T1 is set to a relatively short time interval of about 20 seconds.

As a result, if a connection AP is present in the vicinity of the mobile terminal device 101 and the user is moving, the scanning operation can be performed at a relatively short time interval of about 20 seconds and the connectability to an available access point APi can be enhanced.

If neighboring access point information is not retrieved and it is determined that the mobile terminal device 101 is moving, the communications control unit 4401 sets the cycle T of the scanning operation of searching for an access point APi by the communications unit 703 to the cycle T2. As a result, even when the user is moving, the scanning operation can be performed at a relatively long time interval of about 150 seconds if no connection AP is present in the vicinity, and the power consumed for the scanning operation can be suppressed while ensuring the connectability to an available access point APi.

If neighboring access point information is not retrieved and it is determined that the mobile terminal device 101 is not moving, the communications control unit 4401 suspends the scanning operation of searching for an access point APi by the communications unit 703. As a result, the scanning operation can be suspended in a situation where the possibility of connecting to an access point APi is low even if the scanning operation of searching for an access point APi is continued, and the power consumed for the scanning operation of searching for an access point APi can be suppressed.

If neighboring access point information is not retrieved and it is determined that the mobile terminal device 101 is not moving, the communications control unit 4401 may perform the scanning operation at time intervals longer than the cycle T2. As a result, the power consumed for the scanning operation can be suppressed while ensuring the connectability to the available access point APi even in a situation where the possibility of connecting to the access point APi is low.

A control process example of the mobile terminal device 101 according to the third embodiment will be described with reference to FIG. 45. In the description hereinafter, some of the operations included in the control process of the mobile terminal device 101 may be omitted.

Figure 45:
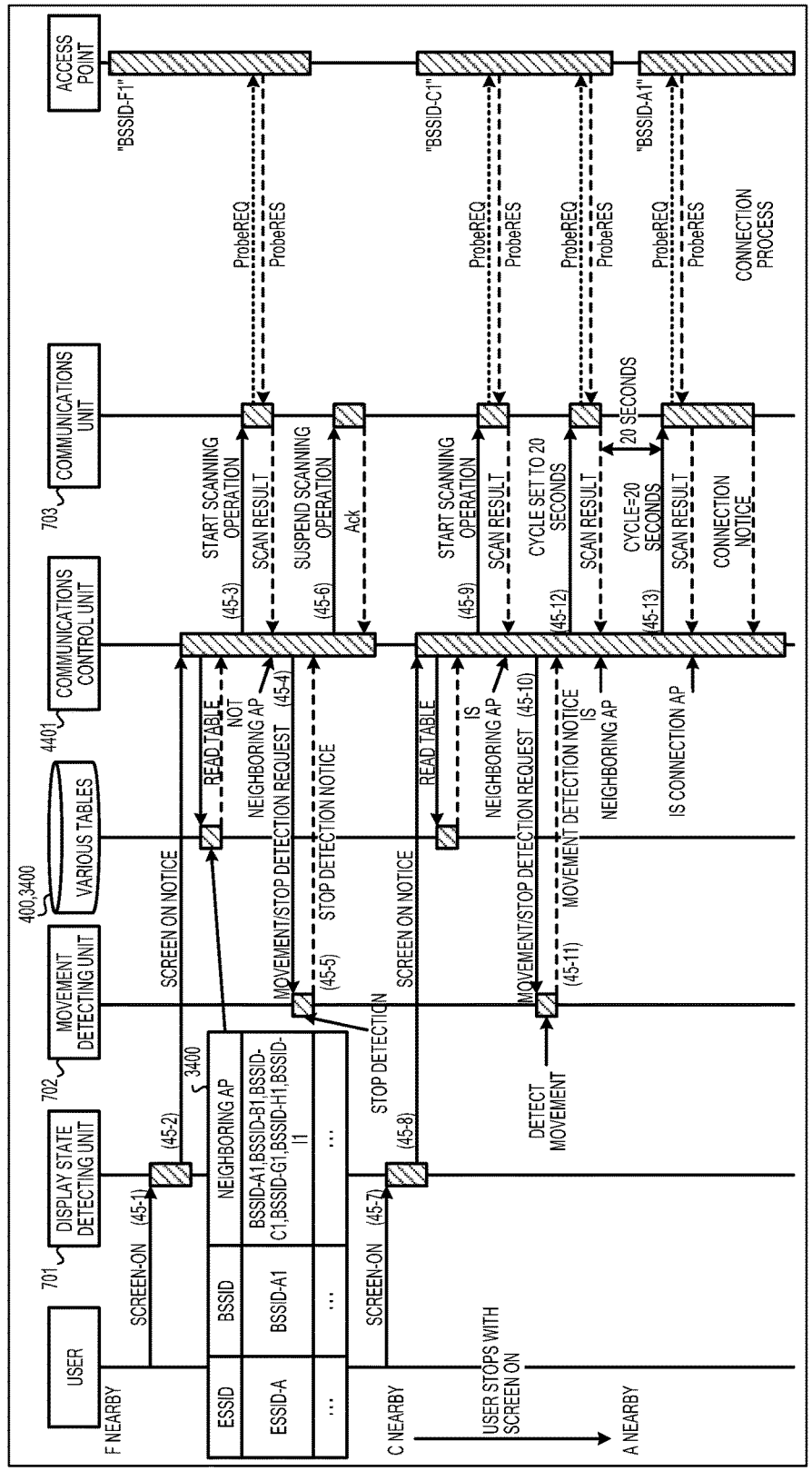
FIG. 45 is an explanatory diagram of a control process example of the mobile terminal device 101 according to the third embodiment.

FIG. 45 is an explanatory diagram of a control process example of the mobile terminal device 101 according to the third embodiment. In FIG. 45, (45-1) the display state detecting unit 701 detects that the display state of the display 303 has transitioned from non-display to display. In this example, as a result of switching of the display state of the display 303 from non-display to display by user operation, it is detected that the display state of the display 303 has transitioned from non-display to display.

(45-2) Upon detecting that the display state of the display 303 has transitioned from non-display to display, the display state detecting unit 701 sends a screen ON notice to the communications control unit 4401.

(45-3) Upon receiving the screen ON notice, the communications control unit 4401 controls the communications unit 703 to start the scanning operation of searching for an access point APi. In the example depicted in FIG. 45, as a result of performing the scanning operation, the access point AP6 of the BSSID "BSSID-F1" (refer to FIG. 43) is found.

It is assumed that the ESSID "ESSID-F" of the found AP (access point AP6) is not registered in the connection AP table 400 (refer to FIG. 4). In this case, the connection process of connecting to the found AP is not executed. It is also assumed that the BSSID "BSSID-F1" of the found AP (access point AP6) is not set in the BSSID field of the neighboring AP table 3400 (refer to FIG. 34). In this case, neighboring access point information having the BSSID "BSSID-F1" of the found AP (access point AP6) set therein is not retrieved.

(45-4) The communications control unit 4401 sends a movement/stop detection request to the movement detecting unit 702.

(45-5) Upon receiving the movement/stop detection request, the movement detecting unit 702 detects for movement of the mobile terminal device 101. It is assumed that movement of the mobile terminal device 101 is not detected. In this case, the movement detecting unit 702 sends a stop detection notice to the communications control unit 4401.

(45-6) If neighboring access point information having the BSSID "BSSID-F1" of the found AP (access point AP6) set therein is not retrieved and a stop detection notice is received, the communications control unit 4401 suspends the scanning operation of searching for an access point APi.

It is assumed that the user of the mobile terminal device 101 turns off the screen and moves from the communication area of the access point AP6 to the communication area of the access point AP3 (refer to FIG. 43).

(45-7) The display state detecting unit 701 detects that the display state of the display 303 has transitioned from non-display to display. In this example, as a result of switching of the display state of the display 303 from non-display to display by user operation, it is detected that the display state of the display 303 has transitioned from non-display to display.

(45-8) Upon detecting that the display state of the display 303 has transitioned from non-display to display, the display state detecting unit 701 sends a screen ON notice to the communications control unit 4401.

(45-9) Upon receiving the screen ON notice, the communications control unit 4401 controls the communications unit 703 to start the scanning operation of searching for an access point APi. In the example depicted in FIG. 45, as a result of performing the scanning operation, the access point AP3 of the BSSID "BSSID-C1" (refer to FIG. 43) is found.

It is assumed that the ESSID "ESSID-C" of the found AP (access point AP3) is not registered in the connection AP table 400. In this case, the connection process of connecting to the found AP is not executed. It is also assumed that the BSSID "BSSID-C1" of the found AP (access point AP3) is set in the BSSID field of the neighboring AP table 3400. In this case, neighboring access point information having the BSSID "BSSID-C1" of the found AP (access point AP3) set therein is retrieved.

(45-10) The communications control unit 4401 sends a movement/stop detection request to the movement detecting unit 702.

(45-11) Upon receiving the movement/stop detection request, the movement detecting unit 702 detects for movement of the mobile terminal device 101. It is assumed that movement of the mobile terminal device 101 is detected. In this case, the movement detecting unit 702 sends a movement detection notice to the communications control unit 4401.

(45-12) If neighboring access point information having the BSSID "BSSID-C1" of the found AP (access point AP3) set therein is retrieved and a movement detection notice has been received, the communications control unit 4401 sets the cycle T of the scanning operation to the cycle T1. In the example of FIG. 45, the cycle T1 is set to 20 seconds.

It is assumed that as a result of the scanning operation of searching for an access point APi performed at intervals of 20 seconds, the access point AP1 of the ESSID "ESSID-A" (refer to FIG. 43) is found. It is also assumed that the ESSID "ESSID-A" of the found AP (access point AP1) is registered in the connection AP table 400.

(45-13) Since the ESSID "ESSID-A" of the found AP (access point AP1) is registered in the connection AP table 400, the communications control unit 4401 suspends the scanning operation of searching for an access point APi by the communication unit 703. The communications control unit 4401 controls the communications unit 703 to execute the connection process of connecting to the found AP (access point AP1).

The control procedure of the mobile terminal device 101 according to the third embodiment will be described. It is noted that the cycle T1 of the scanning operation of searching for an access point APi is "T1=20 [s]" while the cycle T2 is "T2=150 [s]".

Figure 46:
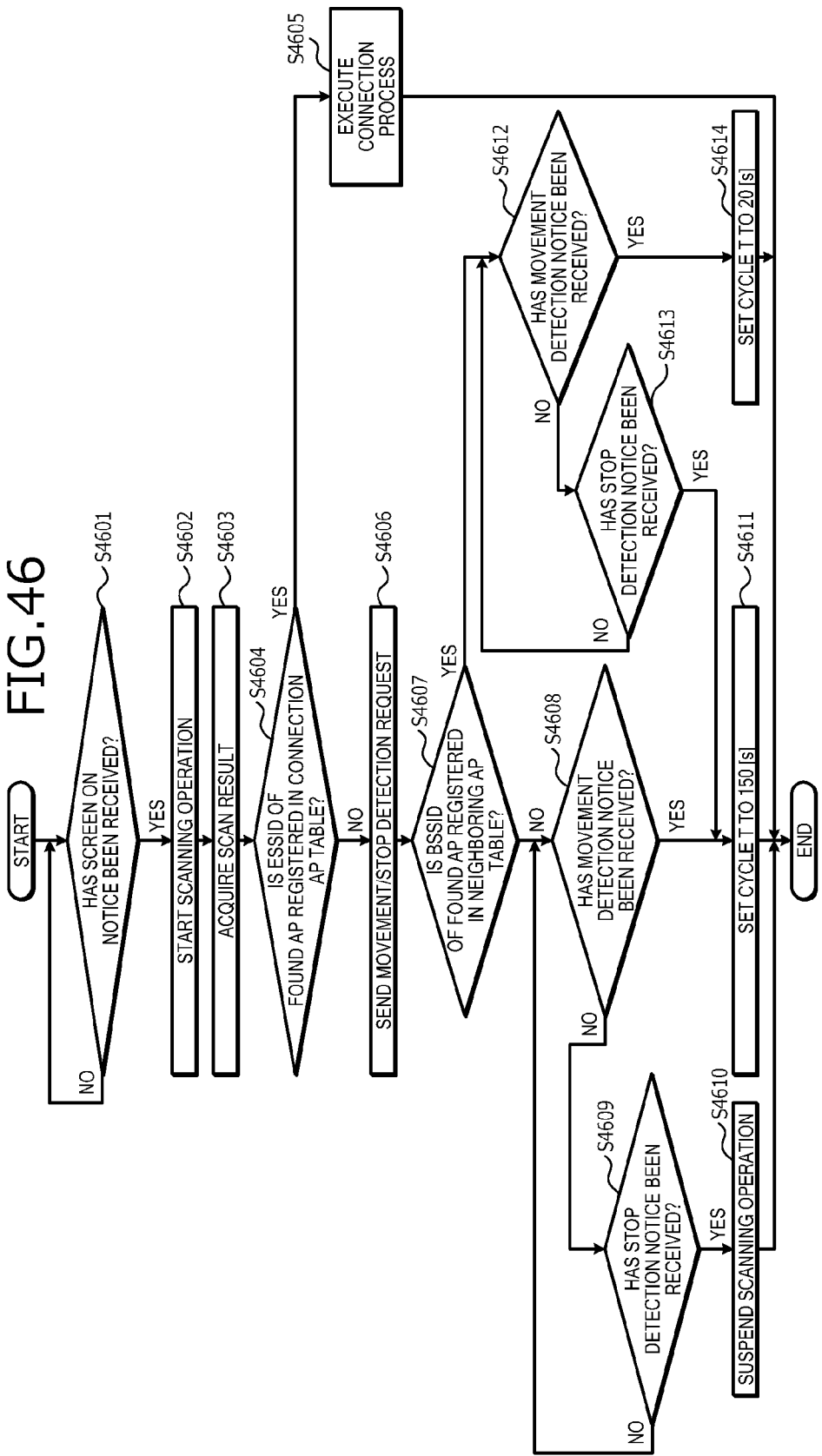
FIG. 46 is a flowchart of an example of a control procedure of the mobile terminal device 101 according to the third embodiment.

FIG. 46 is a flowchart of an example of the control procedure of the mobile terminal device 101 according to the third embodiment. In the flowchart depicted in FIG. 46, the communications control unit 4401 determines whether a screen ON notice has been received from the display state detecting unit 701 (step S4601).

The communications control unit 4401 waits until a screen ON notice has been received (step S4601: NO). When a screen ON notice has been received (step S4601: YES), the communications control unit 4401 controls the communications unit 703 to start the scanning operation of searching for an access point APi (step S4602).

The communications control unit 4401 acquires a scan result from the communications unit 703 (step S4603). The communications control unit 4401 determines whether the ESSID of the found AP is registered in the connection AP table 400 (step S4604). If the ESSID of the found AP is registered (step S4604: YES), the communications control unit 4401 executes the connection process of connecting to the found AP (step S4605), and terminates a series of operations according to the flowchart.

On the other hand, if the ESSID of the found AP is not registered (step S4604: NO), the communications control unit 4401 sends a movement/stop detection request to the movement detecting unit 702 (step S4606). The communications control unit 4401 determines whether the BSSID of the found AP is registered in the neighboring AP field of the neighboring AP table 3400 (step S4607).

If the BSSID of the found AP is not registered (step S4607: NO), the communications control unit 4401 determines whether a movement detection notice has been received from the movement detecting unit 702 (step S4608). If a movement detection notice has not been received (step S4608: NO), the communications control unit 4401 determines whether a stop detection notice has been received from the movement detecting unit 702 (step S4609).

If a stop detection notice has not been received (step S4609: NO), the communications control unit 4401 returns to step S4608. On the other hand, if a stop detection notice has been received (step S4609: YES), the communications control unit 4401 suspends the scanning operation of searching for an access point APi by the communications unit 703 (step S4610) and terminates a series of operations according to the flowchart.

If a movement detection notice has been received at step S4608 (step S4608: YES), the communications control unit 4401 sets the cycle T of the scanning operation of searching for an access point APi to 150 [s] (step S4611) and terminates a series of operations according to the flowchart.

If the BSSID of the found AP has been registered at step S4607 (step S4607: YES), the communications control unit 4401 determines whether a movement detection notice has been received from the movement detecting unit 702 (step S4612). If a movement detection notice has not been received (step S4612: NO), the communications control unit 4401 determines whether a stop detection notice has been received from the movement detecting unit 702 (step S4613).

If a stop detection notice has not been received (step S4613: NO), the communications control unit 4401 returns to step S4612. On the other hand, if a stop detection notice has been received (step S4613: YES), the communications control unit 4401 returns to step S4611.

If a movement detection notice has been received at step S4612 (step S4612: YES), the communications control unit 4401 sets the cycle T of the scanning operation of searching for an access point APi to 20 [s] (step S4614) and terminates a series of operations according to the flowchart.

As a result, the cycle T of the scanning operation of searching for an access point APi can be controlled based on a result of detection of whether the mobile terminal device 101 has moved and a result of determination of whether an entry corresponding to the BSSID of the found AP has been retrieved from the neighboring access point information 3301.

As described above, if the found AP is a neighboring AP and the mobile terminal device 101 is not moving, the mobile terminal device 101 according to the third embodiment can set the cycle T of the scanning operation of searching for an access point APi to the cycle T2. As a result, the mobile terminal device 101 can perform the scanning operation at relatively long time intervals of about 150 seconds if the user is not moving even when a connection AP is present in the vicinity of the mobile terminal device 101, and can suppress the power consumed for the scanning operation of searching for an access point APi.

If the found AP is a neighboring AP and the mobile terminal device 101 is moving, the mobile terminal device 101 can set the cycle T of the scanning operation of searching for an access point APi to the cycle T1. As a result, the mobile terminal device 101 can perform the scanning operation at relatively short time intervals of about 20 seconds if a connection AP is present in the vicinity of the mobile terminal device 101 and the user is moving, and can enhance the connectability to an available access point APi.

If the found AP is not a neighboring AP and the mobile terminal device 101 is moving, the mobile terminal device 101 can set the cycle T of the scanning operation of searching for an access point APi to the cycle T2. As a result, the mobile terminal device 101 can perform the scanning operation at relatively long time intervals of about 150 seconds if a connection AP is not present in the vicinity even when the user is moving, and can suppress the power consumed for the scanning operation while ensuring the connectability to an available access point APi.

If the found AP is not a neighboring AP and the mobile terminal device 101 is not moving, the mobile terminal device 101 can suspend the scanning operation of searching for an access point APi. As a result, the mobile terminal device 101 can suspend the scanning operation in a situation where the possibility of connecting to an access point APi is low even if the scanning operation for the access point APi is continued, thereby suppressing the power consumed for the scanning operation of searching for an access point APi.

The mobile terminal device 101 according to a fourth embodiment will be described. In the fourth embodiment, the BSSID of the neighboring AP is managed in correlation with a Cell-ID. The portions same as those described in the first to third embodiments will not be described.

A connection past-record table 4700 used by the mobile terminal device 101 will be described. The connection past-record table 4700 is realized by the memory 302 depicted in FIG. 3, for example.

FIG. 47 is an explanatory diagram of an example of the contents stored in the connection past-record table 4700. In FIG. 47, the connection past-record table 4700 has Cell-ID, ESSID, and last-connection-time fields. By setting information in the fields, connection past-record information (e.g., connection past-record information 4700-1) is stored as records.

The Cell-ID is area identification information identifying a cell Cj of a base station BSj of a mobile communications network. The ESSID is identification information of an access point APi having a past record of connection to the mobile terminal device 101 in the cell Cj. The last connection time indicates the date and time of the last connection of the mobile terminal device 101 to the access point APi in the cell Cj.

For example, the connection past-record information 4700-1 enables the identification of the date and time "Mar. 2, 2011, at 9:00" of the last connection of the mobile terminal device 101 to the access point APi in the cell C1 of the base station BS1.

For example, the last connection time is updated each time the connection to the access point APi is completed. Specifically, for example, when the connection to the access point APi is completed, the mobile terminal device 101 retrieves the connection past-record information corresponding to a combination of the Cell-ID of the cell Cj to which the mobile terminal device 101 belongs and the ESSID of the access point APi of the completed connection. The mobile terminal device 101 overwrites the time of connection to the access point APi in the last-connection-time field of the retrieved connection past-record information.

If connection past-record information is not retrieved from the connection past-record table 4700, the mobile terminal device 101 newly registers the connection past-record information in the connection past-record table 4700. Specifically, for example, the mobile terminal device 101 sets the Cell-ID of the cell Cj to which the mobile terminal device 101 belongs, the ESSID of the access point APi of the completed connection, and the time of connection in the fields of the connection past-record table 4700.

Although the ESSID of the access point APi is used as the identification information of the access point APi in the description above, configuration is not limited hereto. For example, the BSSID of the access point APi may be used as the identification information FIG. 48 is a block diagram of a functional configuration example of the mobile terminal device 101 according to the third embodiment. In FIG. 48, the mobile terminal device 101 is configured to include the display state detecting unit 701, the movement detecting unit 702, a first communications unit 4801, a second communications unit 4802, an acquiring unit 4803, a determining unit 4804, and a communications control unit 4805. Functions of the functional units are realized by, for example, causing the CPU 301 to run a program stored in the memory 302 depicted in FIG. 3 or by hardware such as the public network I/F 305, the WLAN I/F 306, and sensor 310. Processing results of the functional units are stored, for example, to the memory 302. Functional units identical to those described in the first to third embodiments are given the same reference numerals used in the first to third embodiments, and redundant description thereof is omitted hereinafter.

The first communications unit 4801 has a function of communicating with the access point APi. Specifically, for example, the first communications unit 4801 connects to the network 210 via the access point APi. The first communications unit 4801 corresponds to the communications unit 703 described above.

The second communications unit 4802 has a function of communicating with the base station BSj. Specifically, for example, the second communications unit 4802 periodically receives (e.g., every 2.56 [seconds]) base station information including the Cell-ID of the cell Cj from a communicable base station BSj among the base stations BS1 to BSm. For example, if the Cell-ID included in the received base station information is different from the Cell-ID included in the previously received base station information, the mobile terminal device 101 communicates with the base station BSj to register the position of the mobile terminal device 101.

The acquiring unit 4803 has a function of acquiring the Cell-ID identifying the cell Cj to which the mobile terminal device 101 belongs, among the cells C1 to Cm of the base stations BS1 to BSm. Specifically, for example, the acquiring unit 4803 acquires the Cell-ID included in the base station information received by the second communications unit 4802 as the Cell-ID of the cell Cj to which the mobile terminal device 101 belongs.

The mobile terminal device 101 may have multiple communicable base stations among the base stations BS1 to BSm. In this case, for example, the Cell-ID included in the base station information of the base station having the greatest radio wave strength among the multiple communicable base stations may be acquired as the Cell-ID identifying the cell Cj to which the mobile terminal device 101 belongs.

The determining unit 4804 has a function of determining whether there is past connection to an access point APi in the cell Cj to which the mobile terminal device 101 belongs. A past connection to an access point APi is a history indicative of completion of a connection operation to an access point APi.

Specifically, for example, if the display state detecting unit 701 detects that the display state of the display 303 has transitioned from non-display to display, the determining unit 4804 determines whether there is past connection to an access point APi in the cell Cj to which the mobile terminal device 101 belongs. More specifically, for example, the determining unit 4804 refers to the connection past-record table 4700 depicted in FIG. 47 to determine whether the ESSID of the access point APi is present and stored in correlation with the Cell-ID acquired by the acquiring unit 4803.

If the ESSID of the access point APi is present, the determining unit 4804 determines that there is past connection to an access point APi in the cell Cj to which the mobile terminal device 101 belongs. On the other hand, if the ESSID of the access point APi is not present, the determining unit 4804 determines that there is no past connection to an access point APi in the cell Cj to which the mobile terminal device 101 belongs.

The communications control unit 4805 has a function of controlling the cycle T of the scanning operation of searching for an access point APi based on a determination result determined by the determining unit 4804. Specifically, for example, if it is determined that there is no past connection to an access point APi, the communications control unit 4805 suspends the scanning operation of searching for an access point APi by the first communications unit 4801.

For example, if it is determined that there is past connection to an access point APi, the communications control unit 4805 retrieves neighboring access point information in which the BSSID of the found AP is set in the BSSID field of the neighboring AP table 3400 depicted in FIG. 34. For example, if it is determined that there is past connection to an access point APi, the communications control unit 4805 determines whether the mobile terminal device 101 is moving.

If neighboring access point information is retrieved and it is determined that the mobile terminal device 101 is not moving, the communications control unit 4805 sets the cycle T of the scanning operation of searching for an access point APi by the communications unit 703 to the cycle T2. Further, if neighboring access point information is retrieved and it is determined that the mobile terminal device 101 is moving, the communications control unit 4805 sets the cycle T of the scanning operation of searching for an access point APi by the communications unit 703 to the cycle T1.

Further, if neighboring access point information is not retrieved and it is determined that the mobile terminal device 101 is moving, the communications control unit 4805 sets the cycle T of the scanning operation of searching for an access point APi by the communications unit 703 to the cycle T2. If neighboring access point information is not retrieved and it is determined that the mobile terminal device 101 is not moving, the communications control unit 4805 suspends the scanning operation of searching for an access point APi by the communications unit 703.

As a result, if there is past connection to an access point APi in the cell Cj to which the mobile terminal device 101 belongs, the cycle T of the scanning operation of searching for an access point APi can be controlled.

A control process example of the mobile terminal device 101 according to the fourth embodiment will be described with reference to FIGS. 49 and 50. In the description hereinafter, some of the operations included in the control process of the mobile terminal device 101 may be omitted.

Figure 49:
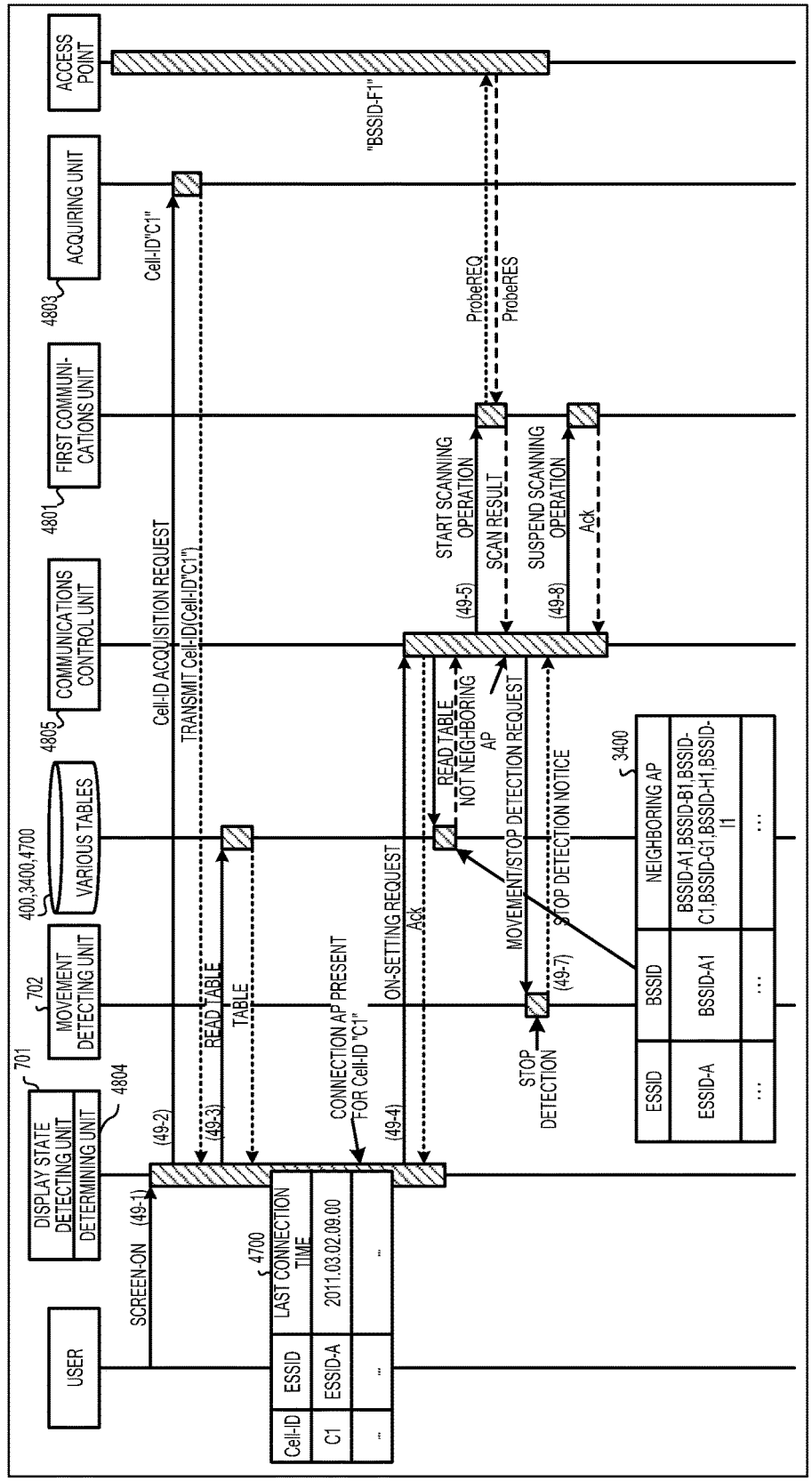
FIG. 49 is an explanatory view of a first control processing example of the mobile terminal device 101 according to a fourth embodiment.

FIG. 49 is an explanatory view of a first control processing example of the mobile terminal device 101 according to the fourth embodiment. In FIG. 49, (49-1) the display state detecting unit 701 detects a transition from non-display to display in the display state of the display 303. In this case, a transition from non-display to display in the display state of the display 303 is detected as a result of switching, consequent to user operation, from non-display to display in the display state of the display 303.

(49-2) Upon detecting that the display state of the display 303 has transitioned from non-display to display, the determining unit 4804 sends an acquisition request to the acquiring unit 4803 for the Cell-ID of the cell Cj to which the mobile terminal device 101 belongs and thereby acquires the Cell-ID of the cell Cj to which the mobile terminal device 101 belongs. In the example depicted in FIG. 49, the Cell-ID "C1" of the cell C1 is acquired.

(49-3) The determining unit 4804 reads the connection past-record table 4700 and determines whether there is past connection to an access point APi in the cell Cj to which the mobile terminal device 101 belongs. In the example depicted in FIG. 49, since connection past-record information corresponding to the acquired Cell-ID "C1" is already registered, it is determined that there is past connection to an access point APi.

(49-4) Upon determining that there is past connection to an access point APi in the cell Cj to which the mobile terminal device 101 belongs, the determining unit 4804 sends to an ON-setting request the communications control unit 4805. The ON-setting request is a request to start the scanning operation of searching for an access point APi.

(49-5) Upon receiving the ON-setting request from the determining unit 4804, the communications control unit 4805 controls the communications unit to start the scanning operation of searching for an access point APi. In the example depicted in FIG. 49, as a result of performing the scanning operation, the access point AP6 of the BSSID "BSSID-F1" (refer to FIG. 43) is found.

It is assumed that the ESSID "ESSID-F" of the found AP (access point AP6) is not registered in the connection AP table 400 (refer to FIG. 4). In this case, the connection process of connecting to the found AP is not executed. It is also assumed that the BSSID "BSSID-F1" of the found AP (access point AP6) is not set in the BSSID field of the neighboring AP table 3400 (refer to FIG. 34). In this case, neighboring access point information having the BSSID "BSSID-F1" of the found AP (access point AP6) set therein is not retrieved.

(49-6) The communications control unit 4805 sends a movement/stop detection request to the movement detecting unit 702.

(49-7) Upon receiving the movement/stop detection request, the movement detecting unit 702 detects for movement of the mobile terminal device 101. It is assumed that the movement of the mobile terminal device 101 is not detected. In this case, the movement detecting unit 702 sends a stop detection notice to the communications control unit 4805.

(49-8) If neighboring access point information having the BSSID "BSSID-F1" of the found AP (access point AP6) set therein is not retrieved and a stop detection notice is received, the communications control unit 4805 suspends the scanning operation for the access point APi.

Figure 50:
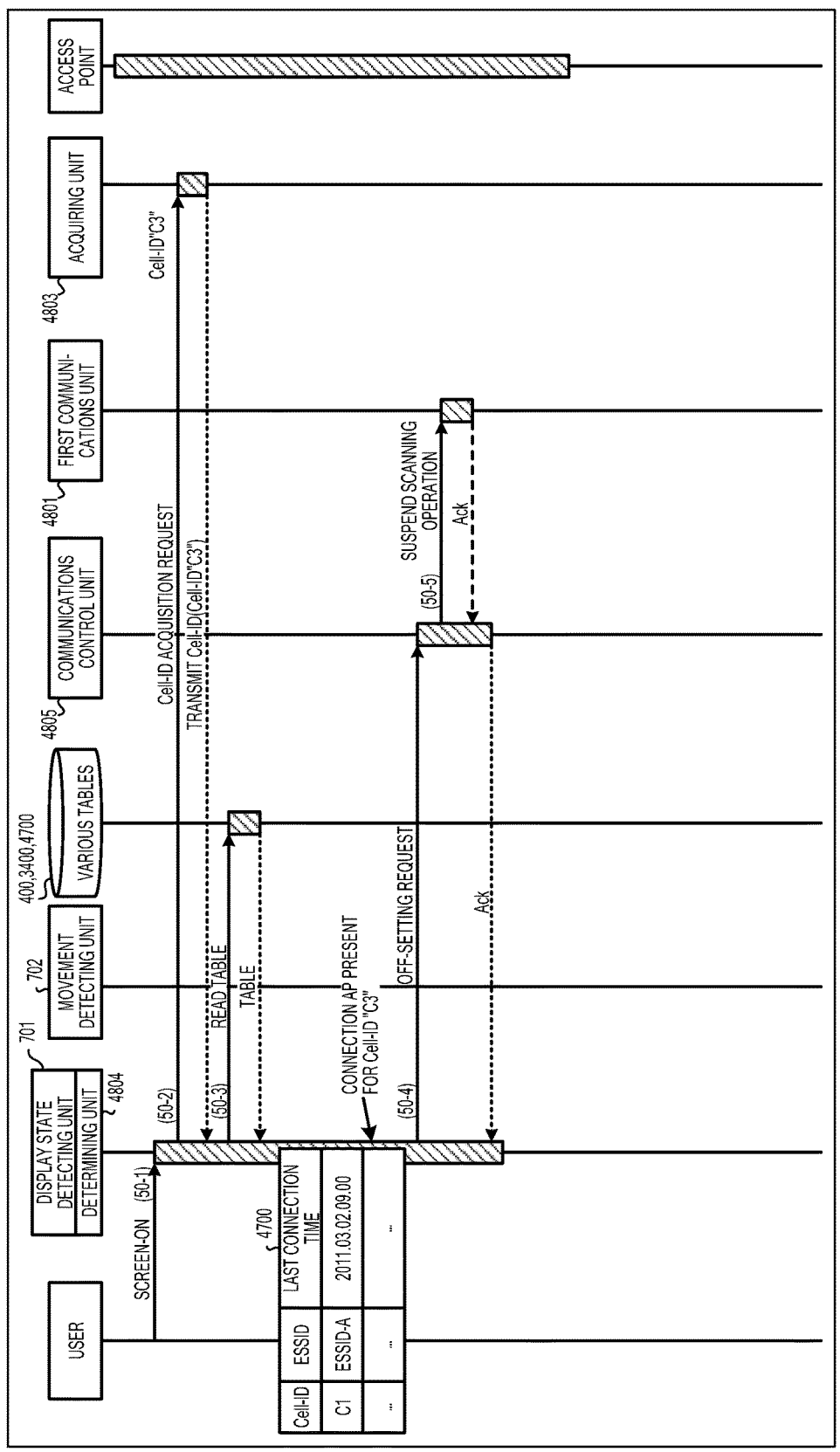
FIG. 50 is an explanatory view of a second control processing example of the mobile terminal device 101 according to the fourth embodiment.

FIG. 50 is an explanatory view of a second control processing example of the mobile terminal device 101 according to the fourth embodiment. In FIG. 50, (50-1) the display state detecting unit 701 detects a transition from non-display to display in the display state of the display 303. In this case, a transition from non-display to display in the display state of the display 303 is detected as a result of switching, consequent to user operation, from non-display to display in the display state of the display 303.

(50-2) Upon detecting that the display state of the display 303 has transitioned from non-display to display, the determining unit 4804 sends an acquisition request to the acquiring unit 4803 for the Cell-ID of the cell Cj to which the mobile terminal device 101 belongs and thereby, acquires the Cell-ID of the cell Cj to which the mobile terminal device 101 belongs. In the example depicted in FIG. 50, the Cell-ID "C3" of the cell C1 is acquired.

(50-3) The determining unit 4804 reads the connection past-record table 4700 and determines whether there is past connection to an access point APi in the cell Cj to which the mobile terminal device 101 belongs. In the example depicted in FIG. 50, since no connection past-record information corresponding to the acquired Cell-ID "C3" is registered, it is determined that there is no past connection to an access point APi.

Upon determining that there is no past connection to an access point APi in the cell Cj to which the mobile terminal device 101 belongs, the determining unit 4804 sends an OFF-setting request to the communications control unit 4805. The OFF-setting request is a request to suspend the scanning operation of searching for an access point APi.

(50-5) Upon receiving the OFF-setting request from the determining unit 4804, the communications control unit 4805 controls the communications unit to suspend the scanning operation of searching for an access point APi.

Various procedures of the mobile terminal device 101 according to the fourth embodiment will be described. First, description will be made of a determination procedure of determining whether there is past connection to an access point APi in the cell Cj to which the mobile terminal device 101 belongs.

Figure 51:
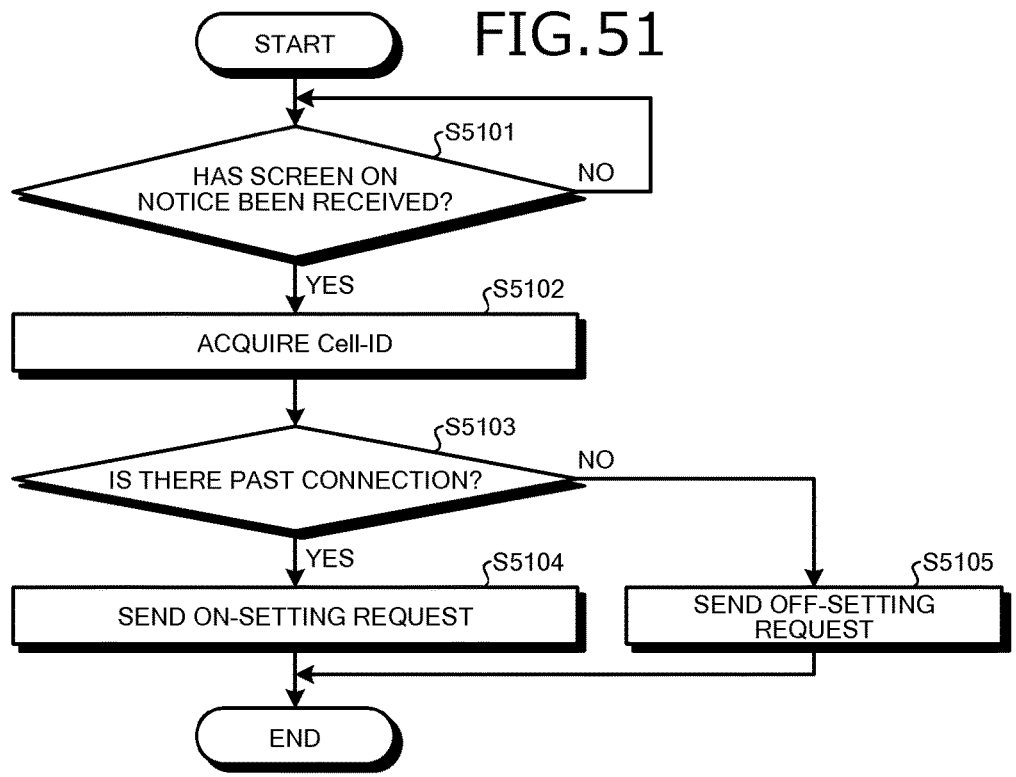
FIG. 51 is a flowchart of an example of a determination procedure of the mobile terminal device 101 according to the fourth embodiment.

FIG. 51 is a flowchart of an example of the determination procedure of the mobile terminal device 101 according to the fourth embodiment. In the flowchart depicted in FIG. 51, the determining unit 4804 determines whether a screen ON notice has been received from the display state detecting unit 701 (step S5101).

The determining unit 4804 waits until a screen ON notice is received (step S5101: NO). When a screen ON notice has been received (step S5101: YES), the determining unit 4804 sends an acquisition request to the acquiring unit 4803 for the Cell-ID of the cell Cj to which the mobile terminal device 101 belongs and thereby, acquires the Cell-ID of the cell Cj to which the mobile terminal device 101 belongs (step S5102).

The determining unit 4804 refers to the connection past-record table 4700 and determines whether there is past connection to an access point APi in the cell Cj to which the mobile terminal device 101 belongs, based on the acquired Cell-ID (step S5103). If there is past connection to an access point APi (step S5103: YES), the determining unit 4804 sends an ON-setting request to the communications control unit 4805 (step S5104) and terminates a series of operations according to the flowchart.

On the other hand, if there is no past connection to an access point APi (step S5103: NO), the determining unit 4804 sends an OFF-setting request to the communications control unit 4805 (step S5105) and terminates a series of operations according to the flowchart. As a result, it can be determined whether there is past connection to an access point APi in the cell Cj to which the mobile terminal device 101 belongs.

A control procedure of the mobile terminal device 101 according to the fourth embodiment will be described. It is noted that the cycle T1 of the scanning operation of searching the access point APi is "T1=20 [s]" while the cycle T2 is "T2=150 [s]".

Figure 52:
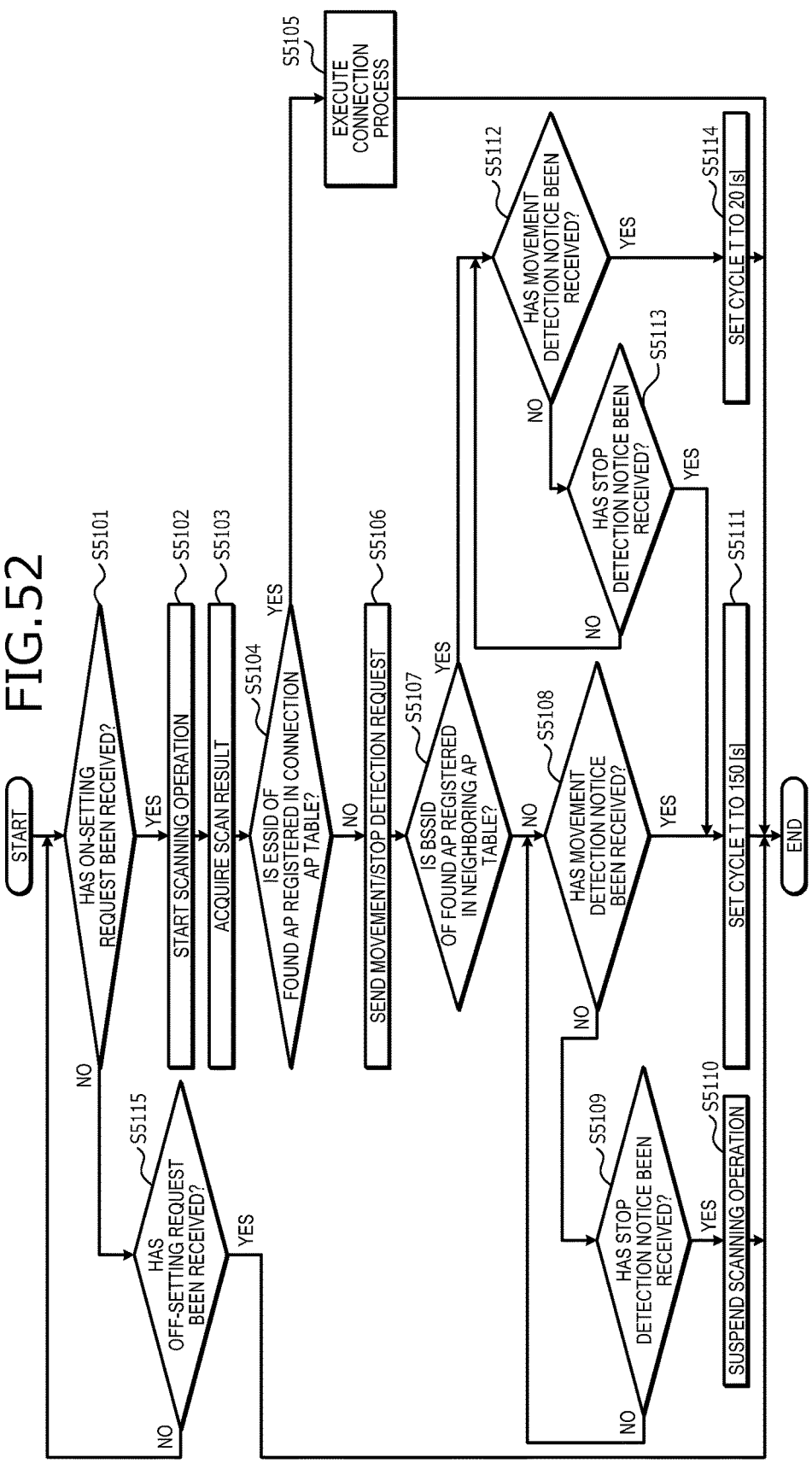
FIG. 52 is a flowchart of an example of a control procedure of the mobile terminal device 101 according to the fourth embodiment.

FIG. 52 is a flowchart of an example of the control procedure of the mobile terminal device 101 according to the fourth embodiment. In the flowchart depicted in FIG. 52, the communications control unit 4805 determines whether an ON-setting request has been received from the determining unit 4804 (step S5201). If an ON-setting request has been received (step S5201: YES), the communications control unit 4805 controls the communications unit to start the scanning operation of searching for an access point APi (step S5202).

The communications control unit 4805 acquires a scan result from the communications unit (step S5203). The communications control unit 4805 determines whether the ESSID of the found AP is registered in the connection AP table 400 (step S5204). If the ESSID of the found AP is registered (step S5204: YES), the communications control unit 4805 executes the connection process of connecting to the found AP (step S5205), and terminates a series of operations according to the flowchart.

On the other hand, if the ESSID of the found AP is not registered (step S5204: NO), the communications control unit 4805 sends a movement/stop detection request to the movement detecting unit 702 (step S5206). The communications control unit 4805 determines whether the BSSID of the found AP is registered in the neighboring AP field of the neighboring AP table 3400 (step S5207).

If the BSSID of the found AP is not registered (step S5207: NO), the communications control unit 4805 determines whether a movement detection notice has been received from the movement detecting unit 702 (step S5208). If a movement detection notice has not been received (step S5208: NO), the communications control unit 4805 determines whether a stop detection notice has been received from the movement detecting unit 702 (step S5209).

If a stop detection notice has not been received (step S5209: NO), the communications control unit 4805 returns to step S5208. On the other hand, if a stop detection notice has been received (step S5209: YES), the communications control unit 4805 suspends the scanning operation of searching for an access point APi by the communications unit (step S5210) and terminates a series of operations according to the flowchart.

If a movement detection notice has been received at step S5208 (step S5208: YES), the communications control unit 4805 sets the cycle T of the scanning operation of searching for an access point APi to 150 [s] (step S5211) and terminates a series of operations according to the flowchart.

If the BSSID of the found AP has been registered at step S5207 (step S5207: YES), the communications control unit 4805 determines whether a movement detection notice has been received from the movement detecting unit 702 (step S5212). If a movement detection notice has not been received (step S5212: NO), the communications control unit 4805 determines whether a stop detection notice has been received from the movement detecting unit 702 (step S5213).

If a stop detection notice has not been received (step S5213: NO), the communications control unit 4805 returns to step S5212. On the other hand, if a stop detection notice has been received (step S5213: YES), the communications control unit 4805 returns to step S5211.

If a movement detection notice has been received at step S5212 (step S5212: YES), the communications control unit 4805 sets the cycle T of the scanning operation of searching for an access point APi to 20 [s] (step S5214) and terminates a series of operations according to the flowchart.

If an ON-setting request has not been received at step S5201 (step S5201: NO), the communications control unit 4805 determines whether an OFF-setting request has been received from the determining unit 4804 (step S5215). If an OFF-setting request has not been received (step S5215: NO), the communications control unit 4805 returns to step S5201. On the other hand, if an OFF-setting request has been received (step S5215: YES), the communications control unit 4805 proceeds to step S5210.

As a result, if there is past connection to an access point APi in the cell Cj to which the mobile terminal device 101 belongs, the cycle T of the scanning operation of searching for an access point APi can be controlled. If there is no past connection to an access point APi in the cell Cj to which the mobile terminal device 101 belongs, the scanning operation of searching for an access point APi can be suspended.

Although the BSSID of the neighboring AP is managed by using the ESSID and BSSID of the connection AP as depicted in FIG. 34 in the description above, configuration is not limited hereto. For example, the BSSID of the neighboring AP may be managed by using the Cell-ID of the cell Cj instead of the ESSID and BSSID of the connection AP.

Figure 53:
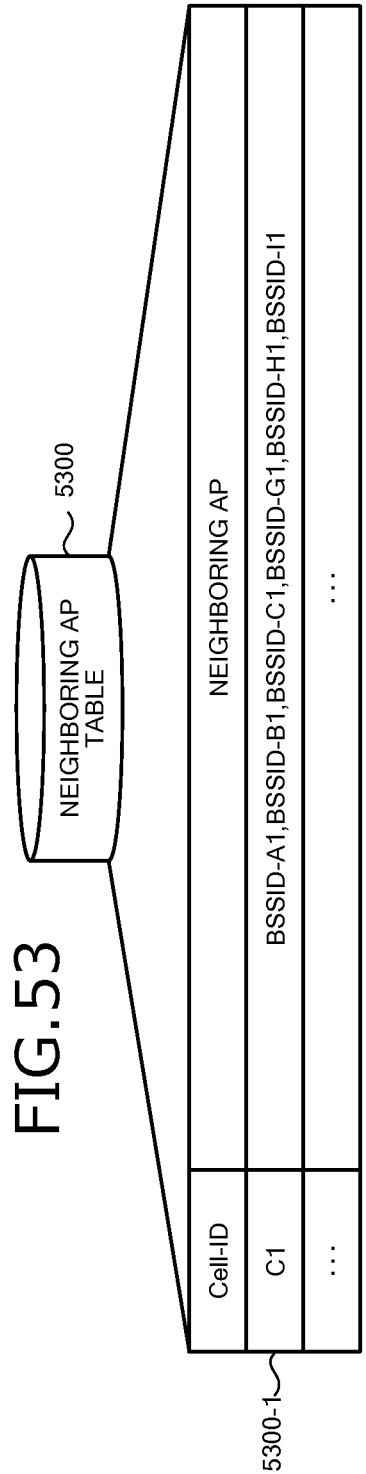
FIG. 53 is an explanatory diagram of an example of the contents stored in a neighboring AP table 5300.

FIG. 53 is an explanatory diagram of an example of the contents stored in a neighboring AP table 5300. In FIG. 53, the neighboring AP table 5300 has Cell-ID and neighboring-AP fields. By setting information in the fields, neighboring access point information (e.g., neighboring access point information 5300-1) is stored as records.

The Cell-ID is area identification information identifying the cell Cj of a base station BSj of a mobile communications network. The neighboring AP is BSSIDs of neighboring APs present in the vicinity of a connection AP in the cell Cj. For example, the neighboring access point information 5300-1 enables identification of the BSSIDs "BSSID-A1", "BSSID-B1", "BSSID-C1", "BSSID-G1", "BSSID-H1", and "BSSID-I1" of the neighboring APs present in the vicinity of a connection AP in the cell C1.

The determining unit 4804 may refer to the neighboring AP table 5300 to determine whether there is past connection to an access point APi in the cell Cj to which the mobile terminal device 101 belongs. Specifically, for example, the determining unit 4804 refers to the neighboring AP table 5300 and determines whether the ESSID of the access point APi is present stored in correlation with the Cell-ID acquired by the acquiring unit 4803.

If the ESSID of the access point APi is present, the determining unit 4804 determines that there is past connection to the access point APi in the cell Cj to which the mobile terminal device 101 belongs. On the other hand, if the ESSID of the access point APi is not present, the determining unit 4804 determines that there is no past connection to the access point APi in the cell Cj to which the mobile terminal device 101 belongs. In this case, the connection past-record table 4700 depicted in FIG. 47 need not be used and the usage of the memory 302 can be reduced.

A registration procedure of registering the neighboring access point information to the neighboring AP table 5300 will be described.

Figure 54:
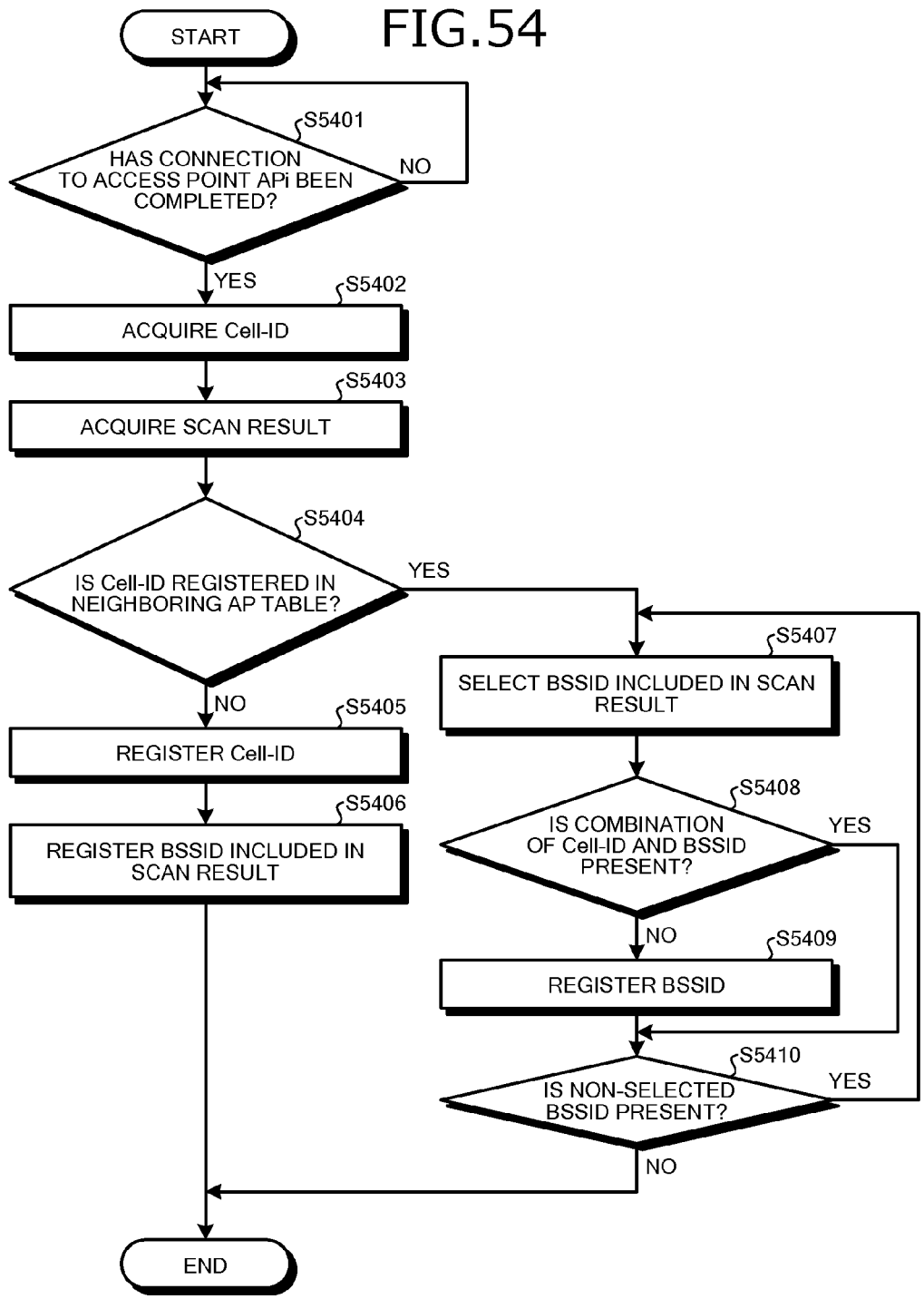
FIG. 54 is a flowchart of an example of a registration procedure of the mobile terminal device 101 according to the fourth embodiment.

FIG. 54 is a flowchart of an example of the registration procedure of the mobile terminal device 101 according to the fourth embodiment. In the flowchart depicted in FIG. 54, the communications control unit 4805 determines whether connection to the access point APi has been completed (step S5401).

The communications control unit 4805 waits until connection to the access point APi is completed (step S5401: NO). When connection to the access point APi is completed (step S5401: YES), the communications control unit 4805 sends an acquisition request to the acquiring unit 4803 for the Cell-ID of the cell Cj to which the mobile terminal device 101 belongs and thereby, acquires the Cell-ID of the cell Cj to which the mobile terminal device 101 belongs (step S5402).

The communications control unit 4805 acquires the scan result obtained immediately before the connection to the access point APi (step S5403). The communications control unit 4805 determines whether the acquired Cell-ID is registered in the Cell-ID field of the neighboring AP table 5300 (step S5404).

If the acquired Cell-ID is not registered (step S5404: NO), the communications control unit 4805 registers the acquired Cell-ID into the Cell-ID field of the neighboring AP table 5300 (step S5405). The communications control unit 4805 registers the BSSID included in the scan result into the BSSID field that corresponds to the acquired Cell-ID in the neighboring AP table 5300 (step S5406) and terminates a series of operations according to the flowchart.

If the acquired Cell-ID is registered at step S5404 (step S5404: YES), the communications control unit 4805 selects a non-selected BSSID included in the scan result (step S5407). The communications control unit 4805 refers to the neighboring AP table 5300 and determines whether a combination of the acquired Cell-ID and the selected BSSID is present (step S5408).

If the combination of the Cell-ID and the BSSID is present (step S5408: YES), the communications control unit 4805 proceeds to step S5410. On the other hand, if the combination of the Cell-ID and the BSSID is not present (step S5408: NO), the communications control unit 4805 registers the selected BSSID into the BSSID field that corresponds to the acquired Cell-ID in the neighboring AP table 3400 (step S5409).

The communications control unit 4805 determines whether a non-selected BSSID that has not yet been selected from the scan result is present (step S5410). If a non-selected BSSID is present (step S5410: YES), the communications control unit 4805 returns to step S5407. On the other hand, if no non-selected BSSID is present (step S5410: NO), the communications control unit 4805 terminates a series of operations according to the flowchart.

As a result, the BSSID of a neighboring AP present in the cell Cj including the mobile terminal device 101 can be registered to the neighboring AP table 5300 at the time of connection to an access point APi.

As described above, if there is a past connection to an access point APi in the cell Cj to which the mobile terminal device 101 belongs, the mobile terminal device 101 according to the fourth embodiment can control the cycle T of the scanning operation of searching for an access point APi. As a result, the control process can be suppressed in the cell Cj without a past connection to an access point APi, i.e., the cell Cj in which an available access point APi is less likely to exist, so as to reduce the process load of the mobile terminal device 101.

The control method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

According to one aspect of the embodiments, power consumption can be suppressed.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A mobile terminal device comprising:
 a sensor configured to detect movement of the mobile terminal device;
 a first communications circuit configured to connect to a network via an access point;
 a processor configured to detect a transition from a non-display state in which no screen is displayed to a display state in which a screen is displayed; and memory configured to store connection history information that includes network identification information identifying the network to which the first communications circuit has connected, wherein the memory is configured to further store non-connection information in which access point identification information is correlated with network identification information, the access point identification information identifying an access point to which the first communications circuit is not allowed to connect, the network identification information identifying a network corresponding to an access point to which the first communications circuit is not allowed to connect, the processor is configured to further determine whether network identification information has been retrieved from the connection history information and whether access point identification information has been retrieved from the non-connection information, and the processor is configured to further control the first communications circuit to search for an access point upon detecting the transition from the non-display state to the display state, the processor controlling the first communications circuit to suspend searching for an access point upon determining that the network identification information identifying the network corresponding to the access point found by the first communications circuit is not present in the connection history information and that the access point identification information of the access point found by the first communications circuit is present in the non-connection information.

2. The mobile terminal device according to claim 1, wherein the processor controls the first communications circuit to search for an access point upon detecting that the transition from the non-display state to the display state, and stores search count information in which the access point identification information identifying the access point found by the first communications circuit is correlated with a count of how many times the access point is found by the first communications circuit, the processor stores to the memory, the non-connection information in which the access point identification information of the search count information is correlated with network identification information identifying a corresponding network, according to the count correlated with the access point identification information of the search count information.

3. The mobile terminal device according to claim 2, wherein the processor stores to the memory, the non-connection information in which the access point identification information of the search count information is further correlated with time information in addition to the network identification information identifying a corresponding network, according to the count correlated with the access point identification information of the search count information.

4. The mobile terminal device according to claim 3, wherein the processor, upon detecting the transition from the non-display state to the display state while controlling the first communications circuit to suspend searching for an access point, controls the first communications circuit to search for an access point, and upon determining that the network identification information identifying the network corresponding to the access point found by the first communications circuit is not present in the connection history information and that the access point identification information of the access point found by the first communications circuit is present in the non-connection information, and a difference of a current time and the time information correlated with the access point identification information of the access point found by the first communications circuit is a given value or less, the processor controls the first communications circuit to suspend searching for an access point.

5. The mobile terminal device according to claim 1, wherein the processor, upon detecting the transition from the non-display state to the display state, controls the first communications circuit to search for an access point, and upon determining that the network identification information identifying the network corresponding to the access point found by the first communications circuit is present in the connection history information and that the access point identification information of the access point found by the first communications circuit is present in the non-connection information, the processor controls the first communications circuit to continue searching for an access point.

6. The mobile terminal device according to claim 1, wherein the processor changes a cycle of searching for an access point by the first communications circuit when an access point is searched for by the first communications circuit in response to detection of movement of the mobile terminal device by the sensor.

7. The mobile terminal device according to claim 1, wherein the processor, upon detecting the transition from the non-display state to the display state after controlling the first communications circuit to suspend searching for an access point having a radio wave strength greater than or equal to a first given strength, controls the first communications circuit to search for an access point having a radio wave strength greater than or equal to a second given strength that is less than the first given strength, and stores search count information in which the access point identification information identifying the access point found by the first communications circuit is correlated with a count of how many times the access point is found by the first communications circuit.

8. The mobile terminal device according to claim 1, wherein the processor, upon detecting the transition from the non-display state to the display state, controls the first communications circuit to search for an access point and stores search time information in which the access point identification information identifying the access point found by the first communications circuit is correlated with a search time at which the access point is found by the first communications circuit, wherein the processor stores to the memory, the non-connection information in which the access point identification information identifying the access point found continuously for a given period by the first communications circuit is correlated with network identification information identifying a corresponding network, according to the search time correlated with the access point identification information in the search time information.

9. A control method of a mobile terminal device having a first communications circuit configured to connect to a network via an access point and memory configured to store connection history information that includes network identification information identifying the network to which the first communications circuit has connected, and to further store non-connection information in which access point identification information is correlated with network identification information, the access point identification information identifying an access point to which the first communications circuit is not allowed to connect, the network identification information identifying a network corresponding to an access point to which the first communications circuit is not allowed to connect, the control method comprising:
   detecting, by a sensor of the mobile terminal device, movement of the mobile terminal device;
   detecting, by a processor of the mobile terminal device, a transition from a non-display state in which no screen is displayed to a display state in which a screen is displayed;
   determining, by the processor, whether network identification information has been retrieved from the connection history information and whether access point identification information has been retrieved from the non-connection information; and
   controlling, by the processor, the first communications circuit to search for an access point upon detection the transition from the non-display state to the display state, and controlling the first communications circuit to suspend searching for an access point upon determination that the network identification information identifying the network corresponding to the access point found by the first communications circuit is not present in the connection history information and that the access point identification information of the access point found by the first communications circuit is present in the non-connection information.

10. A non-transitory, computer-readable recording medium storing therein a control program of a mobile terminal device having a first communications circuit configured to connect to a network via an access point and memory configured to store connection history information that includes network identification information identifying the network to which the first communications circuit has connected, and to further store non-connection information in which access point identification information is correlated with network identification information, the access point identification information identifying an access point to which the first communications circuit is not allowed to connect, the network identification information identifying a network corresponding to an access point to which the first communications circuit is not allowed to connect, the control program causing the mobile terminal device to execute a process comprising:
   detecting, by a sensor of the mobile terminal device, movement of the mobile terminal device;
   detecting, by a processor of the mobile terminal device, a transition from a non-display state in which no screen is displayed to a display state in which a screen is displayed;
   determining, by the processor, whether network identification information has been retrieved from the connection history information and whether access point identification information has been retrieved from the non-connection information; and
   controlling, by the processor, the first communications circuit to search for an access point upon detection the transition from the non-display state to the display state, and controlling the first communications circuit to suspend searching for an access point upon determination that the network identification information identifying the network corresponding to the access point found by the first communications circuit is not present in the connection history information and that the access point identification information of the access point found by the first communications circuit is present in the non-connection information.

11. A mobile terminal device comprising:
   a first communications circuit configured to connect to a network via an access point;
   memory configured to store neighboring access point information that includes a plurality of entries in which access point identification information identifying an access point through which the mobile terminal device has been connected to the network is correlated with neighboring access point identification information identifying a neighboring access point present in a vicinity of the access point;
   a processor configured to determine whether an entry including the neighboring access point identification information correlated with first access point identification information has been retrieved from the neighboring access point information, when the first communications circuit finds an access point to connect to a first network, wherein
   the processor is further configured to control a cycle of searching for an access point by the first communications circuit, based on a determination result obtained by the processor.

12. The mobile terminal device according to claim 11, wherein
   the processor, upon determining that an entry including the neighboring access point identification information correlated with the first access point identification information has been retrieved from the neighboring access point information, shortens the cycle of searching for an access point by the first communications circuit.

13. The mobile terminal device according to claim 12, wherein
   the processor, upon that an entry including the neighboring access point identification information correlated with the first access point identification information has not been retrieved from the neighboring access point information, performs any one among lengthening the cycle of searching for an access point by the first communications circuit and controlling the first communications circuit to suspend searching for an access point.

14. The mobile terminal device according to claim 11, further comprising a sensor configured to detect movement of the mobile terminal device, wherein
   the processor, upon determining that an entry including the neighboring access point identification information correlated with the first access point identification information has not been retrieved from the neighboring access point information and the sensor detects no movement of the mobile terminal device, performs any one among lengthening the cycle of searching for an access point by the first communications circuit and controlling the first communications circuit to suspend searching for an access point.

15. The mobile terminal device according to claim 11, further comprising a sensor configured to detect movement of the mobile terminal device, wherein the processor, upon determining that an entry including the neighboring access point identification information correlated with the first access point identification information has not been retrieved from the neighboring access point information and the sensor detects movement of the mobile terminal device, sets the cycle of searching for an access point by the first communications circuit to a given cycle.

16. The mobile terminal device according to claim 11, further comprising a second communications circuit configured to connect to a base station; and memory configured to store connection history information that includes a plurality of entries in which area identification information identifying a communication area of a base station is correlated with access point identification information identifying an access point that has connected to the network in the communication area, wherein the processor is configured to detect a transition from a non-display state in which no screen is displayed to a display state in which a screen is displayed, the processor upon detecting the transition from the non-display state to the display state while in a communication area of a first base station and before determining whether an entry including neighboring access point identification information correlated with the first access point identification information has been retrieved from the neighboring access point information, determines whether an entry that includes access point identification information correlated with first communication area identification information identifying the first communication area has been retrieved from the connection history information, and the processor, based on a determination result obtained, controls the cycle of searching for an access point by the first communications circuit.

17. The mobile terminal device according to claim 16, wherein the processor upon determining that an entry including the access point identification information correlated with the first communication area identification information identifying the first communication area has been retrieved from the connection history information, connects the first communications circuit to an access point identified by the access point identification information correlated with the first communication area identification information.

18. The mobile terminal device according to claim 16, wherein the processor upon determining that an entry including the access point identification information correlated with the first communication area identification information identifying the first communication area has not been retrieved from the connection history information, suspends the first communications circuit.

19. A control method of a mobile terminal device, the control method comprising:

connecting to a network via an access point, by a first communications circuit of the mobile terminal device;

storing, by memory of the mobile terminal device, neighboring access point information that includes a plurality of entries in which access point identification information identifying an access point through which the mobile terminal device has been connected to the network is correlated with neighboring access point identification information identifying a neighboring access point present in a vicinity of the access point;

determining, by a processor of the mobile terminal device, whether an entry including the neighboring access point identification information correlated with first access point identification information has been retrieved from the neighboring access point information, when the first communications circuit finds an access point to connect to a first network;

controlling, by the processor, a cycle of searching for an access point by the first communications circuit, based on a determination result obtained at the determining.

20. A non-transitory, computer-readable recording medium storing therein a control program of a mobile terminal device, the control program causing the mobile terminal device to execute a process comprising:

connecting to a network via an access point, by a first communications circuit of the mobile terminal device;

storing, by memory of the mobile terminal device, neighboring access point information that includes a plurality of entries in which access point identification information identifying an access point through which the mobile terminal device has been connected to the network is correlated with neighboring access point identification information identifying a neighboring access point present in a vicinity of the access point;

determining, by a processor of the mobile terminal device, whether an entry including the neighboring access point identification information correlated with first access point identification information has been retrieved from the neighboring access point information, when the first communications circuit finds an access point to connect to a first network;

controlling, by the processor, a cycle of searching for an access point by the first communications circuit, based on a determination result obtained at the determining.

* * * * *